US011536659B2

(12) United States Patent
Fan et al.

(10) Patent No.: US 11,536,659 B2
(45) Date of Patent: Dec. 27, 2022

(54) LASER EMISSION BASED MICROSCOPE

(71) Applicant: THE REGENTS OF THE UNIVERSITY OF MICHIGAN, Ann Arbor, MI (US)

(72) Inventors: Xudong Fan, Saline, MI (US); Yu-Cheng Chen, Ann Arbor, MI (US); Qiushu Chen, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 742 days.

(21) Appl. No.: 16/473,584

(22) PCT Filed: Dec. 27, 2017

(86) PCT No.: PCT/US2017/068556
§ 371 (c)(1),
(2) Date: Jun. 25, 2019

(87) PCT Pub. No.: WO2018/125925
PCT Pub. Date: Jul. 5, 2018

(65) Prior Publication Data
US 2020/0158641 A1    May 21, 2020

Related U.S. Application Data

(60) Provisional application No. 62/439,367, filed on Dec. 27, 2016.

(51) Int. Cl.
*G01N 21/64* (2006.01)
*G02B 21/00* (2006.01)
*G02B 21/34* (2006.01)

(52) U.S. Cl.
CPC ..... *G01N 21/6428* (2013.01); *G01N 21/6458* (2013.01); *G02B 21/004* (2013.01);
(Continued)

(58) Field of Classification Search
CPC .......... G01N 21/6428; G01N 21/6458; G01N 2021/6441; G02B 21/004; G02B 21/0076;
(Continued)

(56) References Cited

U.S. PATENT DOCUMENTS 5,459,325 A * 10/1995 Hueton ............ G01N 27/44721
204/461
5,538,850 A    7/1996 King et al.
(Continued)

FOREIGN PATENT DOCUMENTS

CN    1699974 A    11/2005
CN    1961206 A    5/2007
(Continued)

OTHER PUBLICATIONS

Extended European Search Report for European Patent Application No. 17889435.8 dated Jul. 10, 2020, 14 pages.
(Continued)

*Primary Examiner* — Stephone B Allen
*Assistant Examiner* — Rahman Abdur
(74) *Attorney, Agent, or Firm* — Harness, Dickey & Pierce, P.L.C.

(57) ABSTRACT

Laser emission based microscope devices and methods of using such devices for detecting laser emissions from a tissue sample are provided. The scanning microscope has first and second reflection surfaces and a scanning cavity holding a stationary tissue sample with at least one fluorophore/lasing energy responsive species. At least a portion of the scanning cavity corresponds to a high quality factor (Q) Fabry-Pérot resonator cavity. A lasing pump source directs energy at the scanning cavity while a detector receives and detects emissions generated by the fluorophore(s) or lasing energy responsive species. The second reflection surface and/or the lasing pump source are translatable with respect
(Continued)

to the stationary tissue sample for generating a two-dimensional scan of the tissue sample. Methods for detecting multiplexed emissions or quantifying one or more biomarkers in a histological tissue sample, for example for detection and diagnosis of cancer, or other disorders/diseases are provided.

39 Claims, 24 Drawing Sheets

(52) U.S. Cl.
CPC . *G02B 21/0076* (2013.01); *G01N 2021/6441* (2013.01); *G02B 21/34* (2013.01)

(58) Field of Classification Search
CPC .... G02B 21/34; G02B 5/284; G02B 21/0056; G02B 21/0064; G02B 21/0096; G02B 5/288; G02B 21/364
USPC .......................................................... 359/368
See application file for complete search history.

(56) References Cited

U.S. PATENT DOCUMENTS

| | | | |
|---|---|---|---|
| 5,793,485 | A | 8/1998 | Gourley |
| 6,263,234 | B1 | 7/2001 | Engelhardt et al. |
| 6,697,411 | B2 | 2/2004 | Hoose et al. |
| 6,697,652 | B2 * | 2/2004 | Georgakoudi ........ A61B 5/1459 600/478 |
| 7,050,208 | B2 | 5/2006 | Overbeck |
| 7,768,654 | B2 | 8/2010 | Cui et al. |
| 8,314,933 | B2 | 11/2012 | Cui et al. |
| 8,325,349 | B2 | 12/2012 | Cui et al. |
| 8,411,282 | B2 | 4/2013 | Cui et al. |
| 8,700,134 | B2 | 4/2014 | Grego et al. |
| 9,069,130 | B2 | 6/2015 | Yun et al. |
| 9,151,713 | B2 | 10/2015 | Fan et al. |
| 2008/0210869 | A1 * | 9/2008 | Gerritsen .............. H01J 37/226 250/311 |
| 2009/0225319 | A1 | 9/2009 | Lee et al. |
| 2010/0296094 | A1 | 11/2010 | Yang et al. |
| 2011/0234757 | A1 | 9/2011 | Zheng et al. |
| 2011/0266470 | A1 | 11/2011 | Yun et al. |
| 2011/0301438 | A1 * | 12/2011 | Sachse ................. A61B 5/0084 600/431 |
| 2012/0330157 | A1 * | 12/2012 | Mandella ............... A61B 1/043 600/443 |
| 2013/0222547 | A1 | 8/2013 | Van Rooyen et al. |
| 2014/0323323 | A1 | 10/2014 | Cunningham et al. |
| 2015/0316464 | A1 * | 11/2015 | Gourley ............. G01N 15/1484 356/338 |

FOREIGN PATENT DOCUMENTS

| | | |
|---|---|---|
| CN | 103698309 A | 4/2014 |
| CN | 103954589 A | 7/2014 |
| CN | 103972785 A | 8/2014 |
| CN | 104577691 A | 4/2015 |
| CN | 105116529 A | 12/2015 |
| CN | 106233124 A | 12/2016 |
| JP | 2013231740 A | 11/2013 |
| WO | WO-2012145677 A2 | 10/2012 |
| WO | WO-2017210675 A1 | 12/2017 |

OTHER PUBLICATIONS

Brachmann, Johannes F. S. et al., "Photothermal effects in ultra-precisely stabilized tunable microcavities," Optics Express, vol. 24, No. 18, 21205 (2016); (Published Sep. 2, 2016) DOI: 10.1364/OE.24.021205.

Janitz, Erika et al., "Fabry-Perot microcavity for diamond-based photonics," Physical Review A, 92, 043844 (2015); (Published Aug. 26, 2015) DOI: 10.1103/PhysRevA.92.043844.

Gurcan, Metin N. et al., "Histopathological Image Analysis: A Review," IEEE Review in Biomedical Engineering, vol. 2 (2009) pp. 147-171; (Published Dec. 9, 2009) DOI: 10.1109/RBME.2009.2034865.

Anonymous, "Blood," Wikipedia (Oct. 18, 2016) [online] [Retrieved from the internet] URL:<https://en.wikipedia.org/w/index.php?title=Blood&oldid=745006560> [retrieved on Jun. 29, 2020], 19 pages.

Second Chinese Office Action with translation for corresponding Chinese Patent Application No. 201780087298.6, dated Jan. 28, 2022; 39 pages.

Chinese First Office Action, (CNIPA) China National Intellectual Property Administration, corresponding to CN 201780087298.6 (PCT/US2017/068556), dated May 27, 2021. English translation provided.

International Search Report and Written Opinion for International Application No. PCT/US2017/068556 dated Apr. 23, 2018 (ISA/KR).

Fan, Xudong et al., "The potential of optofluidic biolasers," *Nature Methods*, vol. 11 No. 2, pp. 141-147 (Published online Jan. 30, 2014); DOI; 10.1038/nmeth.2805.

Humar, Matjaž et al., "Analysis of Optical Properties of Cell Lasers and Their Use as Biological Sensors," *CLEO*: 2015, OSA Technical Digest (online) (Optical Society of America, 2015), paper AM1J.2.; DOI: 10.1364/CLEO_AT.2015.AM1J.2.

Humar, Matjaž et al., "Cellular dye lasers: lasing thresholds and sensing in a planar resonator," *Optics Express*, vol. 23 (21) pp. 27865-27879 (2015); DOI: 10.1364/OE.23.027865.

Jonáš, Alexandr et al., "In vitro and in vivo biolasing of fluorescent proteins suspended in liquid microdroplet cavities," *Lab Chip*, 2014, 14, pp. 3093-3100 (Published Jun. 12, 2014); DOI: 10.1039/c4lc00485j.

Sun, Yuze et al., "Distinguishing DNA by Analog-to-Digital-like Conversion by Using Optofluidic Lasers," *Angew. Chem. Int. Ed.*, 51, pp. 1236-1239 (Published Jan. 24, 2012); DOI: 10.1002/anie.201107381.

Wang, Wenjie et al., "Optofluidic laser array based on stable high-Q Fabry-Pérot microcavities," *Lab Chip*, 2015, 15, pp. 3862-3869 (Published Aug. 11, 2015); DOI: 10.1039/c5lc00847f.

Decision on Rejection dated Jun. 17, 2022, for CN Application No. 201780087298.6 with English language translation; 47 pages.

European Office Action regarding Patent Application No. 17889435.8, dated Apr. 20, 2022.

* cited by examiner

LASER EMISSION BASED MICROSCOPE

CROSS-REFERENCE TO RELATED APPLICATIONS

This application is the U.S. National Phase Application under 35 U.S.C. 371 of International Application No. PCT/US2017/068556, filed on Dec. 27, 2017, which claims the benefit of U.S. Provisional Application No. 62/439,367 filed on Dec. 27, 2016. The entire disclosures of the above applications are incorporated herein by reference.

GOVERNMENT RIGHTS

This invention was made with government support under grant EB016783 awarded by the U.S. National Institutes of Health and grant ECCS1607250 awarded by the U.S. National Science Foundation. The government has certain rights in the invention.

FIELD

The present disclosure relates to laser emission based microscope devices and methods of using such laser emission based microscope devices for detecting emissions from one or more lasing energy responsive species (e.g., fluorophores) in a tissue sample and/or a method for quantifying one or more biomarkers in a histological tissue sample.

BACKGROUND

This section provides background information related to the present disclosure which is not necessarily prior art.

Biological lasers or biolasers are an emerging technology for next generation biochemical detection and clinical applications. Biolasers lase from biological and biochemical materials such as proteins, vitamins, luciferins, DNAs, cells, and blood, when they are labelled with external fluorophores or the materials themselves can serve as the gain media (such as in the case of fluorescent proteins). Biolasers have demonstrated great potential in biosensing, biomedical research, and diagnosis due to their capability to amplify subtle changes in the gain media caused by underlying biological processes, which in combination of threshold behavior, narrow linewidth, strong lasing emission, and lasing mode spatial distribution, may lead to significant increase in detection sensitivity, multiplexibility, and imaging contrast. Progress has recently been made to achieve lasing from biomolecules and single living cells. For example, biolasers using single cells with fluorescent proteins inside or externally labelled dyes/beads as the gain medium have been applied to single cell analysis.

However, more difficulty has been encountered in using biological lasers with tissues. Tissues, which comprise a plurality of cells embedded in an extracellular matrix, mimic more closely the actual complex biological environment in a living body and therefore are of more practical significance for scanning and detection. However, biolasers have been quite limited for use with tissues, in not being able to provide predictable and trackable laser emission signals from tissues, while generating strong background emissions resulting in undesirable signal-to-background ratios (SBR). These drawbacks significantly limit practicality and applicability for biolaser use in scanning and detecting in tissue. It would be desirable to provide a scanning microscope that can be used to reliably scan and generate a two-dimensional scan of any tissue sample.

Furthermore, detection and differentiation of specific targets (e.g., cancer antibodies) in biological tissues have become very important recently. The ability to detect multiple targets simultaneously with a higher sensitivity in a tissue sample is therefore highly desirable.

SUMMARY

This section provides a general summary of the disclosure, and is not a comprehensive disclosure of its full scope or all of its features.

In certain aspects, the present disclosure provides a scanning microscope device. The scanning microscope device comprises a first reflection surface that is planar, a second reflection surface, and a scanning cavity sized to receive a stationary tissue sample having at least lasing energy responsive species (e.g., at least one fluorophore). At least a portion of the scanning cavity corresponds to a Fabry-Pérot resonator cavity defined between the first reflection surface and the second reflection surface having a quality factor (Q) of greater than or equal to about $1 \times 10^2$. The scanning microscope device also comprises a lasing pump source configured to direct energy at the scanning cavity. A detector is configured to receive and detect one or more emissions generated by the at least one lasing energy responsive species (e.g., at least one fluorophore) in the tissue sample from the scanning cavity. At least one of the second reflection surface or the lasing pump source is translatable with respect to the stationary tissue sample in the scanning cavity to generate a two-dimensional scan of the tissue sample.

In certain variations, a first surface of the stationary tissue sample is disposed on the first reflection surface and a second surface of the stationary tissue sample opposite to the first surface has a gap of less than or equal to about 20 micrometers from the second reflection surface.

In other variations, a distance between the first reflection surface and the second reflection surface is less than or equal to about 60 micrometers.

In other variations, the second reflection surface defines a concave structure.

In certain variations, a radius of curvature of the concave structure is greater than or equal to about 5 micrometers to less than or equal to about 500 micrometers.

In yet other variations, the second reflection surface is a scanning mirror formed on a terminal end of a fiber that translates with respect to the stationary tissue sample.

In other variations, the second reflection surface defines a planar structure and the lasing pump source is translatable with respect to the tissue sample in the scanning cavity.

In certain other variations, the quality factor (Q) is greater than or equal to about $1 \times 10^5$.

In one variation, the first reflection surface and the second reflection surface have a broad reflection band.

In yet other variations, the stationary tissue sample comprises at least two distinct lasing energy responsive species (e.g., at least two distinct fluorophores) and the detector is capable of receiving and detecting multiplexed emissions from each distinct fluorophore or lasing energy responsive species.

In other variations, the second reflection surface is removable and optionally replaceable.

In further variations, the stationary tissue sample has a thickness of greater than or equal to about 1 μm to less than or equal to about 50 μm.

In yet other variations, at least one of the first reflection surface or the second reflection surface comprises one or more spacers.

In certain aspects, the one or more spacers have a height of greater than or equal to about greater than or equal to about 2 µm to less than or equal to about 60 µm.

In other variations, the scanning cavity further comprises at least one refractive index matching material disposed around the tissue sample.

In yet further variations, the stationary tissue sample is optionally in the form of a microarray of tissue samples.

In certain other variations, the stationary tissue sample has been cryogenically preserved or formalin-fixed paraffin-embedded.

In another variation, the first reflection surface and the second reflection surface have a tunable reflection band. The stationary tissue sample comprises at least two distinct lasing energy responsive species (e.g., at least two distinct fluorophores), including a first lasing energy responsive species having a first lasing threshold energy and a distinct second lasing energy responsive species having a distinct second lasing threshold energy. The first reflection surface and the second reflection surface can be configured to have a first reflection band that permits laser emissions from the first lasing energy responsive species to transmit therethrough. The first reflection surface and the second reflection surface can also be configured to have a second reflection band that permits laser emissions from the second lasing energy responsive species to transmit therethrough.

In yet another variation, the second reflection surface has a reflectivity to the one or more laser emissions generated by the one or more lasing energy responsive species in the tissue sample of greater than or equal to about 80% to less than or equal to about 99.999%.

In other aspects, the present disclosure contemplates a method of detecting emissions from one or more lasing energy responsive species (e.g., one or more fluorophores) in a tissue sample. The method comprises directing energy from a lasing pump source towards a stationary tissue sample. The stationary tissue sample is disposed within a scanning cavity at least a portion of which defines a Fabry-Pérot resonator cavity having a quality factor (Q) of greater than or equal to about $1\times10^2$ formed between a first reflection surface and a second reflection surface. The tissue sample contains one or more lasing energy responsive species. At least one of the second reflection surface or a lasing pump source translates with respect to the stationary tissue sample disposed within the scanning cavity. The method further comprises detecting one or more laser emissions generated by the one or more lasing energy responsive species in the tissue sample to generate a two-dimensional scan of the tissue sample.

In certain variations, the directing energy from the lasing pump source includes translating a source of lasing energy over the tissue sample disposed within the scanning cavity to generate the two-dimensional scan.

In yet other variations, the second reflection surface defines a concave structure.

In certain variations, a radius of curvature of the concave structure is greater than or equal to about 5 micrometers to less than or equal to about 500 micrometers.

In other variations, the second reflection surface is a scanning mirror formed on a terminal end of a fiber that translates with respect to the tissue sample disposed within the scanning cavity to generate the two-dimensional scan.

In another variation, the first reflection surface and the second reflection surface have a broad reflection band.

In yet another variation, the second reflection surface has a reflectivity to the one or more laser emissions generated by the one or more lasing energy responsive species in the tissue sample of greater than or equal to about 80% to less than or equal to about 99.999%.

In an alternative variation, the first reflection surface and the second reflection surface have a tunable reflection band. The one or more lasing energy responsive species comprise a first lasing energy responsive species having a first lasing threshold energy and a distinct second lasing energy responsive species having a distinct second lasing threshold energy. The method further comprises first tuning the first reflection surface and the second reflection surface to have a first reflection band that permits laser emissions from the first lasing energy responsive species to transmit therethrough, so that after the directing of energy, the detecting is of one or more emissions generated by the first lasing energy responsive species. The method may further comprise tuning the first reflection surface and the second reflection surface to have a second reflection band that permits laser emissions from the second lasing energy responsive species to transmit therethrough. The directing of energy then occurs again, so that the detecting is of one or more emissions generated by the second lasing energy responsive species.

In a further variation, the one or more lasing energy responsive species comprise a first lasing energy responsive species having a first lasing threshold energy. An amount of energy directed towards the stationary tissue sample is increased, so that the detecting maps a concentration distribution of the first lasing energy responsive species within the stationary tissue sample.

In certain variations, the tissue sample contains at least two distinct lasing energy responsive species (e.g., at least two fluorophores). The detecting includes detecting at least two distinct emissions generated by the at least two distinct fluorophores or lasing energy responsive species to generate a multiplexed two-dimensional scan of the tissue sample.

In another variation, the one or more lasing energy responsive species comprise a first lasing energy responsive species (e.g., a first fluorophore) having a first lasing threshold energy and a distinct second lasing energy responsive species (e.g., a second fluorophore) having a distinct second lasing threshold energy, so that the directing energy from the lasing pump source comprises increasing the energy level to first excite the first lasing energy responsive species and then to excite the second lasing energy responsive species. The detecting of the one or more emissions detects emissions from the first lasing energy responsive species and the second lasing energy responsive species maps a distribution of the first lasing energy responsive species and the second energy responsive species within the stationary tissue sample.

In other variations, the one or more lasing energy responsive species comprise a first lasing energy responsive species (e.g., a first fluorophore) and a distinct second lasing energy responsive species (e.g., a second fluorophore). The energy directed towards the stationary tissue sample is less than a first lasing threshold energy of the first lasing energy responsive species and greater than a second lasing threshold energy of the second lasing energy responsive species, so that the detecting of the one or more emissions detects only laser emissions from the second lasing energy responsive species in the tissue sample. The method may further comprise increasing the energy directed towards the tissue sample to be greater than the second lasing threshold energy to detect laser emissions from the second lasing energy responsive species.

In further aspects, the present disclosure provides a method for quantifying one or more biomarkers in a histological tissue sample. The method comprises directing energy from a lasing pump source towards a stationary histological tissue sample disposed within a scanning cavity. At least a portion of the scanning cavity defines a Fabry-Pérot resonator cavity having a quality factor (Q) of greater than or equal to about $1\times10^2$ formed between a first reflection surface and a second reflection surface. The histological tissue sample contains one or more lasing energy responsive species (e.g., one or more fluorophores) capable of associating with at least one biomarker and at least one of the second reflection surface or a source of lasing energy source of coherent electromagnetic radiation translates with respect to the stationary tissue sample disposed within the scanning cavity. The method further includes detecting one or more laser emissions generated by the one or more lasing energy responsive species in the histological tissue sample so as to quantify the number of the at least one biomarker present in the histological tissue sample.

In one variation, the one or more lasing energy responsive species comprises a first lasing energy responsive species (e.g., a first fluorophore) having a first lasing threshold energy. An amount of energy directed towards the histological tissue sample is increased, so that the detecting maps a concentration distribution of the first lasing energy responsive species in the histological tissue sample.

In yet other variations, the detecting of one or more emissions relates to a concentration distribution of the biomarker in distinct regions of the tissue sample. An excitation intensity of energy directed at the tissue sample is varied to measure the concentration of the biomarker in distinct regions of the tissue sample.

In certain variations, the histological tissue sample contains at least two distinct lasing energy responsive species (e.g., at least two fluorophores). The detecting includes detecting at least two distinct laser emissions generated by the at least two distinct lasing energy responsive species to generate a multiplexed two-dimensional scan of the histological tissue sample.

In certain variations, the one or more lasing energy responsive species comprise a first lasing energy responsive species (e.g., a first fluorophore) and a distinct second lasing energy responsive species (e.g., a second fluorophore) and the energy directed towards the stationary tissue sample is less than a first lasing threshold energy of the first lasing energy responsive species and greater than a second lasing threshold energy of the second lasing energy responsive species, so that the detecting of the one or more emissions detects only laser emissions from the second lasing energy responsive species in the tissue sample. The method may further comprise increasing the energy directed towards the tissue sample to be greater than the second lasing threshold energy to detect laser emissions from the second lasing energy responsive species.

In certain variations, the one or more lasing energy responsive species comprise a first lasing energy responsive species having a first lasing threshold energy. An amount of energy directed towards the stationary tissue sample is increased, so that the detecting maps a concentration distribution of the first lasing energy responsive species in the stationary tissue sample.

In other variations, the biomarker associates with nuclei of cells within the stationary tissue sample, so that the detecting of one or more emissions generated by the one or more lasing energy responsive species (e.g., one or more fluorophores) corresponds to emissions generated from nuclei of the cells, so that the quantifying enumerates the number of nuclei of cells in the tissue sample.

In still further variations, the one or more emissions generated by the one or more lasing energy responsive species have a spatial resolution of less than or equal to about 0.7 micrometers.

In another variation, the first reflection surface and the second reflection surface have a broad reflection band.

In an alternative variation, the first reflection surface and the second reflection surface have a tunable reflection band. The one or more lasing energy responsive species comprise a first lasing energy responsive species having a first lasing threshold energy and a distinct second lasing energy responsive species having a distinct second lasing threshold energy. The method further comprises first tuning the first reflection surface and the second reflection surface to have a first reflection band that permits laser emissions from the first lasing energy responsive species to transmit therethrough, so that after the directing of energy, the detecting is of one or more emissions generated by the first lasing energy responsive species. The method may further comprise tuning the first reflection surface and the second reflection surface to have a second reflection band that permits laser emissions from the second lasing energy responsive species to transmit therethrough. The directing of energy then occurs again, so that the detecting is of one or more emissions generated by the second lasing energy responsive species.

In another variation, the one or more lasing energy responsive species comprise a first lasing energy responsive species having a first lasing threshold energy and a distinct second lasing energy responsive species having a distinct second lasing threshold energy, so that the directing energy from the lasing pump source comprises increasing the energy level to first excite the first lasing energy responsive species and then to excite the second lasing energy responsive species. The detecting of the one or more emissions detects emissions from the first lasing energy responsive species and the second lasing energy responsive species maps a distribution (e.g., based on position/location) of the first lasing energy responsive species and the second energy responsive species within the stationary tissue sample.

In certain aspects, the method further comprises detecting one or more of bright field emissions or fluorescent emissions generated in the tissue sample, wherein the two-dimensional scan is a composite overlay of the laser emissions with the one or more bright field emissions, fluorescent emissions, or both bright field and fluorescent emissions.

In other aspects, the detecting comprises detecting fluorescent emissions and the method further comprises first removing the second reflection surface.

In further aspects, the one or more laser emissions generated by the one or more lasing energy responsive species in the tissue sample provides at least one of: identification of sub-type of cancer tissue, early detection of cancer, identification of a stage of cancer, or a histogram of laser emissions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B. FIG. 1A shows a schematic illustrating a wavelength-multiplexed subcellular immuno-laser microscope device prepared in accordance with certain aspects of the present disclosure. FIG. 1B shows a comparison between traditional fluorescence emissions (top) and "star-like" laser emissions (bottom) from a single nucleus.

Figures 4A, 4B, 4C, 4D, 4E, 4F, 4G:
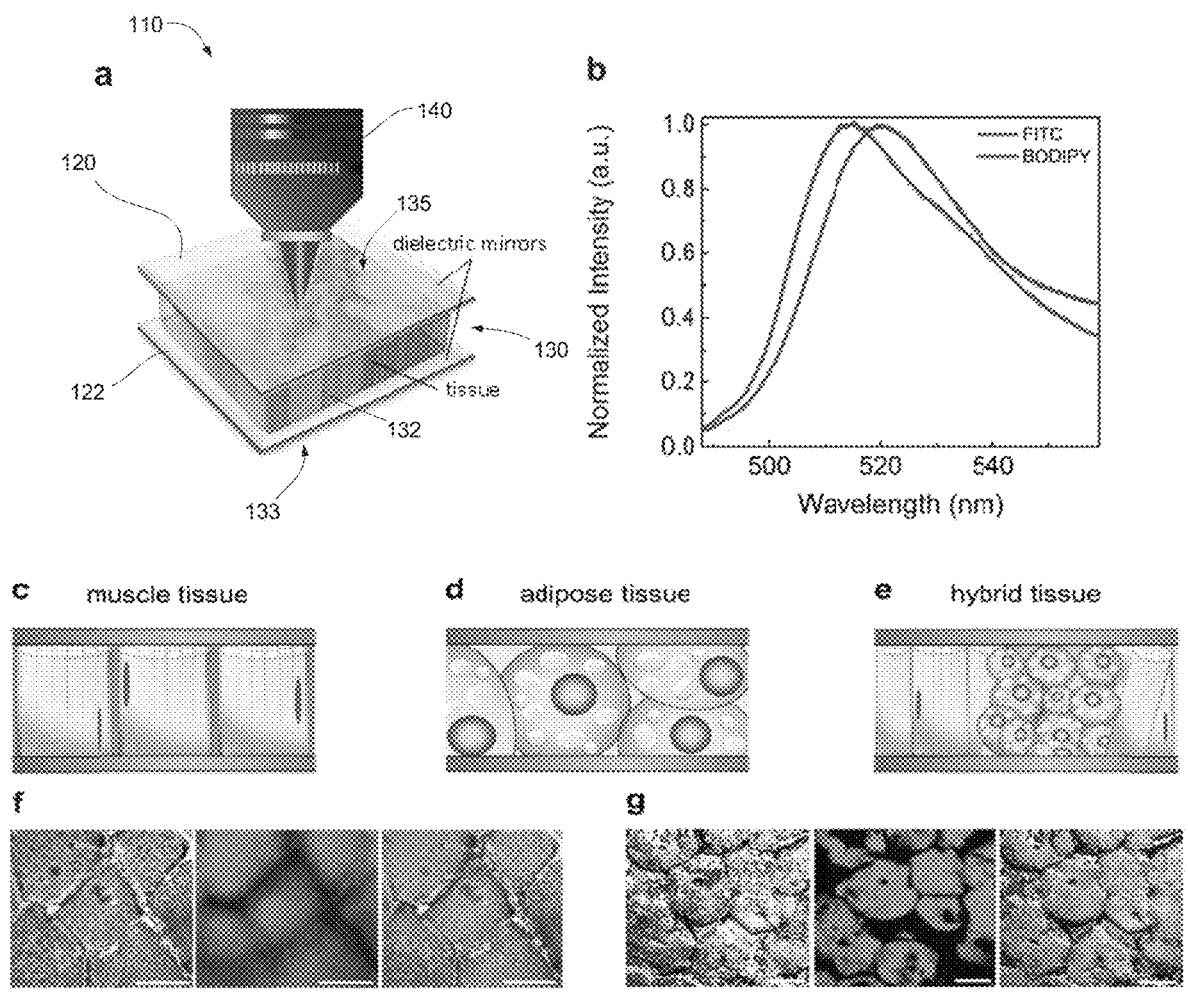

FIGS. 4A-4G show another embodiment of a scanning microscope device and tissue samples and results from scanning/detection with such a microscopic device. FIG. 4A shows a schematic of a scanning microscope device prepared in accordance with certain aspects of the present disclosure, including a translatable lasing pump source and photodetector unit. FIG. 4B normalized fluorescence emission spectra of FITC in water (blue curve) and BODIPY in ethanol (red curve shows data from an experiment with the scanning microscope device in FIG. 4A. FIGS. 4C-4E show different types of tissues investigated: muscle tissue (FIG. 4C), adipose tissue (FIG. 4D), and hybrid tissue (FIG. 4E). FIG. 4F shows microscopic images of myocytes stained with FITC (from left to right): differential interference contrast (DIC) image, confocal microscopy image, and overlap image. FIG. 4G shows microscopic images of adipocytes stained with BODIPY (from left to right): DIC image, confocal microscopy image, and overlap image. Scale bars, 20 µm.

Figures 5A, 5B, 5C:
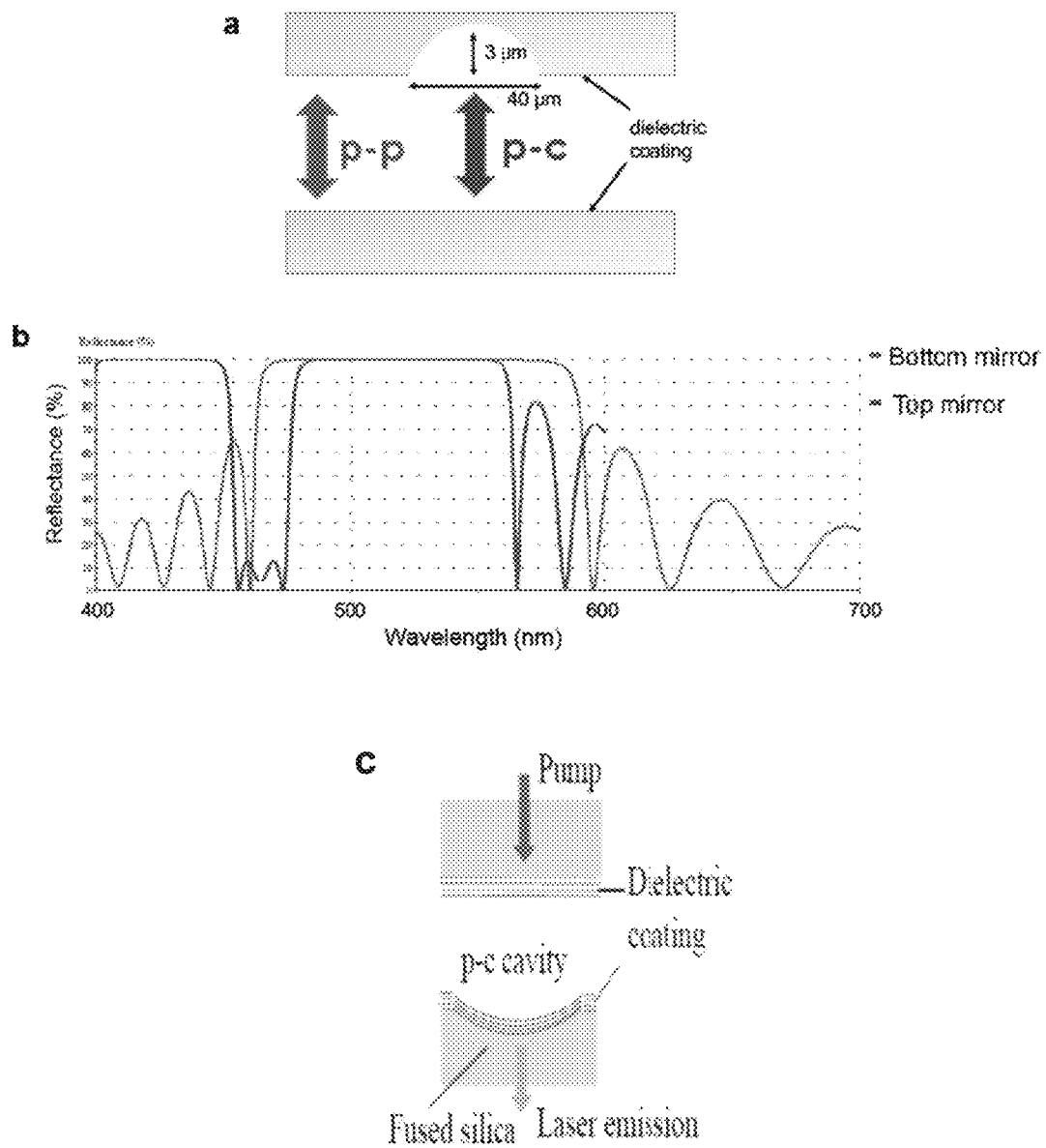

FIGS. 5A-5C. FIG. 5A shows a schematic of examples of different Fabry-Pérot resonator cavities that may be defined between a first reflection surface and a second reflection surface in a scanning cavity of the microscope devices according to certain aspects of the present disclosure, including a plano-plano and plano-concave Fabry-Pérot cavity.

FIG. 5B shows reflectance of the first and second reflection surfaces. FIG. 5C shows a schematic of a portion of a microscope device having a plano-concave (p-c) Fabry-Pérot cavity according to certain variations of the present disclosure.

Figure 6:
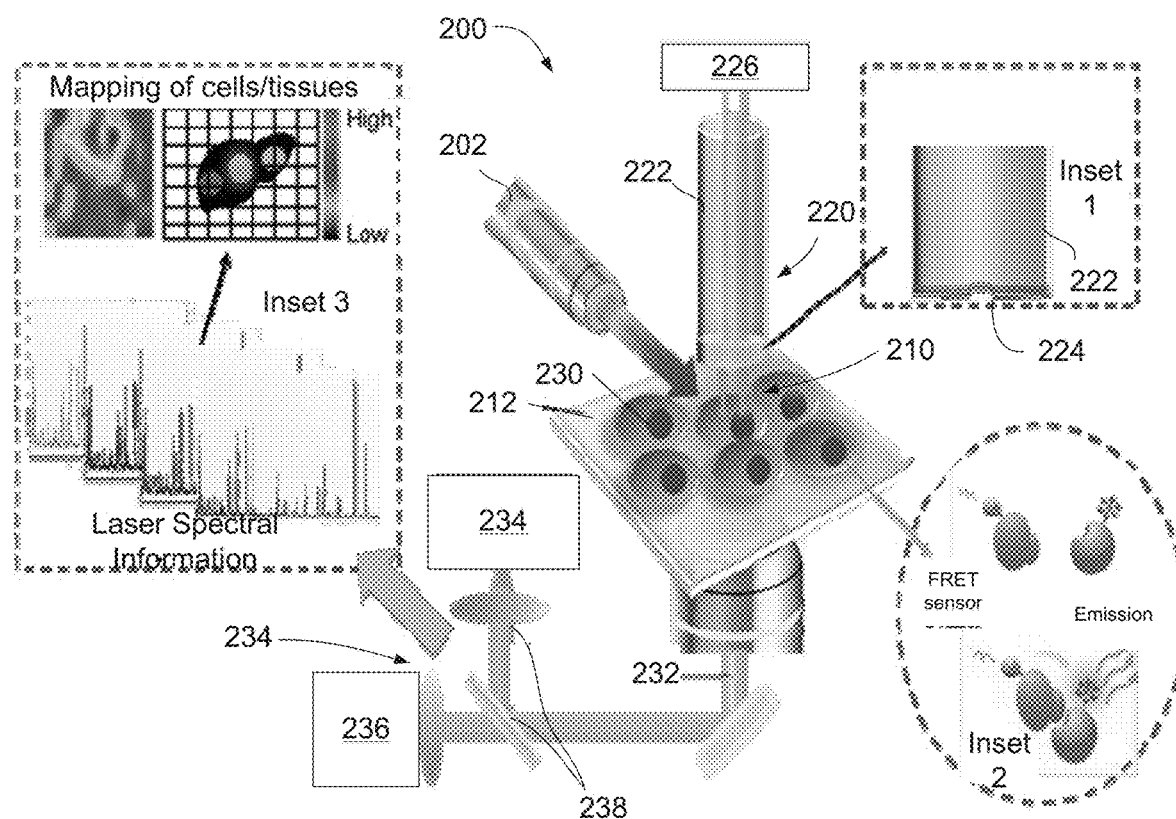

FIG. 6 shows another embodiment of a scanning microscope device and mapping of a tissue sample from scanning/detection with such a microscopic device.

Figures 7A, 7B, 7C, 7D, 7E, 7F:
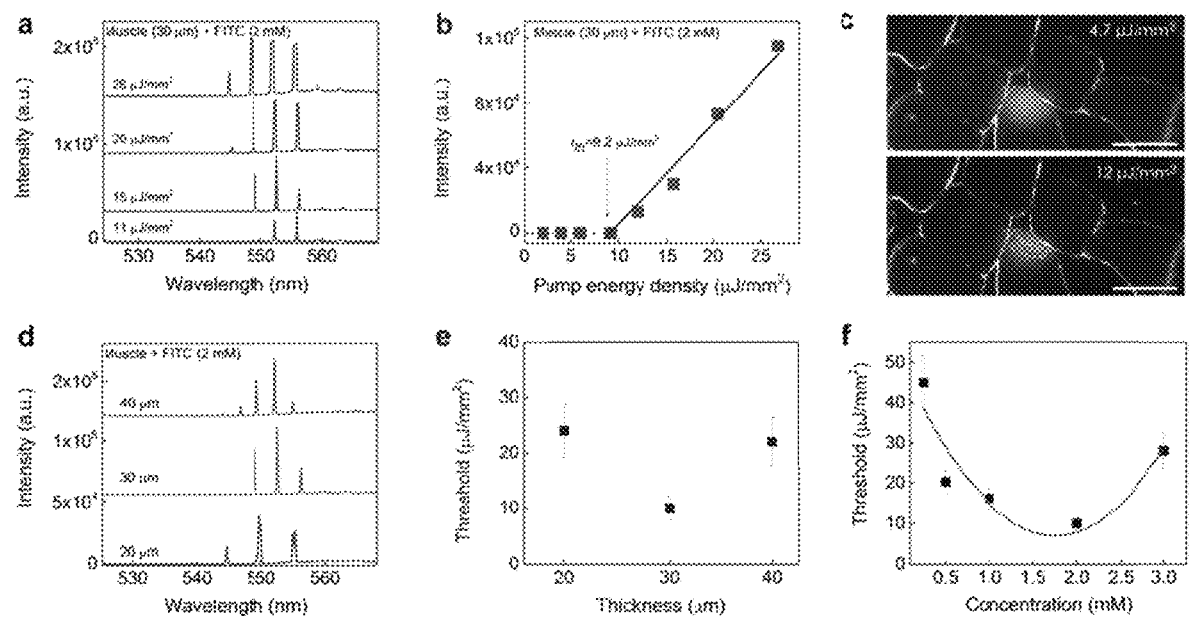

FIGS. 7A-7F. FIGS. 7A-7F generally show lasing in muscle tissue (longitudinal myofibrils) with a laser emission scanning microscope device prepared in accordance with certain aspects of the present disclosure. FIG. 7A shows examples of lasing spectra of muscle tissue (30 µm) stained with FITC (2 mM) under various pump energy densities. Curves are vertically shifted for clarity. FIG. 7B shows spectrally integrated (545 nm-560 nm) laser output as a function of pump energy density extracted from the spectra in FIG. 7A. The solid lines are the linear fit above the lasing threshold, which is 9.2 µJ/mm². FIG. 7C shows CCD images of the muscle tissue laser output below (4.7 µJ/mm²) and above (12 µJ/mm²) the lasing threshold. The image shows clearly several myocytes. The laser beam is, however, focused on only one of the myocytes. Scale bars, 20 µm. FIG. 7D shows lasing spectra of muscle tissue with different tissue thicknesses at 35 µJ/mm² (all of which are above the lasing threshold). Curves are vertically shifted for clarity. FIG. 7E shows a laser threshold for different tissue thicknesses. The concentration of FITC used to stain the tissue is 2.0 mM. Error bars are based on three individual measurements at different sites. FIG. 7F shows laser thresholds for different concentrations of FITC used to stain the tissue at the fixed tissue thickness (and hence the cavity length) of 30 µm. The solid curve is a quadratic fit to guide an eye. Error bars are based on three individual measurements at different sites.

Figures 8A, 8B, 8C, 8D, 8E:
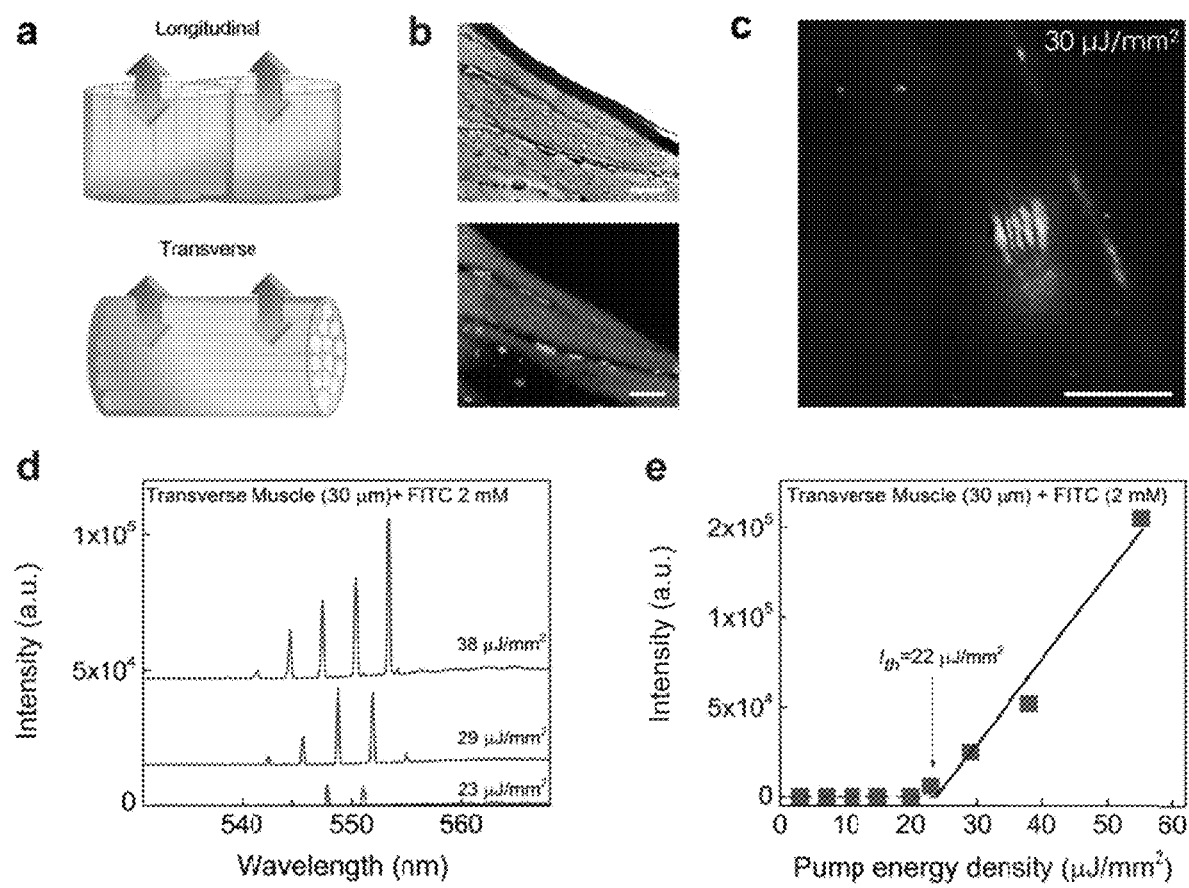

FIGS. 8A-8E. FIGS. 8A-8E generally show lasing in muscle tissue (transverse myofibrils) with a laser emission scanning microscope device prepared in accordance with certain aspects of the present disclosure. FIG. 8A is a schematic showing two arrangements of myofibrils (muscle fibers), longitudinal and transverse. Arrows indicate the lasing emission direction. The FP cavity is not shown. FIG. 8B shows a DIC (upper) and confocal fluorescence microscopic (lower) images of transverse myofibrils stained width FITC. FIG. 8C shows CCD images of tissue lasing in transverse myofibrils. FIG. 8D shows examples of lasing spectra of transverse muscle tissue stained with FITC under various pump energy densities. Curves are vertically shifted for clarity. FIG. 8E shows spectrally integrated (540 nm-560 nm) laser output as a function of pump energy density extracted from FIG. 8D. Solid line is the linear fit above the threshold, showing a lasing threshold of approximately 22 µJ/mm². Tissue thickness=30 µm. [FITC]=2.0 mM. Excitation wavelength=465 nm. All scale bars, 20 µm.

Figures 9A, 9B, 9C, 9D, 9E, 9F:
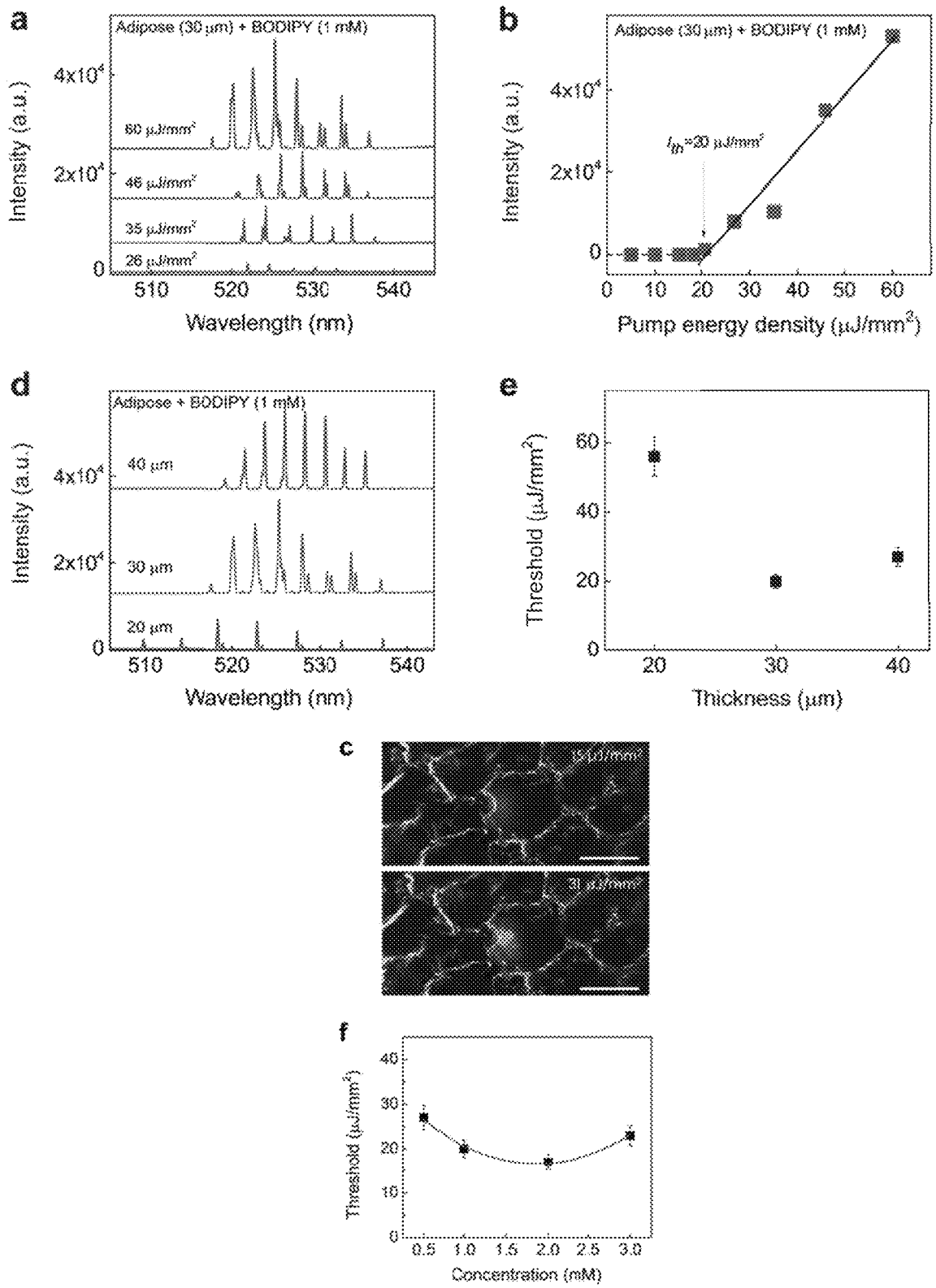

FIGS. 9A-9F. FIGS. 9A-9F generally show lasing in adipose tissue with a laser emission scanning microscope device prepared in accordance with certain aspects of the present disclosure. FIG. 9A shows examples of lasing spectra of adipose tissue (30 µm) stained with BODIPY (1.0 mM) under various pump energy densities. Curves are vertically shifted for clarity. FIG. 9B shows spectrally integrated (520 nm-535 nm) laser output as a function of pump energy density extracted from the spectra in FIG. 9A. The solid lines are the linear fit above the lasing threshold, which is approximately 20.0 µJ/mm². FIG. 9C shows CCD images of the muscle tissue laser output below (15 µJ/mm²) and above (31 µJ/mm²) the lasing threshold. The image shows clear boundaries of several adipocytes, in which the laser beam is focused on only one of the fat cells. Scale bars, 20 µm. FIG. 9D shows lasing spectra of adipose tissues of different thicknesses above the lasing threshold. FIG. 9E shows laser thresholds for different tissue thicknesses. The concentration of BODIPY used to stain the tissue is 1.0 mM. Error bars are based on three individual measurements at different sites. FIG. 9F shows laser threshold with different concentrations of BODIPY used to stain the tissue at the fixed tissue thickness (and hence the cavity length) of 30 µm. The solid curve is a quadratic fit to guide an eye. Error bars are based on three individual measurements at different sites.

Figures 10A, 10B, 10C, 10D, 10E, 10F:
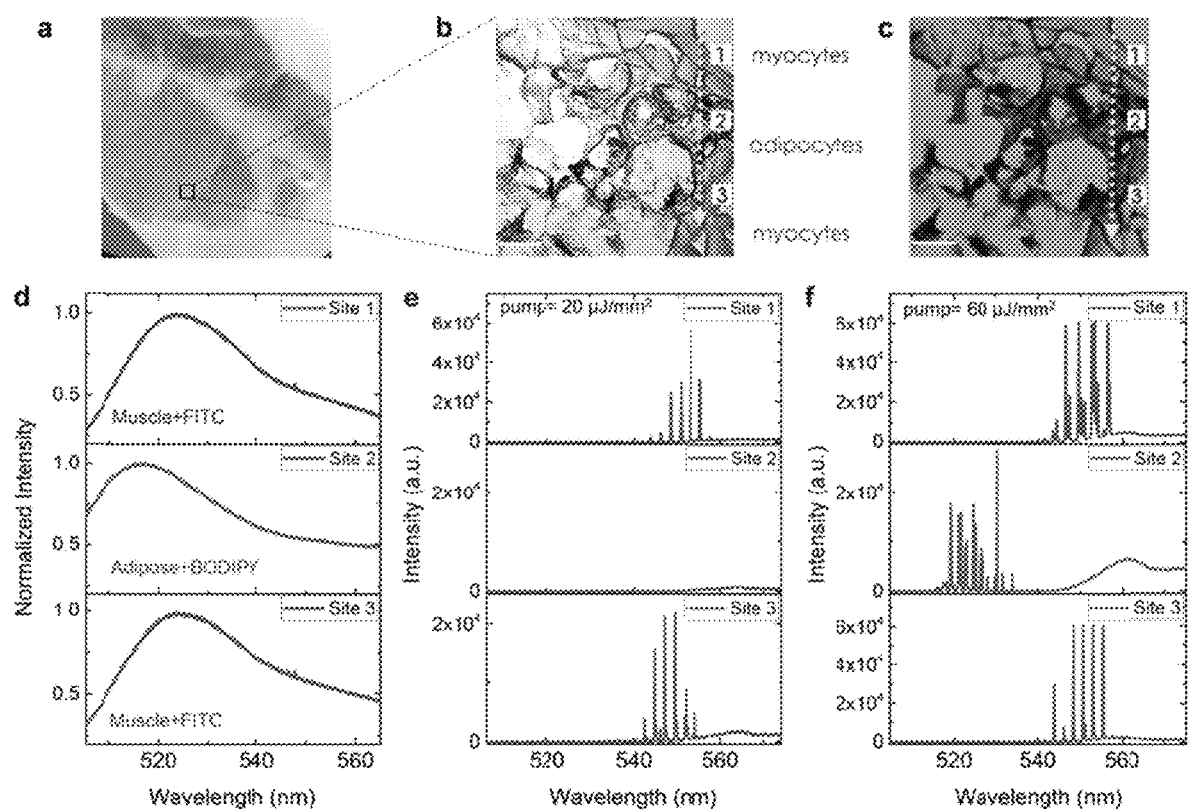

FIGS. 10A-10F show multiplexed lasing in hybrid tissue. FIG. 10A is a photograph of a piece of hybrid tissue. The black square shows the region of interest where muscle tissue and adipose tissue cannot be distinguished directly by their macroscopic appearance. FIG. 10B shows a DIC image of the hybrid tissue in FIG. 10A containing an irregular mixture of muscle tissue and adipose tissue. Three representative sites are taken on (site 1) muscle tissue, (site 2) adipose tissue, and (site 3) muscle tissue, respectively, as the pump laser beam scanned along the dashed line. FIG. 10C shows a confocal image of the hybrid tissue dual-stained with FITC and BODIPY. FIG. 10D shows fluorescence spectra of muscle tissue with FITC (site 1), adipose tissue with BODIPY (site 2), and muscle tissue with FITC (site 3). FIG. 10E shows lasing spectra taken at site 1, 2, and 3, respectively, when the pump energy density is set between the threshold for muscle tissue and for adipose tissue (20 µJ/mm²). FIG. 10F shows lasing spectra taken at sites 1, 2, and 3, respectively, when the pump energy density is above the threshold for both muscle tissue and adipose tissue (60 $\mu J/mm^2$). The increase in the background emission spectra around 560 nm in FIGS. 10E and 10F is due to the fluorescence leaking out of the FP cavity caused by the reduced reflectivity of the dielectric mirror. Scale bars in FIGS. 10B and 10C are 40 μm.

Figures 11A, 11B, 11C:
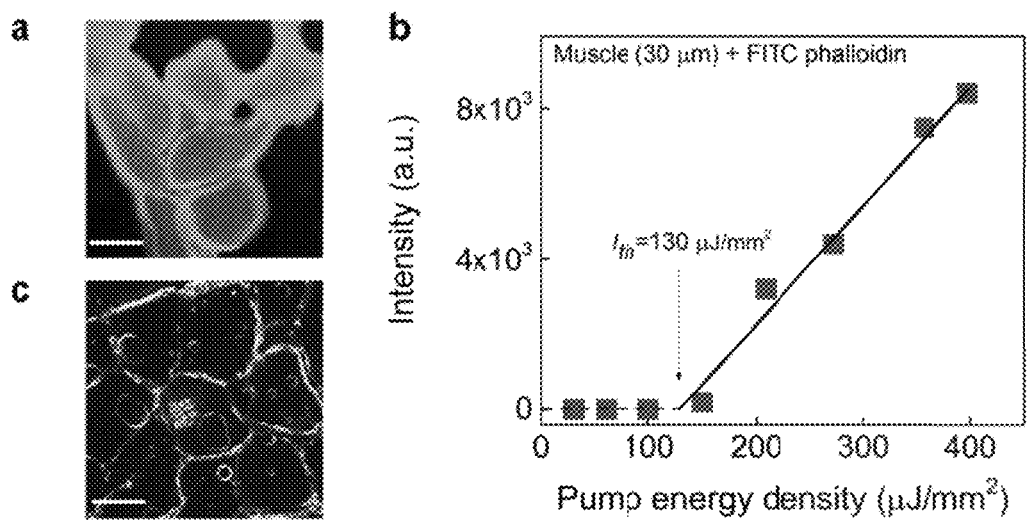

FIGS. 11A-11C. FIGS. 11A-11C shows lasing in muscle tissue with FITC conjugates with a laser emission scanning microscope device prepared in accordance with certain aspects of the present disclosure. FIG. 11A shows confocal fluorescence image of the muscle tissue stained with FITC-phalloidin. The muscle is arranged longitudinally. FIG. 11B shows spectrally integrated (530 nm-545 nm) laser output as a function of pump energy density. The solid line is the linear fit above the threshold, which is approximately 130 $\mu J/mm^2$. FIG. 11C shows CCD images of lasing emission above the lasing threshold. All scale bars, 20 μm. Tissue thickness=30 μm. [FITC-phalloidin]=10 μM. Excitation wavelength=465 nm.

Figures 12A, 12B, 12C, 12D, 12E, 12F, 12G, 12H, 12I, 12J:
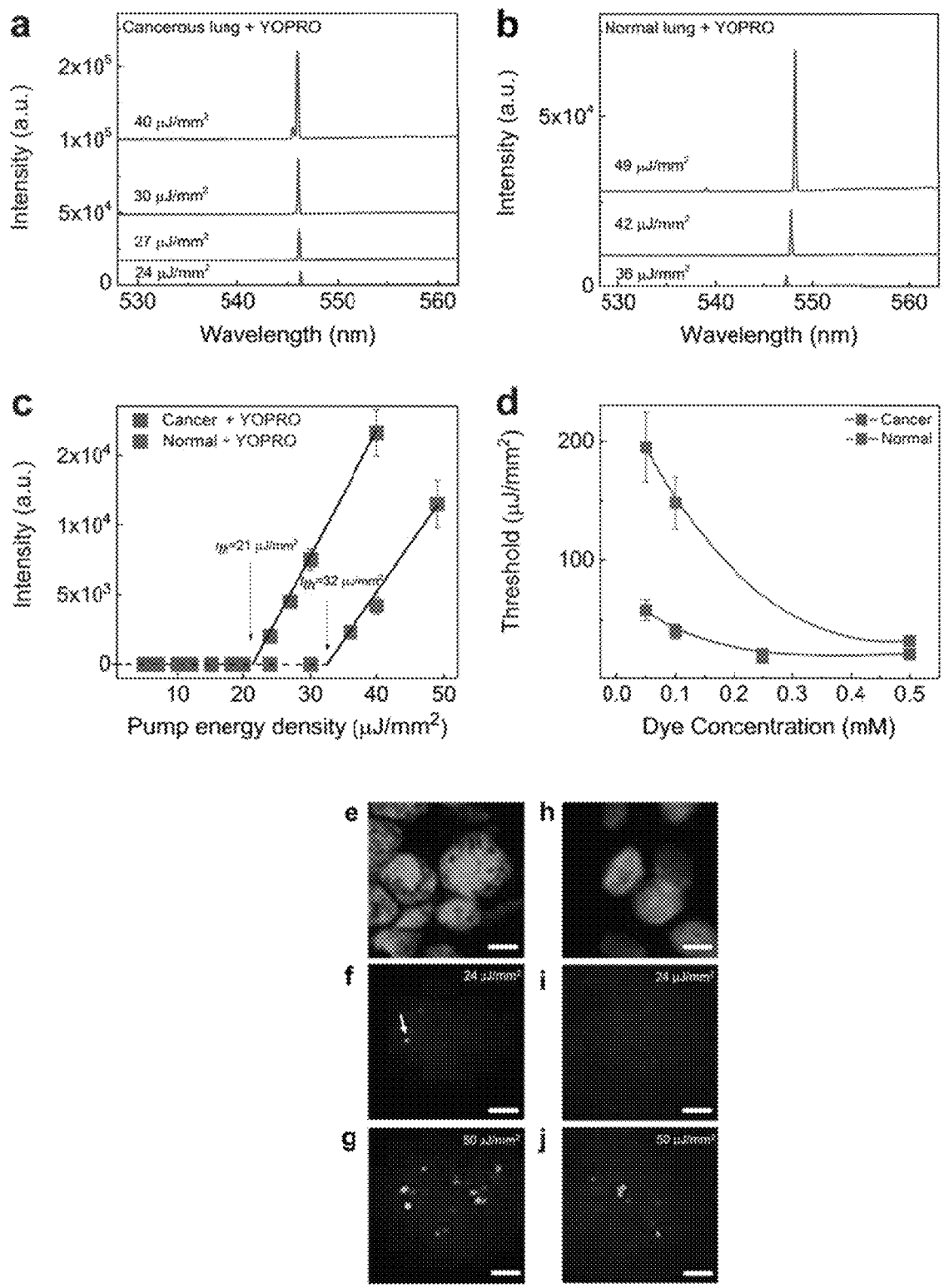

FIGS. 12A-12J. FIGS. 12A-12J show lasing with a laser emission scanning microscope device prepared in accordance with certain aspects of the present disclosure in lung tissue with nucleic acid staining dye. FIGS. 12A-12B show examples of lasing spectra of a human lung cancer tissue (FIG. 12A) and normal lung tissue (FIG. 12B), stained with YOPRO under various pump energy densities. Curves are vertically shifted for clarity. FIG. 12C shows a comparison of spectrally integrated (540 nm-550 nm) laser output as a function of pump energy density extracted from the spectra in FIGS. 12A-12B. The solid lines are the linear fit above the lasing threshold, indicating a lasing threshold of 21 $\mu J/mm^2$ for cancer tissue and 32 $\mu J/mm^2$ for normal lung tissue. FIG. 12D shows a lasing threshold with different concentrations of YOPRO used to stain the tissue. Error bars are based on three individual measurements at different sites. FIG. 12E shows confocal fluorescence image of a lung cancer nucleus (shown in green). FIGS. 12F-12G show CCD images of the laser output from a nucleus in a lung cancer tissue (FIG. 12F) around (24 $\mu J/mm^2$) and (FIG. 12G) far above (50 $\mu J/mm^2$) the lasing threshold. The image shows clearly several tiny, sharp "lasing stars" within the nucleus, whereas the background fluorescence is significantly suppressed. The laser beam is focused on only one of the cells in the tissue. FIG. 12H shows a confocal image of a normal lung nucleus (in green). FIGS. 12I-12J show CCD images of the laser output from a nucleus in a normal lung tissue (FIG. 12I) below (24 $\mu J/mm^2$) and (FIG. 12J) above (50 $\mu J/mm^2$) the lasing threshold. All the tissues in FIGS. 12A-12J are stained with YOPRO (0.5 mM in bulk staining solution) under the same preparation conditions. The thicknesses of the tissues (the cavity length) are fixed at 15 μm. All scale bars, 5 μm.

Figures 13A, 13B, 13C, 13D, 13E:
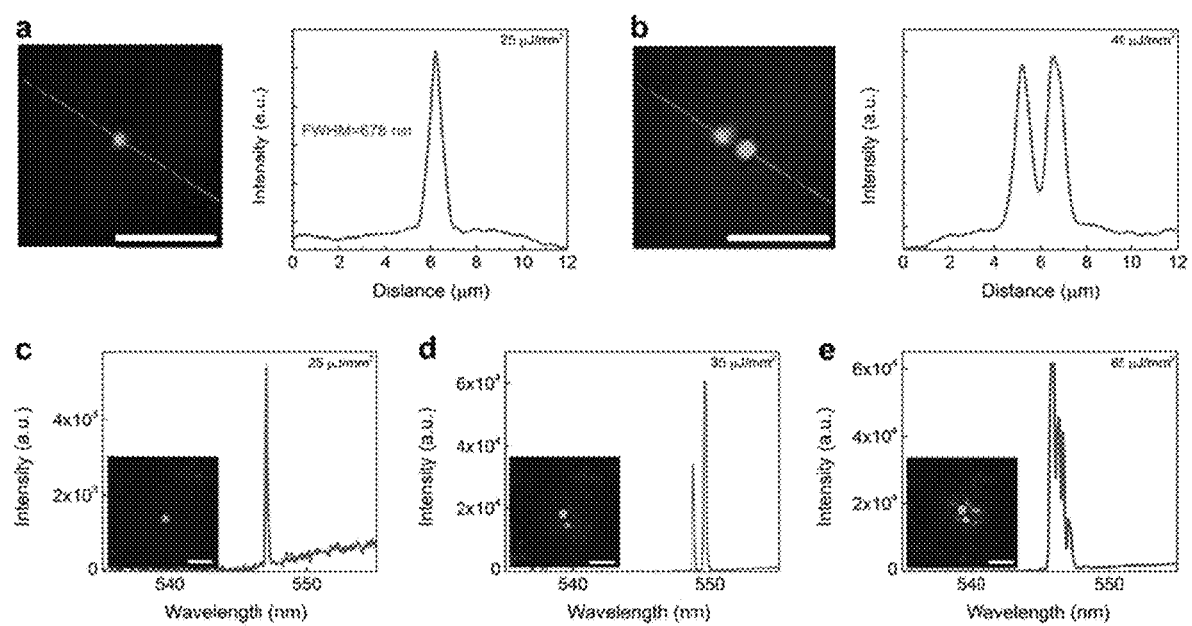

FIGS. 13A-13E. FIGS. 13A-13E show optical resolution of subcellular tissue lasers for a laser emission scanning microscope device prepared in accordance with certain aspects of the present disclosure. FIG. 13A is an enlarged CCD image (left) of a single laser emission point from a human lung tissue stained with YOPRO. The intensity profile along the yellow dotted line (right) shows the FWHM of the Point Spread Function (PSF) of 678 nm. FIG. 13B shows an enlarged CCD image (left) of two adjacent lasing points. The intensity profile along the yellow dotted line (right) shows two well-resolved peaks. The Rayleigh criterion (the smallest resolvable distance) between two laser emissions is estimated to be about FIGS. 13C-13E show lasing spectra of independent subcellular lasers within the same focal beam spot by increasing the pump energy density from (FIG. 13C) 25 $\mu J/mm^2$, (FIG. 13D) 35 $\mu J/mm^2$, to (FIG. 13E) 65 $\mu J/mm^2$. The inset shows the CCD image of corresponding laser emissions, in which FIG. 13C is an example of a single laser, FIG. 13D is an example of two independent lasers with different lasing thresholds, and FIG. 13E is an example of multiple independent lasers emerging simultaneously at high pump intensities. Note that the slight increase in the background emission beyond 560 nm in FIGS. 13C-13E is due to the fluorescence leaking out of the FP cavity caused by the reduced reflectivity of the dielectric mirror. NA=0.42. Laser excitation=465 nm. All scale bars, 5 μm.

Figures 14A, 14B, 14C, 14D, 14E:
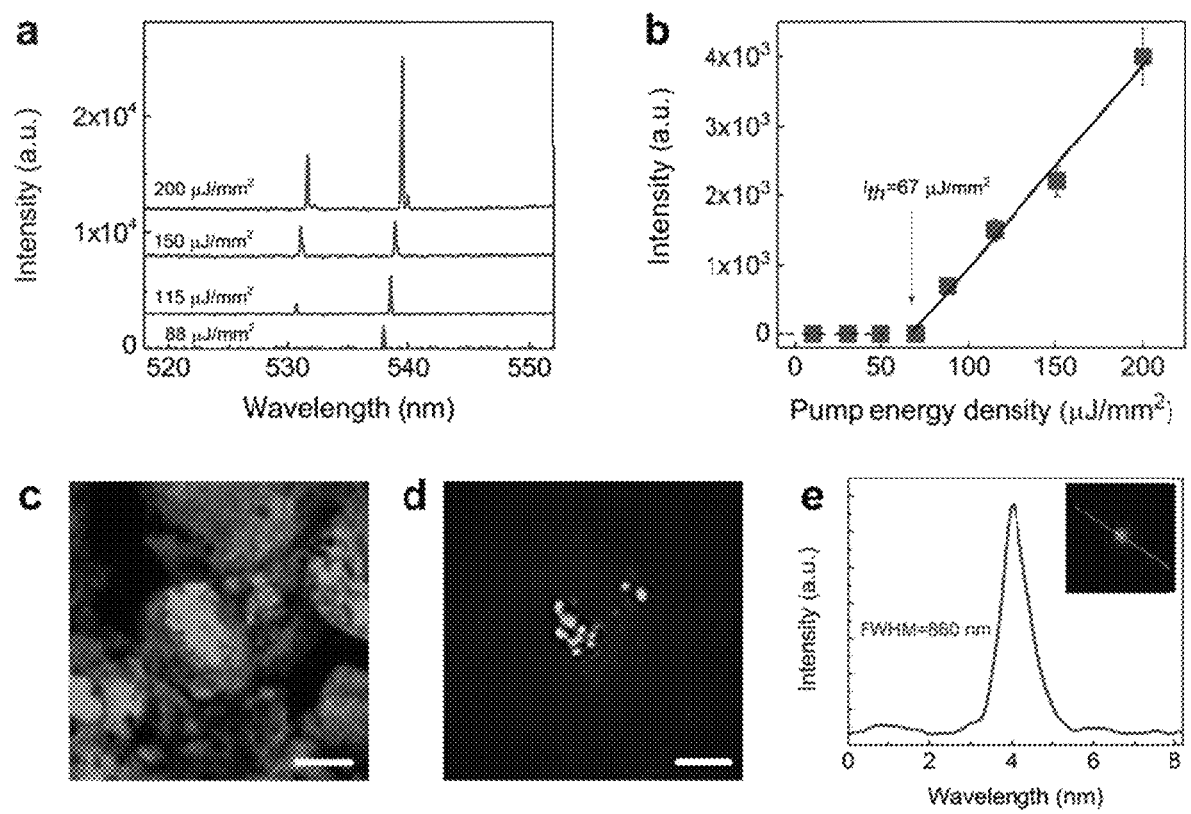

FIGS. 14A-14E. FIGS. 14A-14E show lasing with a laser emission scanning microscope device prepared in accordance with certain aspects of the present disclosure in lung tissue with an anti-EGFR-FITC. FIG. 14A shows examples of lasing spectra of a human lung cancer tissue with n-EGFR expression stained with anti-EGFR-FITC under various pump energy densities. Curves are vertically shifted for clarity. FIG. 14B shows spectrally integrated (530 nm-540 nm) laser output as a function of pump energy density extracted from the spectra in FIG. 14A. The solid lines are the linear fit above the lasing threshold, indicating a lasing threshold of 67 $\mu J/mm^2$. FIG. 13C shows a confocal microscopic image of a cell with n-EGFR expression in the lung cancer tissue. FIG. 13D shows CCD images of the laser output from the same lung cancer tissue above the lasing threshold (125 $\mu J/mm^2$). The image shows clearly several tiny laser emissions corresponding to the highest concentrated EGFR locations within the nuclei. The laser beam is mainly focused on one of the cells in the tissue. FIG. 14E is the intensity profile along the yellow dotted line (inset) shows the FWHM of PSF is measured to be 860 nm. All the tissues in FIGS. 14A-14E are stained with anti-EGFR-FITC (0.5 mM in bulk staining solution) under the same preparation conditions. The thicknesses of the tissues (the cavity length) are fixed at 15 μm. NA=0.42. Laser excitation=465 nm. All scale bars, 10 μm.

Figures 15A, 15B, 15C, 15D, 15E, 15F, 15G, 15H:
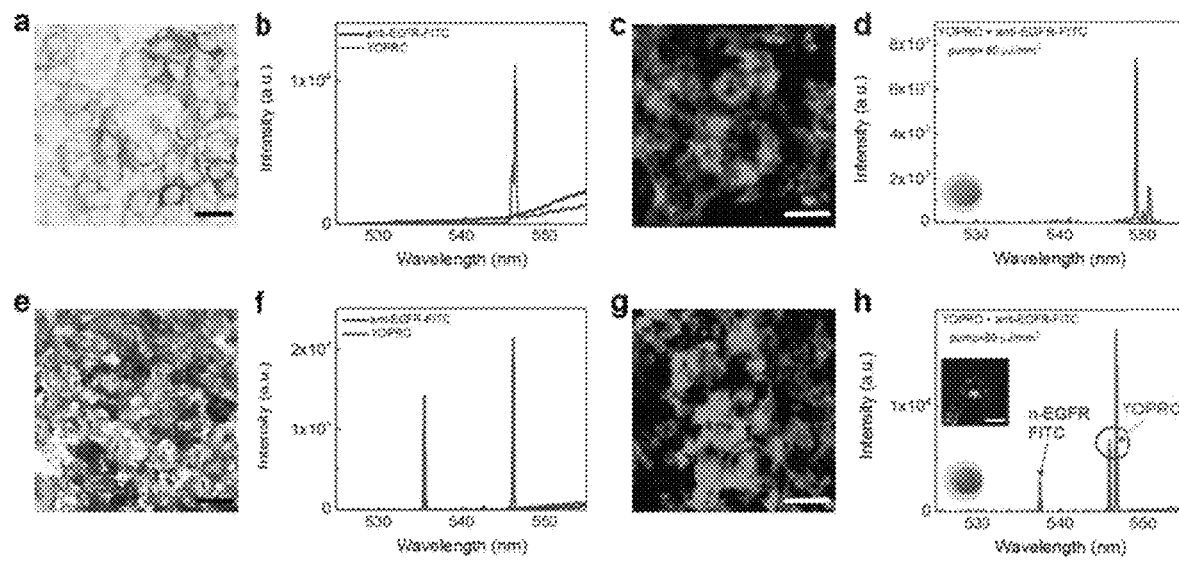

FIGS. 15A-15H. FIGS. 15A-15H show multiplexed lasing with a laser emission scanning microscope device prepared in accordance with certain aspects of the present disclosure in lung cancer tissues. FIG. 15A shows a Brightfield IHC image of a human lung cancer tissue without n-EGFR (Tissue type #1). FIG. 15B shows a lasing spectra of Type #1 tissues stained separately with YOPRO (red curve) and anti-EGFR-FITC (blue curve). Pump energy density=40 $\mu J/mm^2$ and 80 $\mu J/mm^2$ for YOPRO and FITC, respectively. FIG. 15C shows a confocal microscopic image of Type #1 tissue dual-stained with YOPRO and anti-EGFR-FITC. FIG. 15D shows lasing spectra of a Type #1 tissue dual-stained with YOPRO and EGFR-anti-FITC. The laser is focused on a single nucleus within the lung cancer tissue. The pump energy density is set above the threshold for both YOPRO and FITC under single excitation wavelength. FIG. 15E is a Brightfield IHC of a human lung cancer tissue with n-EGFR overexpression (Tissue type #2). FIG. 15F is a lasing spectra of Type #2 tissues stained separately with YOPRO (red curve) and anti-EGFR-FITC (blue curve). Pump energy density=40 $\mu J/mm^2$ and 80 $\mu J/mm^2$ for YOPRO and FITC, respectively. FIG. 15G is a confocal microscopic image of Type #2 tissue dual-stained with YOPRO and anti-EGFR-FITC. FIG. 15H is a lasing spectra of tissue dual-stained with YOPRO and anti-EGFR-FITC. The laser is focused on a single nucleus within the lung cancer tissue. The pump energy density is set above the threshold for both YOPRO and FITC under single excitation wavelength. The inset CCD image is the demonstration of a n-EGFR laser emission, which indicates that EGFR colocalizes with the nucleus. Note that the slight increase in the background emission beyond 560 nm in FIGS. 15B, 15D, 15F, and 15H is due to the fluorescence leaking out of the FP cavity caused by the reduced reflectivity of the dielectric mirror. All scale bars, 20 μm.

Figures 16A, 16B, 16C, 16D, 16E, 16F:
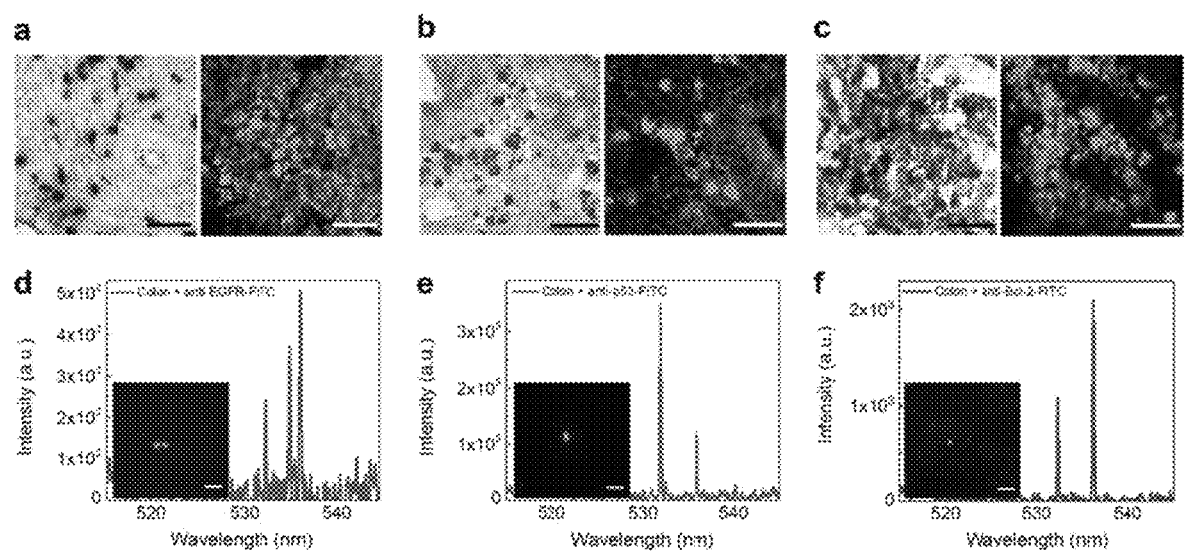

FIGS. 16A-16F. FIGS. 16A-16F show lasing with a laser emission scanning microscope device prepared in accordance with certain aspects of the present disclosure in colon cancer tissue with FITC conjugated antibodies. FIGS. 16A-16C show Brightfield IHC and confocal microscopic images of human colon cancer tissues with n-EGFR (FIG. 16A), n-p53 (FIG. 16B), and n-Bcl-2 (FIG. 16C) overexpression. FIGS. 16D-16F show lasing spectrum of colon cancer tissue prepared with anti-EGFR-FITC (FIG. 16D), anti-p53-FITC (FIG. 16E), and anti-Bcl-2-FITC (FIG. 16F). The insets in FIGS. 16D-16F show the CCD image of representative "lasing stars" from the colon tissues when pumped at the nuclei. Tissue thickness=15 μm. Excitation wavelength=465 nm. Pump energy density=220 μJ/mm$^2$, 280 μJ/mm$^2$, and 300 μJ/mm$^2$ for FIGS. 16D-16F, respectively. All scale bars for FIGS. 16A-16C, 50 μm; FIGS. 16D-16F, 5 μm.

Figure 17:
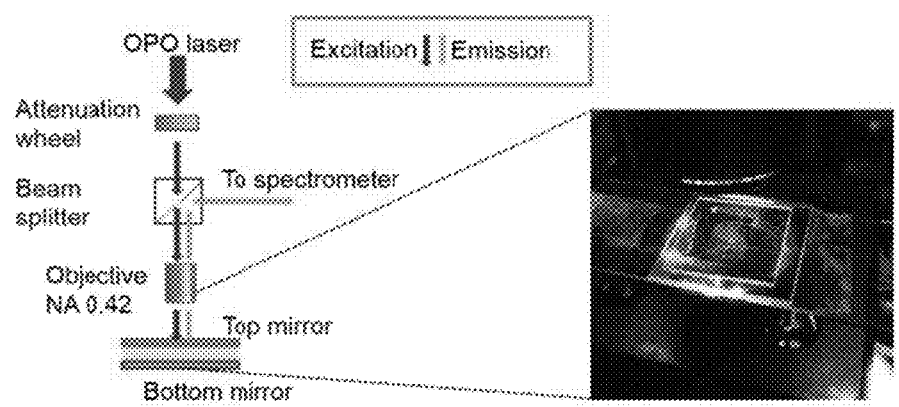

FIG. 17 is a schematic of the experimental setup and structure of a laser emission scanning microscope device prepared in accordance with certain aspects of the present disclosure. The photograph on the right shows a lung tissue section sandwiched between the two mirrors while pumped by 465 nm excitation source.

Figure 18A:
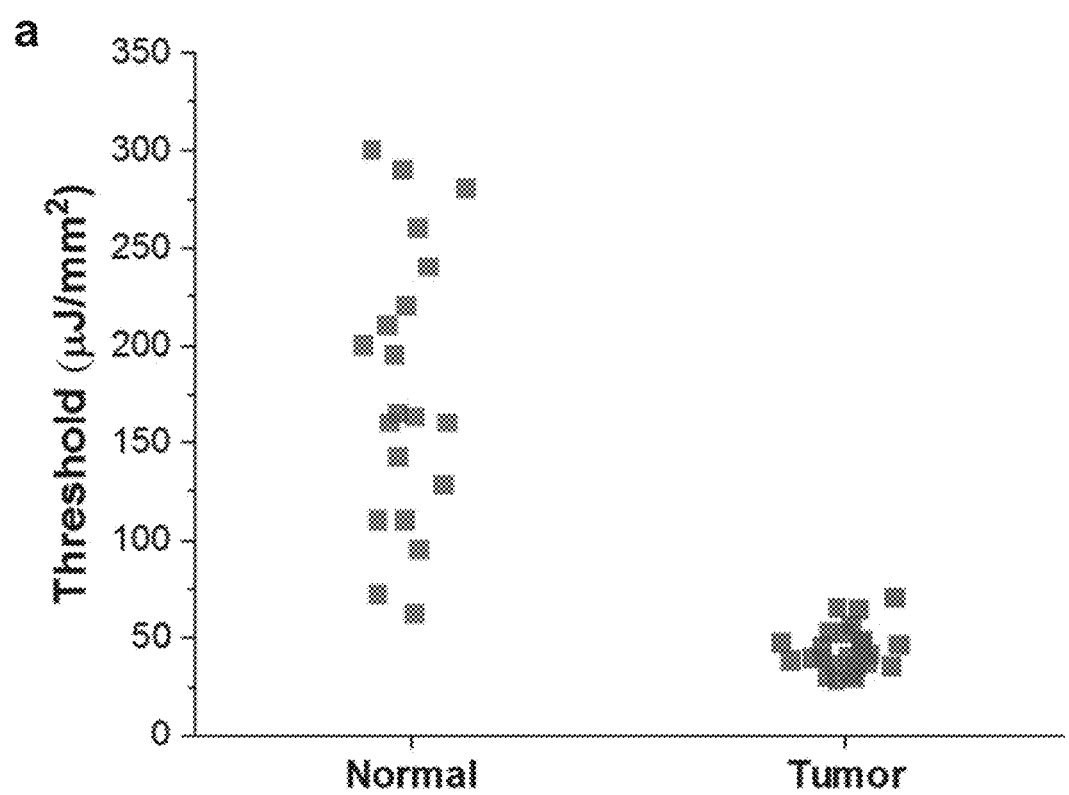
Figures 18B, 18C:
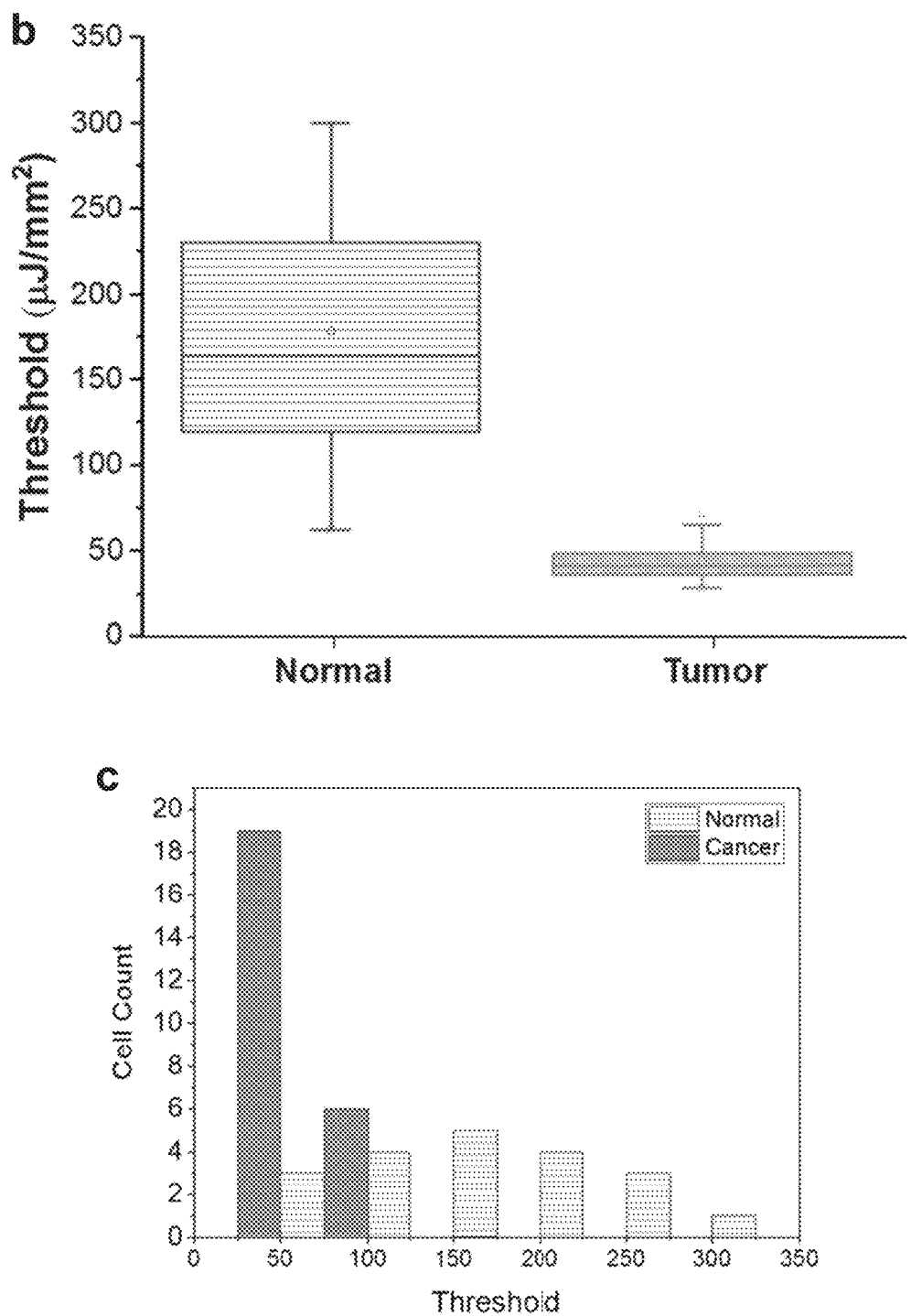
Figure 18D:
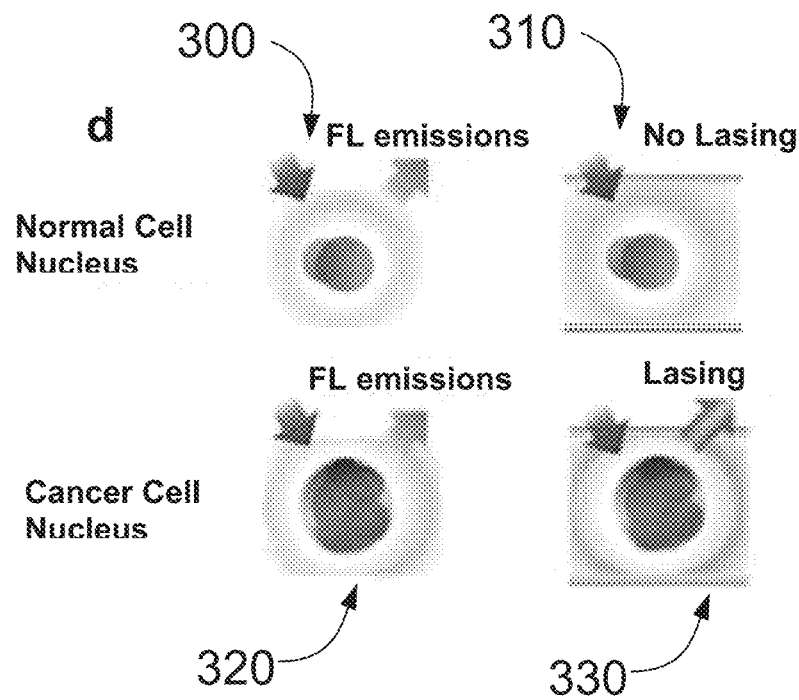

FIGS. 18A-18D. FIG. 18A shows comparative lasing thresholds for tumor tissue and normal tissue samples. FIG. 18B shows a median distribution of lasing thresholds for the tumor tissue and normal tissue samples. FIG. 18C shows a cell count versus lasing threshold for comparative tumor and normal tissue samples. FIG. 18D shows a schematic where fluorescence emission is detected in both normal and cancer cell nuclei, but laser emission is only detected in cancer cell nuclei when the pump energy density is between the lasing thresholds for tumor tissue and normal tissue.

Figure 19:
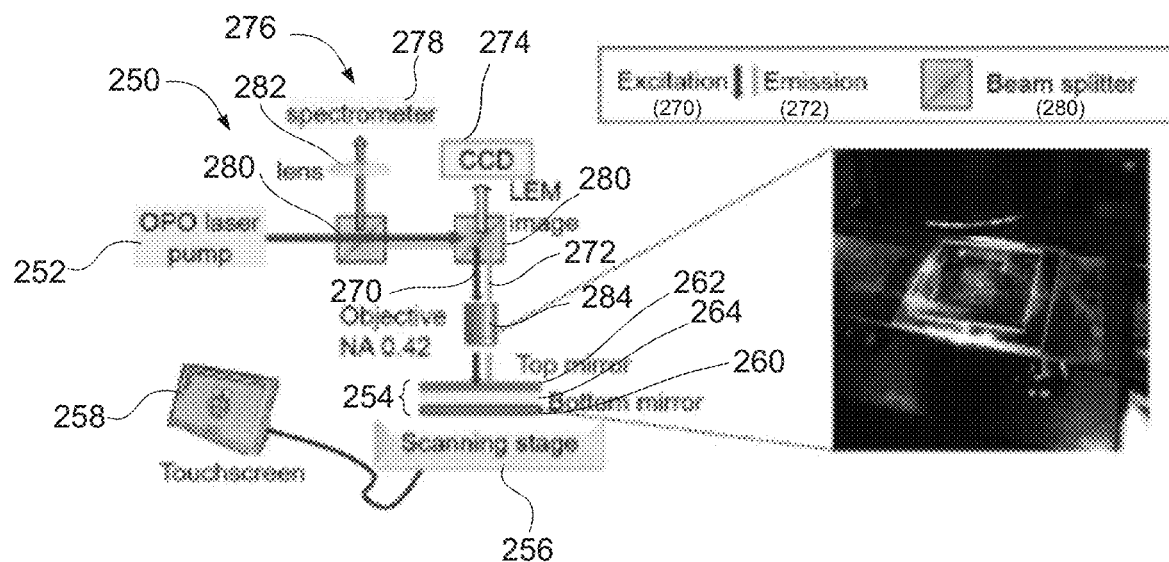

FIG. 19 shows yet another embodiment of a scanning microscope device for scanning/detection of a tissue sample.

Figures 20A, 20B, 20C, 20D, 20E, 20F, 20G:
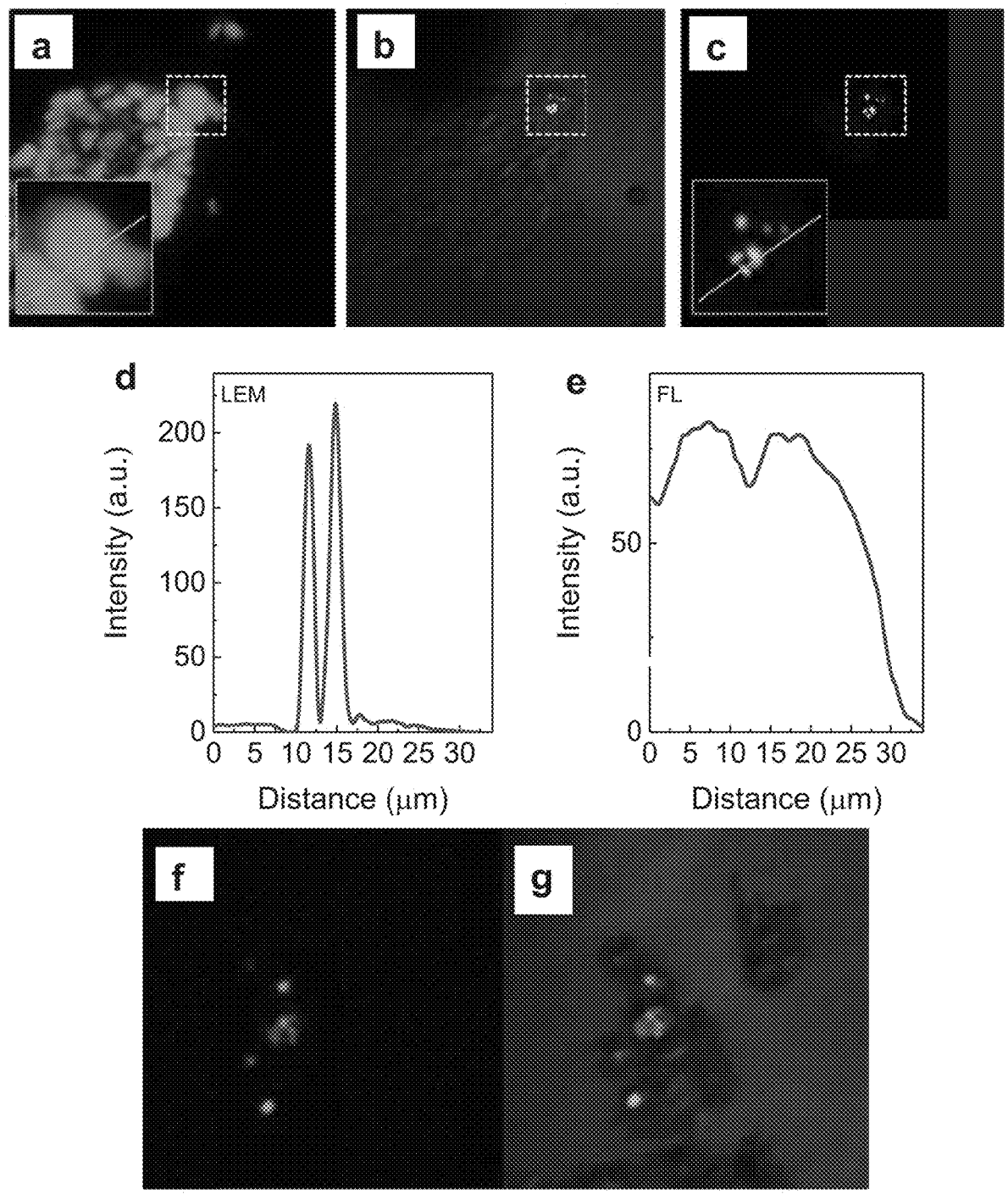

FIGS. 20A-20G illustrate concurrent acquisition of fluorescent, bright field images, and lasing emission images from the same tissue sample in accordance with certain aspects of the present disclosure. FIG. 20A is a fluorescent microscopic image of a tissue sample. FIG. 20B is a bright field CCD image of the same tissue sample. FIG. 20C is a lasing emission CCD image of the same tissue sample. Laser is only pumped within the dashed square regions in FIGS. 20B-20C. The bottom-left squares in FIGS. 20A and 20C show enlarged images of the dashed squares in respective images. For a detailed comparison, FIGS. 20D and 20E show an intensity profile along the lines in images in FIGS. 20A and 20C, respectively. Scale bars, 30 μm. FIGS. 20F and 20G provide another example showing lasing star emissions from a tissue sample. FIG. 20F shows pure lasing emission imaging, while FIG. 20G shows simultaneous acquisition of lasing emission and bright field imaging.

Figure 21:
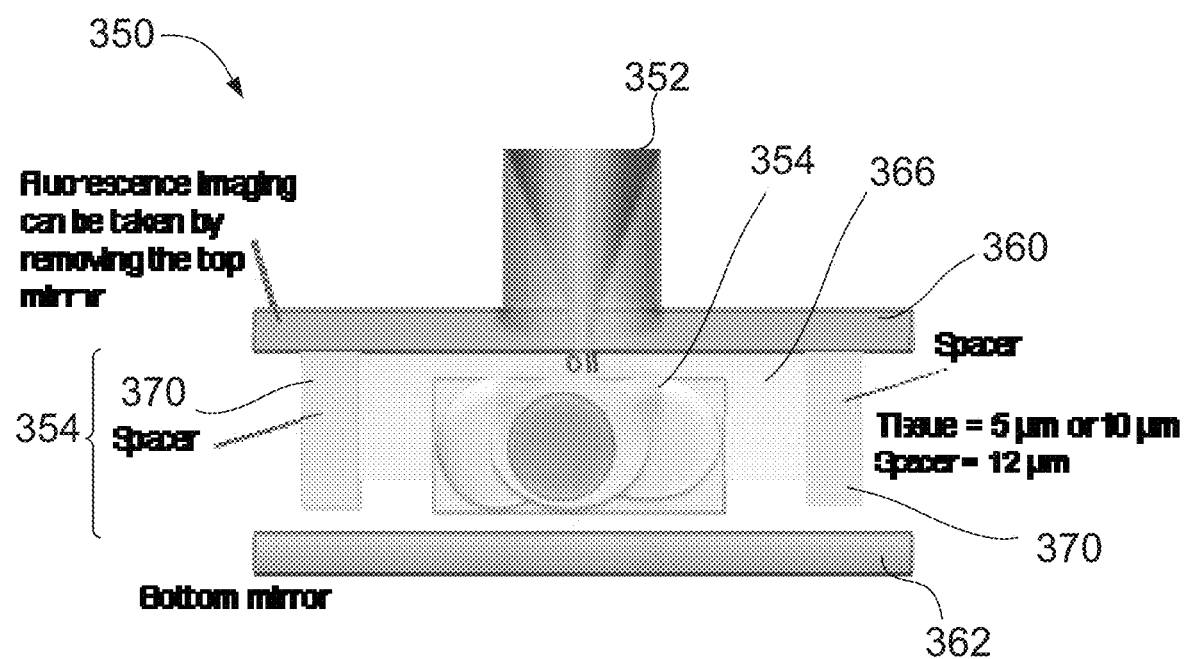

FIG. 21 shows another embodiment of a laser emission scanning microscope device having a removable first reflection surface with spacers for promoting uniformity of thickness in the scanning cavity.

Figures 22A, 22B, 22C, 22D:
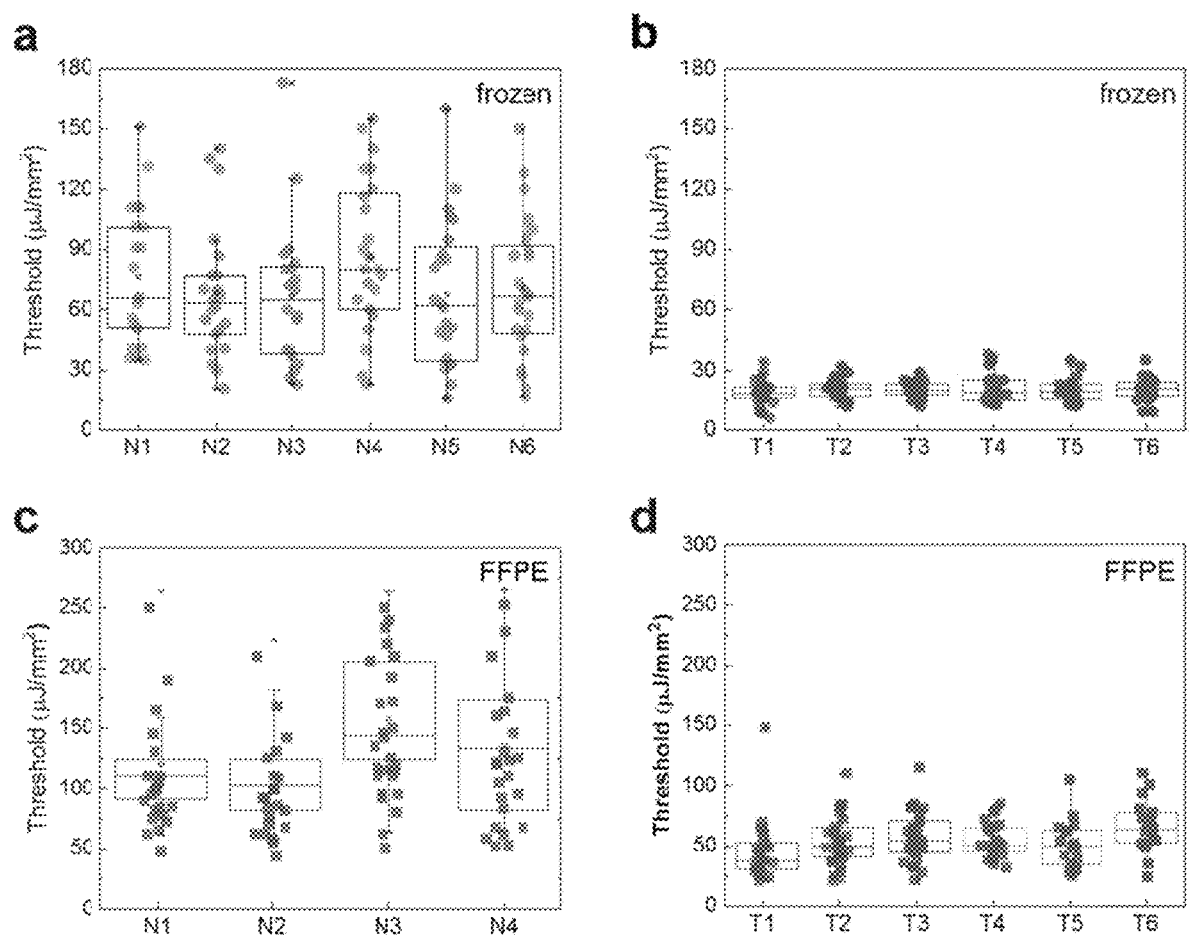

FIGS. 22A-22D. FIGS. 22A-22B show statistics of cancer/normal cell lasing thresholds in frozen tissues, while FIGS. 22C-22D show FFPE-preserved tissues. FIG. 22A shows statistics of normal cell lasing thresholds of normal lung tissues from six patients, labeled as N1-N6, which have been cryogenically frozen. FIG. 22B shows statistics of tumor cell lasing thresholds from six individual lung cancer patients labelled as T1-T6, which have been cryogenically frozen. FIG. 22C shows statistics of normal cell lasing thresholds of normal lung tissues from four patients, labeled as N1-N4, treated via FFPE. FIG. 22D shows statistics of tumor cell lasing thresholds from six individual lung cancer patients labelled as T1-T6, treated via FFPE.

Figure 23:
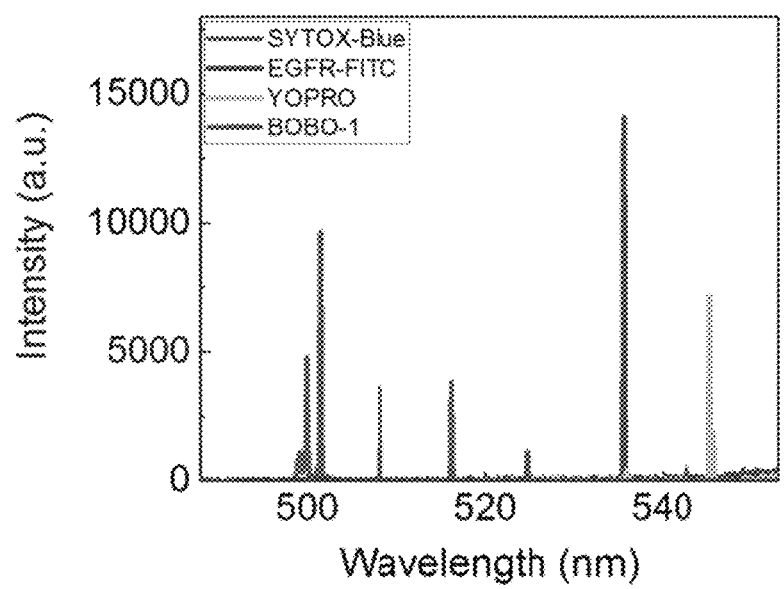

FIG. 23 shows wavelength versus intensity for four distinctive lasing emission wavelengths within a range of 500 nm-550 nm for four dyes (SYTOX-Blue, EGFR-FITC, YOPRO, and BOBO-1).

Figures 24A, 24B, 24C, 24D:
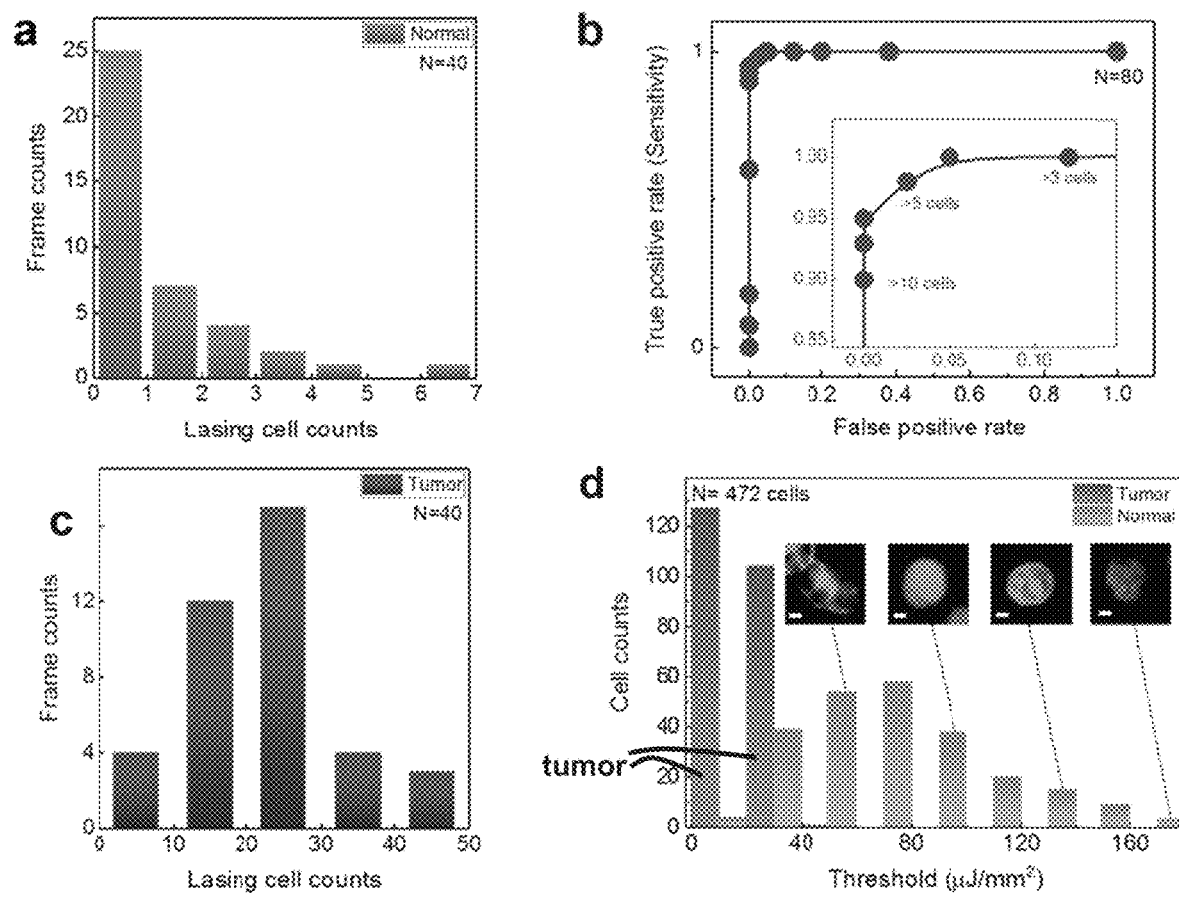

FIGS. 24A-24D show sensitivity and specificity of the lasing emission microscopy (LEM) technique provided by certain aspects of the present disclosure. FIGS. 24A-24D show a histogram of a number of lasing cells per frame for normal tissues and cancer tissues. FIG. 24A shows lasing cell counts per frame count for normal cells, while FIG. 24C shows lasing cell counts per frame count for tumor cells. FIG. 24B shows a Receiver Operation Characteristic (ROC) curve. FIG. 24D shows a histogram of lasing cells in tissues under different excitation intensity. More specifically, FIG. 24D shows lasing threshold per cell counts for tumor and normal cells (tumor cell counts are designated, the remainder of counts are normal cells).

Figures 25A, 25B, 25C, 25D, 25E, 25F:
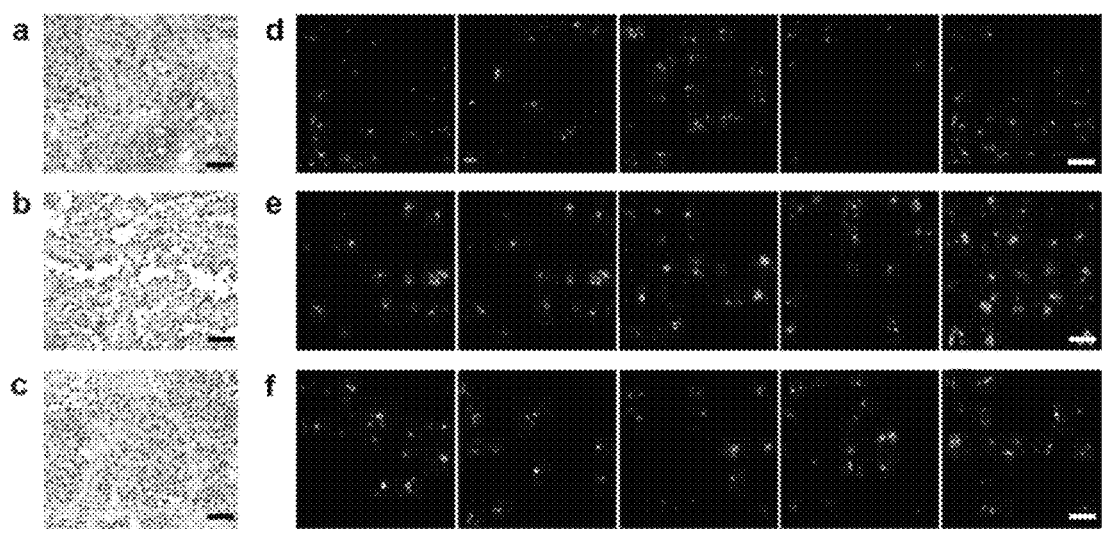

FIGS. 25A-25F show early stage lung cancer tissue detection by use of laser emission microscopy techniques according to certain aspects of the present disclosure. Tissue samples from three different patients diagnosed with early stage lung cancer are shown in FIGS. 25A-25C, respectively. 5 sections are scanned with a laser emission microscope (LEM) under a fixed pump energy density of 30 μJ/mm$^2$. FIG. 25D corresponds to lasing emission scans from the tissue sample shown in FIG. 25A. FIG. 25E corresponds to lasing emission scans from the tissue sample shown in FIG. 25B. FIG. 25F corresponds to lasing emission scans from the tissue sample shown in FIG. 25C.

Figure 26:
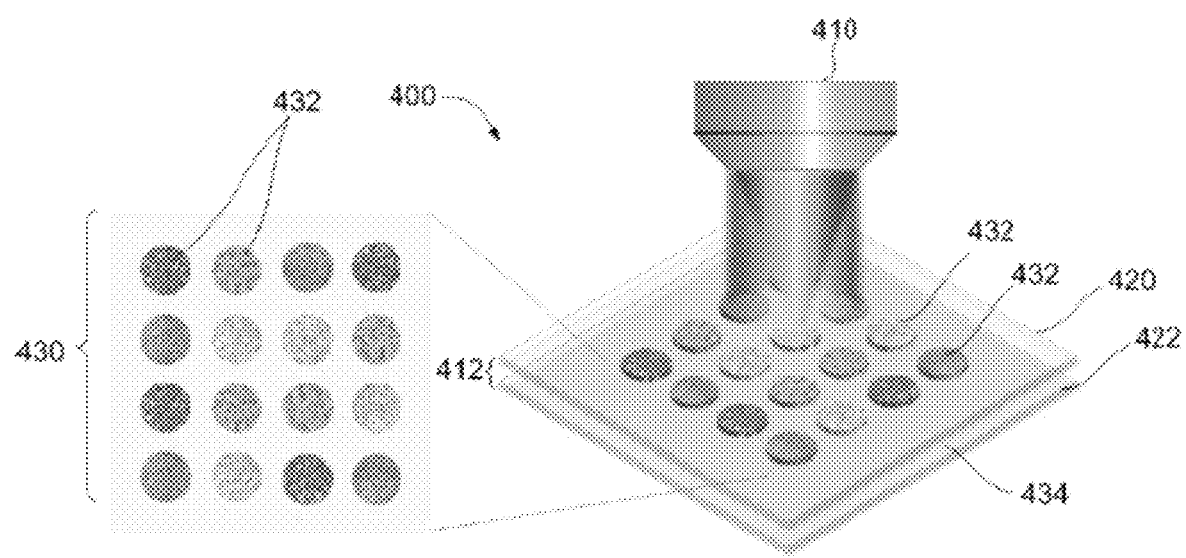

FIG. 26 shows yet another embodiment of a scanning microscope device for scanning/detection of a tissue sample in the form of a tissue microarray.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Tissues, which comprise a plurality of cells embedded in an extracellular matrix, mimic more closely the actual complex biological environment in a living body. However, the successful use of conventional biolasers in sensing tissues has been limited. Many of the biolasers that have been used for scanning tissues are random lasers that rely on strong scatters (i.e., tissue inhomogeneities) to provide optical feedback for lasing and do not have a fixed cavity. Therefore, such biolasers are unable to provide predictable and trackable laser emission signals with precise locations on the tissue sample. In addition, the lasing characteristics (e.g., intensity and threshold) vary drastically from one tissue sample to another or from one spot to another in the same tissue sample due to the nature of random lasers.

Other biolasers are lipid droplet lasers based on whispering-gallery modes (WGM) that can only be used on very limited cells and tissue, requiring the internal spherical structures of an adipocyte, meaning that WGM lasers can only be used for fat tissues. Further, in both the random laser and the lipid droplet laser, the strong background emission from fluorophores and tissues themselves that do not participate in laser action can be coupled into the detection system (such as a spectrometer or photodetector) along with the actual lasing signal, thus considerably compromising the signal-to-background ratio (SBR) and hence the detection sensitivity and imaging contrast. Those drawbacks significantly limit practicality and applicability of the currently available biolasers for use in scanning tissue samples.

Figure 1A:
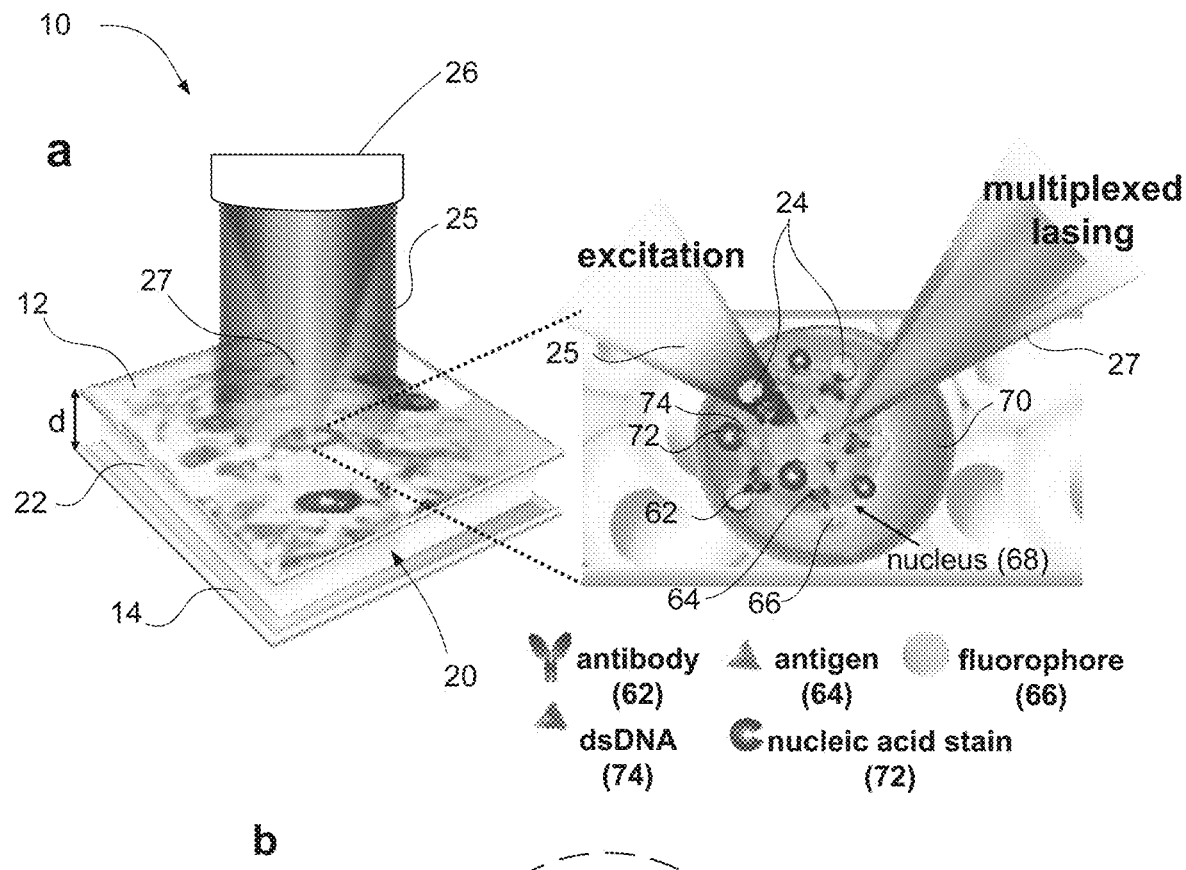

In certain aspects, the present disclosure contemplates a new scanning microscope device where laser emission, rather than conventional fluorescence may be used for imaging. Such a scanning microscope device is particularly suitable for scanning and detection within tissue samples. Hence, such a scanning microscope device is capable of creating two-dimensional scans and images of full tissue samples. For example, in one variation shown in FIG. 1A, a scanning microscope device 10 may include a first reflection surface 12 and a second reflection surface 14. The first reflection surface 12 may be planar. The second reflection surface 14 may be planar or arcuate. As shown in FIG. 1A, the second reflection surface 14 is planar. In alternative variations, the second reflection surface 14 may be arcuate, for example, concave, as further described below. The first and second reflections surfaces may have high reflectivity for a select wavelength or range of wavelengths of electromagnetic radiation, for example, greater than about 80% reflectivity, optionally greater than about 90% reflectivity, optionally greater than about 95% reflectivity, optionally greater than about 97% reflectivity, optionally greater than about 98% reflectivity, optionally greater than about 99% reflectivity, optionally greater than about 99.9% reflectivity, optionally greater than about 99.99% reflectivity, and in certain variations, optionally greater than 99.999% reflectivity for the wavelength or range of wavelengths. Further, the first and second reflections surfaces may concurrently permit a distinct wavelength or range of wavelengths of electromagnetic radiation to transmit and pass therethrough. The transmissivity of the select wavelength or range of wavelengths of electromagnetic radiation may be greater than 80% transmissivity, optionally greater than 90% transmissivity, optionally greater than 95% transmissivity, optionally greater than 97% transmissivity, optionally greater than 98% transmissivity, and in certain variations, optionally greater than 99% transmissivity for the distinct wavelength or range of wavelengths.

The scanning microscope device 10 further includes a scanning cavity 20 sized to receive a stationary tissue sample 22. The thickness (e.g., the cavity spacing) between the first reflection surface 12 and the second reflection surface 14 is greater than or equal to about 1 micrometers to less than or equal to about 50 micrometers. The tissue sample 22 may be in contact or disposed on the first reflection surface 12, while the second reflection surface 14 may be spaced apart from the tissue sample 22. Thus, a first lower surface of the stationary tissue sample 22 may be disposed on the first reflection surface 12 and a second surface of the stationary tissue sample 22 opposite to the first lower surface has a gap of less than or equal to about 20 micrometers from the second reflection surface 14. In certain variations, the tissue sample 22 may have a thickness of greater than or equal to about 1 microns ($\mu m$) to less than or equal to about 50 $\mu m$, optionally greater than or equal to about 5 $\mu m$ to less than or equal to about $\mu m$.

In certain variations, the tissue sample 22 comprises at least one fluorophore or lasing energy responsive species. For example, the tissue sample 22 may be stained with or naturally contains at least one lasing energy responsive species or fluorophore 24 (referred to herein as a fluorophore). The fluorophore 24 or other lasing energy responsive species may serve as a gain medium that can react to an external source of energy, for example, from a lasing energy pump source. The tissue sample may be any type of tissue comprising cells and an extracellular matrix, including plant or animal tissue, such as mammalian tissue. The tissue sample may be a histological sample which has been collected through a biopsy or other medical procedure. For example, the tissue sample may be a biopsy of human cancer tissue. At least a portion of the scanning cavity 20 corresponds to a Fabry-Pérot resonator cavity defined between the first reflection surface 12 and the second reflection surface 14.

Figure 2:
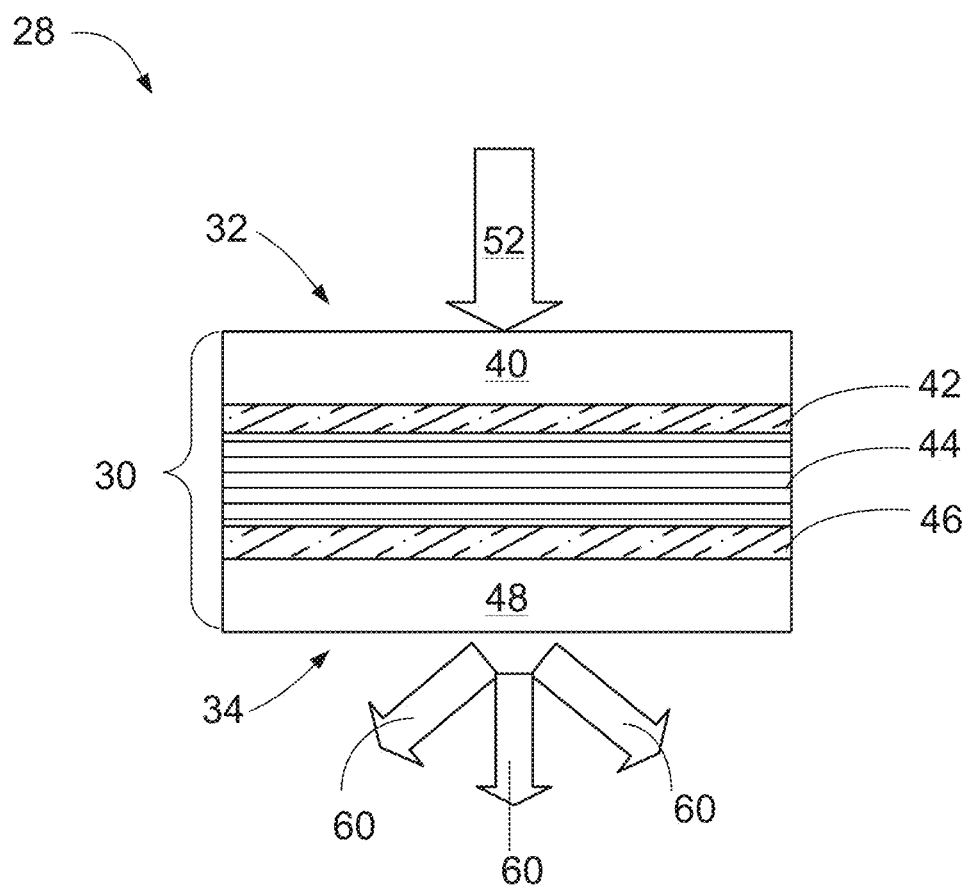
FIG. 2 shows a schematic of an operating principle for a Fabry-Pérot (FP) étalon resonator cavity.

By way of non-limiting example, a theoretical Fabry-Pérot etalon device 28 is shown as Fabry-Pérot assembly 30 in FIG. 2. The Fabry-Pérot assembly 30 defines a first side 32 and a second opposite side 34. The Fabry-Pérot assembly 30 includes a first transmissive substrate or layer 40 and a first reflective surface 42 disposed adjacent to the transmissive layer 40. A second reflective surface 46 is disposed on a side opposite to the first reflective surface 42. The first and second reflective surfaces may be formed by applying a dielectric material as a coating over a substrate, such as fused silica. The dielectric material may include multiple layers and may comprise a material selected from the group consisting of: $Ti_2O_5$ and/or $SiO_2$, by way of non-limiting example. Together, the first reflective surface 42 and the second reflective surface 46 form a pair of parallel reflective surfaces that sandwich at least one material 44, which may be a dielectric material or high refractive index material.

A source 52 of electromagnetic radiation or energy is directed towards the Fabry-Pérot assembly 30 along the first side 32. The Fabry-Pérot assembly 30 is capable of transmitting a portion of a spectrum of electromagnetic radiation from source 52 into the assembly 30. Thus, a portion of electromagnetic radiation enters through the first transmissive layer 40 and through the first reflective layer 42 to enter into the dielectric material layer 44. The path of the electromagnetic energy inside the interference filter depends upon whether the device is designed to be a transmission-type cavity, a reflection-type cavity, or a transmission and reflection-type cavity. As shown in the transmission-type Fabry-Perot based filter of FIG. 2, the portion of electromagnetic energy that enters the dielectric material 44 resonates due to internal reflection between the pair of parallel reflective surfaces 42, 46 serving as a Fabry-Perot based etalon interference filter. A portion of the electromagnetic energy 52 resonates within the Fabry-Pérot assembly 30 and may be transmitted through the second reflective surface 46 and second transmissive layer 48 generating an output 60 that exits the Fabry-Pérot assembly 30.

A scanning microscope device prepared in accordance with certain aspects of the present disclosure thus has a first reflection surface and a second reflection that define a Fabry-Pérot resonator cavity in a region of the scanning cavity. More specifically, a high-Q Fabry-Pérot microcavity is formed between the first reflection surface and the second reflection surface. Such a Fabry-Pérot resonator cavity may have a quality factor (Q) of greater than or equal to about $1 \times 10^2$. In certain variations, the Q-factor may be greater than or equal to about $1 \times 10^3$, optionally greater than or equal to about $1 \times 10^4$, optionally greater than or equal to about $1 \times 10^5$, optionally greater than or equal to about $1 \times 10^6$, and in certain variations, optionally greater than or equal to about $1 \times 10^7$. In certain aspects, the Q-factor may be greater than or equal to about optionally greater than or equal to about $1 \times 10^2$ to less than or equal to about $1 \times 10^7$.

With renewed reference to FIG. 1A, the scanning microscope device 10 prepared according to certain aspects of the present disclosure also includes a lasing energy or laser energy pumping source 25 directing energy at the scanning cavity 20. Laser pumping is the act of energy transfer from an external source into a gain medium of a laser. The energy may be absorbed in the gain medium that produces an excited state of the atoms. When the energy falls from the excited state to ground state, light is emitted. The lasing emissions typically occur over a lasing threshold for the gain medium. Laser pumping may be achieved optically by using a pump light source emitting excitation light at the range of wavelengths corresponding to an absorption band or bands of the fluorophores or other lasing energy responsive species present in the tissue sample 22 as a gain medium. Available pumping sources 25 include nanosecond lasers, femtosecond lasers, pulsed or continuous-wave lasers, flashlight, and tunable optical parametric oscillator sources, such as pulsed optical parametric oscillators (OPO). The lasing pump source may generate coherent electromagnetic radiation or energy, which is highly directional. Alternatively, pumping may be possible by fluorescent resonance energy transfer, electrically by injection current, bioluminescence or chemiluminescence. For pulsed laser, a pulse rate can range from a single pulse to a few thousand pulses per second. The pump wavelength depends on the absorption band of the fluorophore or lasing energy responsive species. In certain variations, the lasing threshold of the fluorophore or lasing energy responsive species may be from about 0.1 to about 1,000 micro-Joule per millimeter squared ($mJ/mm^2$). A laser system can thus include three elements, namely a pump source, a gain medium, and an optical cavity (e.g., a resonator). The resonator cavity may be the Fabry-Pérot resonator cavity described above that is created between the first reflection surface 12 and second reflection surface 14. The tissue sample 22 comprising at least one fluorophore or lasing energy responsive species may serve as a gain medium that generally amplifies light as energy is directed thereto from the laser pump 25. At least one of the second reflection surface 14 or the lasing energy source 25 may be translatable with respect to the stationary tissue sample 22 in the scanning cavity 20.

Further, the portion of the scanning cavity that defines a Fabry-Pérot resonator microcavity between the first and second reflection surfaces can use a plasmonic effect to enhance a local light-matter interaction and receive the pumping light more efficiently. The resonant wavelength or range of wavelengths of the laser cavity can be selected to overlap with the emission band or bands of fluorophores or lasing energy responsive species used as the gain medium.

The scanning microscope device also has a detector 26 for detecting emissions 27 generated within the scanning cavity 20, such as a photodetector or/and spectro-imaging system. Photodetectors may include a charge coupled device (CCD) imager, a CMOS imager, a photo-multiplier tube (PMT), an avalanche photodiode (APD), and the like. The spectro-imaging system may include a charge coupled device (CCD) imager, a spectrometer, combinations thereof, and the like. Such detectors may provide output to a computer processing unit, for example.

The tissue sample 22 can be stained with or otherwise comprise at least one lasing energy responsive species, which may be at least one fluorophore. According to certain exemplary embodiments of the present disclosure, a biological medium, such as the tissue sample, can be used as a gain medium. One example of a class of the biological media that can be used as the gain media and are responsive to lasing energy include fluorophores, like natural fluorescent compounds (e.g., chlorophyll and vitamins), fluorescent proteins, fluorescent polymers, fluorescent products generated by enzyme-substrate reactions, and dyes, quantum dots, and the like. A fluorescent protein can be in the form of a solution. In particular, the protein can be added to or naturally present within a living organism, such as within cells in tissue, which can contain the protein in the cytoplasm, nucleus, and/or organelles via the expression of fluorescent protein-encoding gene or the internalization or endocytosis of fluorescent protein-containing particles, by way of non-limiting example. The fluorescent protein can also be in the form of a solid, such as an aggregate (e.g., after drying of a solution) or a crystal. The protein crystal may have the advantage of having a low transmission loss. Where the tissue sample contains a fluorophore, the fluorophores serve as the laser gain medium. Upon external excitation, the tissue laser is achieved locally around the focal spot of the pump light by stimulating laser emissions from the fluorophore or other lasing energy responsive species.

Where the detector 26 is a photodetector, it can receive and detect one or more emissions (e.g., laser emissions) generated by the at least one lasing energy responsive species (e.g., at least one fluorophore) in the tissue sample from the scanning cavity. As noted above, at least one of the second reflection surface 14 or the laser energy pumping source 25 can translate or move with respect to the stationary tissue sample 22 contained in the scanning cavity 20. In this manner, after translation over the tissue sample 22, a two-dimensional scan of the tissue sample is generated by the scanning microscope device 10.

Thus, the scanning microscope device 10 can be used as a wavelength-multiplexed subcellular immuno-laser. The tissue sample 22 may be any type of tissue, such as a human cancer tissue (biopsy) that is sandwiched within a high-Q Fabry-Pérot (FP) cavity defined by the first reflective surface 12 and second reflective surface 14. The laser emission from the fluorophores or lasing energy responsive species is achieved upon external excitation from the laser energy pumping source 25. The stationary tissue sample may be a histological tissue sample stained with one or more lasing energy responsive species (e.g., one or more fluorophores) capable of associating with at least one biomarker within cells of the tissue. The lasing energy responsive species (e.g., fluorophore) can be site specific, meaning that it binds preferably to certain sites/locations (such as nucleic acids, cell membranes, etc.) in a tissue. The lasing energy responsive species (e.g., fluorophore) can also be attached to antibodies and DNA to bind preferably the antigens and DNA inside a tissue.

In certain variations, the stationary tissue sample 22 comprises at least two distinct lasing energy responsive species (e.g., at least two distinct fluorophores) associated with at least two distinct biomarkers. The inset of FIG. 1A shows the details of using two distinct species that are responsive to lasing energy. A first probe species 62 is an antibody-conjugated fluorophore dye (thus incorporating fluorophore 24 and antibody 64) that binds to an antigen 66 that may be present with a nucleus 68 of a cell 70. A second probe species 72 is a nucleic acid staining dye that is capable of binding to a double-stranded DNA molecule 74 on the nucleus 68. In this manner, the first probe species 62 and the second probe species 72 concomitantly achieve multiplexed laser emissions from a histological tissue sample 22. Laser emissions are achieved only when probe species (62 or 72) are bound to the nucleus 68 or targeted nuclear biomarker (64, 74) within the tissue. The photodetector 26 is thus capable of receiving and detecting multiplexed emissions from each distinct fluorophore or lasing energy responsive species (e.g., first probe species 62 or second probe species 71 that are associated with or bound to the respective biomarkers.

Figure 1B:
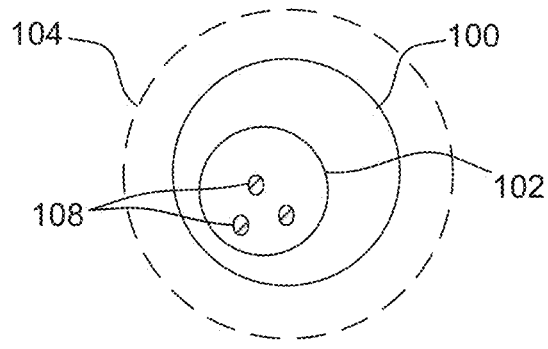
Figures 3A, 3B:
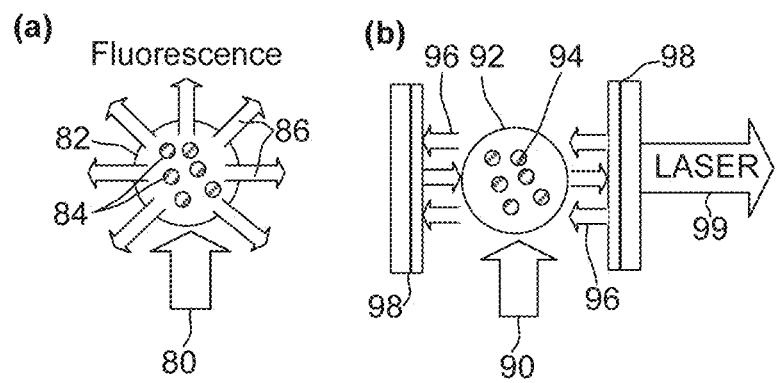
FIGS. 3A-3B show comparative schematics of a conventional fluorescence detection process as compared to a laser emission detection process in accordance with certain aspects of the present disclosure.

FIG. 1B shows a comparison between the traditional fluorescence emissions (shown on the top) and "star-like" select laser emissions (bottom) from a single nucleus. In FIG. 1B, a cell 100 includes a nucleus 102. In both the upper and lower diagrams, an excitation beam 104 is directed towards the cell 100. In the upper panel, a fluorescence emission 106 is generated that generally corresponds to the entire nucleus 102. In the lower panel, laser emissions 108 are generated within localized regions of the nucleus 102. More specifically, FIGS. 3A and 3B show a schematic for purposes of comparison. FIG. 3A shows a traditional fluorescence emission process, where energy 80 is directed at a cell 82 and spontaneous emission occurs. It should be noted that cell 82 is merely representative of various biomarkers that can be molecules in-vitro, inside cells, on cell surfaces, and/or in cells/tissues in a tissue sample. Energy 80 can cause excitation of fluorophores 84 within the cell 82. As the fluorophores 84 are excited by exposure to the energy 80, they generate fluorescent emissions 86.

FIG. 3B shows an illustration of laser emissions generated in accordance with certain aspects of the present disclosure, where an optical microcavity and gain medium are combined in the same environment. For excitation, energy 90 is directed at a cell 92 that may be found in a tissue sample. Fluorophores 94 within the cell 92 are excited by exposure to the energy 90. The fluorophores create stimulated laser emissions 96 having a predetermined range of wavelengths within a resonator cavity defined by a pair of reflective dielectric assemblies 98. Thus, instead of generalized fluorescence (i.e., spontaneous emission) in FIG. 3A, the optical laser in FIG. 3B employs laser emission (i.e., stimulated emission) as the sensing signal. Thus, a laser emission 99 of coherent electromagnetic energy with a predetermined wavelength or range of wavelengths thus exits the resonator cavity.

Due to the optical feedback provided by the laser cavity, a small modification in the gain medium induced by a small change in underlying biological interaction/process results in a significant change in the laser output characteristics. For example, the gain media in the type of optical laser in FIG. 3B is 20 to 100 times more sensitive in bioanalysis in-vitro (e.g., outside cells/tissues) than the corresponding fluorescence based method.

FIGS. 4A-4G show another embodiment of a scanning microscope device 110 and tissue samples and results from scanning/detection with such a microscopic device. A first reflection surface 120 and a second reflection surface 122 are provided that are both planar. A scanning cavity 130 sized to receive a stationary tissue sample 132 having at least one lasing energy responsive species (e.g., at least one fluorophore). The thickness of tissue (e.g., the cavity spacing) is denoted as d. As noted above, the thickness d between the first reflection surface 120 and the second reflection surface 122 is greater than or equal to about 1 micrometers to less than or equal to about 60 micrometers, optionally greater than or equal to about 1 micrometer and less than or equal to about 50 micrometers. The tissue sample 132 may be in contact or disposed on the first reflection surface 120, while the second reflection surface 122 may be spaced apart from the tissue sample 132. Thus, a first lower surface 133 of the stationary tissue sample 132 may be disposed on the first reflection surface 120 and a second surface 135 of the stationary tissue sample 132 opposite to the first lower surface 133 has a gap of less than or equal to about 20 micrometers from the second reflection surface 122.

At least a portion of the scanning cavity 130 corresponds to a high-Q Fabry-Pérot resonator cavity defined between the first reflection surface 120 and the second reflection surface 122 having a quality factor (Q) of greater than or equal to about $1 \times 10^2$ or any of those discussed above. A translatable unit 140 includes a lasing pump source and photodetector are provided. The lasing pump source in the translatable unit 140 is configured to direct energy at the scanning cavity 130. In one variation, the tissue sample 132 may be excited by a pulsed optical parametric oscillator (OPO). The photodetector is used with the scanning microscope device 110 and is configured to receive and detect one or more emissions generated by the at least one lasing energy responsive species (e.g., at least one fluorophore) in the tissue sample 132 from the scanning cavity 130. In the scanning microscope device 110, the lasing pump source in the translatable unit 140 moves/translates with respect to the stationary tissue sample 132 in the scanning cavity 130 to generate a two-dimensional scan of the tissue sample.

FIG. 4B shows data from an experiment where the tissue sample with fluorophores is excited by a pulsed optical parametric oscillator (OPO) (pulse width=5 ns; wavelength=465 nm). Normalized fluorescence emission spectra of FITC in water (blue curve) and BODIPY in ethanol (red curve). FIGS. 4C-4E show different types of tissues investigated, including muscle tissue (FIG. 4C), adipose tissue (FIG. 4D), and hybrid tissue (FIG. 4E). FIG. 4F shows microscopic images of myocytes stained with FITC (from left to right): differential interference contrast (DIC) image, confocal microscopy image, and overlap image. FIG. 4G shows microscopic images of adipocytes stained with BODIPY (from left to right): DIC image, confocal microscopy image, and overlap image. Scale bars, 20 µm.

FIGS. 5A-5C show examples of different Fabry-Pérot resonator cavities that may be defined between a first reflection surface and a second reflection surface in a scanning cavity of the microscope devices according to certain aspects of the present disclosure. In one variation, a Fabry-Pérot cavity can be formed by using two customized dielectric mirrors that serve as the first and second reflection surfaces. The top mirror (made by Qingdao NovelBeam Technology Co. Ltd, China) has a high reflectivity in the spectral range of 500-555 nm to provide optical feedback and high transmission around 465 nm for the pump light to pass through, whereas the bottom mirror (made by Evaporated Coating Inc., USA) has a slightly wider reflection band, as shown in FIG. 5B. Most of the top mirror is flat or planar, thus forming a plano-plano (p-p) Fabry-Pérot cavity with the flat bottom mirror. The top mirror may also have an arcuate structure, more specifically, a concave structure formed therein, which may be made by computer-controlled $CO_2$ laser ablation (before applying a dielectric coating), thus forming a plano-concave (p-c) Fabry-Pérot cavity that has better cavity stability and higher Q-factors than the p-p Fabry-Pérot cavity. The Q-factor for the p-p and p-c Fabry-Pérot cavities in one example, are on the order of $1 \times 10^4$ and $1 \times 10^5$, respectively, at a cavity length of 30 µm (in the absence of any tissues).

In FIG. 5C, a pump is shown a p-c Fabry-Pérot cavity is shown where a lasing pump source directs energy through the planar first reflection surface into the scanning cavity, through the second reflection surface in the concave region, so as to generate laser emission.

FIG. 6 shows another variation of a laser emission scanning microscope device 200 and results from scanning/detection with such a microscopic device 200. A lasing energy pump source 202 directs energy/electromagnetic radiation towards a scanning cavity 210. As shown, scanning cavity 210 includes a first reflection surface 212. A movable/translatable unit 220 is provided in the form of an optical fiber 222. The translatable unit 220 includes a scanning mirror 224 in the form of a concave dielectric mirror formed on a terminal end of the optical fiber 222 (shown in inset 1). A concave mirror can be fabricated by using $CO_2$ laser ablation to create a microwell on the center of the fiber facet and then coating it with a multi-layer dielectric mirror, for example. The translatable unit 220 is designed to selectively move over different regions of the scanning cavity 210. The translatable unit 220 also includes a photodetector 226. Thus, the concave scanning mirror 224 defines a second reflection surface. In certain aspects, a radius of curvature of the concave structure defining the mirror may be greater than or equal to about 5 micrometers to less than or equal to about 500 micrometers, optionally greater than or equal to about 50 micrometers to less than or equal to about 100 micrometers. In such variations, an intra-cavity laser beam waist is only about 1 micrometer. The scanning mirror 224 may have a diameter of greater than or equal to about 10 micrometers to less than or equal to about 100 micrometers.

The translatable unit 220 including the scanning mirror 224 that desirably translates with respect to a stationary tissue sample 230 in the scanning cavity 210. The stationary tissue sample 230 may include cells and/or tissues placed inside the scanning cavity 210 on the flat or planar first reflection surface 212. As the scanning mirror 224 on the translatable unit 220 moves to different positions over the tissue sample 230 in the scanning cavity it defines a Fabry-Pérot resonator cavity in select regions (where the first reflection surface and the second reflection surface sandwich the tissue sample). Thus, a plano-concave Fabry-Pérot resonator cavity is formed that has a high quality factor. For example, the laser emission scanning microscope device 200 may have a quality factor (Q) of greater than or equal to about $1 \times 10^4$ and optionally greater than or equal to about $1 \times 10^5$.

As lasing energy from the lasing energy pump source 202 is pumped into the tissue sample 230 in the regions corresponding to the Fabry-Pérot cavity (see inset 2), the gain medium is activated and generates laser energy 232. The gain medium may comprise one or more lasing energy responsive species (e.g., one or more fluorophores) capable of associating with at least one biomarker within cells of the tissue that are stimulated by the lasing energy. As discussed above, the gain medium can be natural fluorescent materials, fluorescent proteins synthesized by cells, or externally added/labeled dyes. The change in the gain medium induced by the bioactivities inside the cell (or on the cell surface) (see inset 2 for illustration, showing how the gain can be changed upon bio-interaction where binding occurs) causes a significant change in the laser output characteristics (such as intensity, lasing threshold, and transverse mode profile, and the like), which can be detected by a photodetector 226 or/and a spectro-imaging system 234 to extract hyperspectral information. The stationary tissue sample 230 may optionally comprise at least two distinct lasing energy responsive species (e.g., at least two distinct fluorophores) and the detector (e.g., photodetector 226 and/or spectro-imaging system 234) is capable of receiving and detecting multiplexed emissions from each distinct fluorophore/lasing energy responsive species. An exemplary and non-limiting spectro-imaging system 234 includes a spectrometer 236 and CCD imager unit 238 and various lenses/splitter 238 for directing the laser energy beam. Inset 3 shows hyperspectral information obtained via a spectro-imaging unit including an imager and a spectrometer. Thus, cells within the stationary tissue sample 230 can be mapped with information regarding emissions based on position and intensity of emissions within the sample.

In this design, samples that contain or are labeled or doped with fluorescent materials such as dyes, fluorescent proteins, and quantum dots, are sandwiched between the two reflective mirrors and thus serve as a gain medium. An external pump is used to excite the energy responsive materials in a small region of the stationary tissue sample. Laser emission can be produced due to the optical feedback provided by the mirrors. The laser signal from the region under excitation can be detected by a spectrometer for both the intensity and the mode distribution information. In order to construct the imaging, the sample can be moved around, but in certain aspects, the external pump or one or both mirrors can be scanned across the stationary sample. Multiple fluorescent materials with different emission spectra can be added to the same sample for multiplexed detection. The mirror reflection band can be tailored for either one particular emission spectrum at a time, in which case, the laser emission from only one fluorescent material will emerge, or multiple emission spectra, in which case, the laser emission from multiple fluorescent materials emerge simultaneously. The laser modes can be used to analyze the detailed structures of the sample.

FIG. 19 shows yet another embodiment of a laser emission scanning microscope device 250 for scanning/detection of a tissue sample. A lasing energy pump source 252 directs energy/electromagnetic radiation towards a scanning cavity 254. The scanning cavity 254 is disposed on a scanning stage 256 that can be controlled (e.g., translated or moved) by a computer processing unit 258 to which it is operably connected. As shown, scanning cavity 254 includes a first reflection surface 260 on the bottom and a second reflection surface 262 on the top of the scanning cavity 254. As shown, the first reflection surface 260 and the second reflection surface 262 are both planar. A stationary tissue sample 264 is disposed between the first reflection surface 260 and the second reflection surface 262 within the scanning cavity 254. The stationary tissue sample 264 may include cells and/or tissues placed inside the scanning cavity 254. The first reflection surface 260 and the second reflection surface 262 define a Fabry-Pérot resonator cavity as they sandwich the tissue sample 264.

The scanning stage 256 can be stationary or optionally move the scanning cavity 254 and thus translate the scanning cavity with respect to the lasing energy pump source 252. Alternatively, the lasing energy pump source 252 can translate with respect to the scanning cavity 254. As with other variations, the laser emission scanning microscope device 250 may have a quality factor (Q) of greater than or equal to about $1 \times 10^4$. As lasing energy 270 from the lasing energy pump source 252 is pumped into the tissue sample 264 in the regions corresponding to the Fabry-Pérot cavity, the gain medium is activated and generates laser energy 272. As with previous embodiments, the gain medium may comprise any of the one or more lasing energy responsive species (e.g., one or more fluorophores) capable of associating with at least one biomarker within cells of the tissue that are stimulated by the lasing energy. As discussed above, the change in the gain medium induced by the bioactivities inside the cell (or on the cell surface) causes a significant change in the laser output characteristics (such as intensity, lasing threshold, and transverse mode profile, and the like), which can be detected by a photodetector 274 (e.g., a charge coupled device (CCD)) or/and a spectro-imaging system 276 to extract hyperspectral information. The stationary tissue sample 264 may optionally comprise at least two distinct lasing energy responsive species (e.g., at least two distinct fluorophores) and the detector (e.g., photodetector 274 and/or spectro-imaging system 276) is capable of receiving and detecting multiplexed emissions from each distinct fluorophore/lasing energy responsive species. An exemplary and non-limiting spectro-imaging system includes a spectrometer 278 and CCD imager unit 274, a plurality of beam splitters 280 and/or one or more lenses 282 for directing lasing energy 270 and/or generated laser energy 272 beam. The lasing energy 270 may be focused by an objective lens 284 to the tissue sample via the top mirror in 254. As with previous variations, cells within the stationary tissue sample 264 can be mapped with information regarding emissions based on position and intensity of emissions within the sample. In one variation, a focal beam size (spatial sampling area of the spectrum) may be about 30 µm in diameter. The enlarged figure on the right shows the picture of a lung tissue section sandwiched between the two mirrors while pumped by a 465 nm excitation source. The reflectivity of the first reflection surface 260 and the second reflection surface 262 mirrors around the lasing emission wavelength (535-555 nm) is measured to be 99.98% for the first reflection surface 260 (bottom mirror) and 99.80% for the second reflection surface 262 (top mirror).

The present disclosure thus contemplates methods of detecting emissions from one or more lasing energy responsive species (e.g., one or more fluorophores) in a tissue sample by using any of the laser emission microscopes described above or herein. In one variation, the method comprises directing energy from a lasing pump source towards a stationary tissue sample disposed within a scanning cavity at least a portion of which defines a Fabry-Pérot resonator cavity. The Fabry-Pérot resonator cavity has a quality factor (Q) of greater than or equal to about $1 \times 10^2$ formed between a first reflection surface and a second reflection surface. The tissue sample contains or is stained with the one or more lasing energy responsive species (e.g., one or more fluorophores). At least one of the second reflection surface or a lasing pump source may translate with respect to the stationary tissue sample disposed within the scanning cavity. One or more stimulated laser emissions generated by the one or more lasing energy responsive species in the tissue sample are detected to generate a two-dimensional scan of the tissue sample.

In certain aspects, directing energy from the lasing pump source includes translating a source of lasing energy over the tissue sample disposed within the scanning cavity to generate the two-dimensional scan. In other aspects, the second reflection surface is a scanning mirror formed on a terminal end of a fiber that translates with respect to the tissue sample disposed within the scanning cavity to generate the two-dimensional scan. The second reflection surface may define a concave structure.

In one variation, the first reflection surface and the second reflection surface have a broad reflection band (meaning that the mirrors have a high reflectivity over a broad range of wavelengths). With such a variation, wavelength-multiplexed imaging and/or detection can be achieved. As the scanning microscope scans across the tissue (including the cells contained therein), the Fabry-Pérot cavity can be formed everywhere over the entire tissue sample. Because the reflection surfaces are broad-band and the lasing emission(s) from the lasing energy responsive species is very narrow spectrally, lasing emissions from lasing energy responsive species can be achieved and can be well-resolved spectrally, even though those lasing emissions may come from the same sites or sites that are very close to each other (meaning sites that cannot be spatially resolved).

In another variation, another method to achieve multiplexed detection is provided by using a reflection surface that has a narrow, but tunable reflection band (meaning that the high reflection band can be tuned from one range of wavelengths to another range of wavelengths). In such a variation, the first reflection surface and the second reflection surface have a tunable reflection band. The one or more lasing energy responsive species comprise a first lasing energy responsive species having a first lasing threshold energy and a distinct second lasing energy responsive species having a distinct second lasing threshold energy. In this method, the narrow-band, tunable mirror is first set to have high reflectivity for the emissions of the first lasing energy responsive species (but not for the emissions of the second lasing energy responsive species), thus forming a Fabry-Pérot cavity for the first lasing energy responsive species, but not the second lasing energy responsive species. The Fabry-Pérot cavity promotes laser emission from the first lasing energy responsive species, which can be transmitted through at least one of the reflection surfaces as where emissions from the second lasing energy responsive species are not reflected or transmitted. Thus, the laser emissions from the first lasing energy responsive species can be recorded and imaged. Then the tunable reflection surface(s) are tuned to another wavelength range to have high reflection for the emissions of the second lasing energy responsive species, thus forming a Fabry-Pérot cavity for the second lasing energy responsive species, but not for the first lasing energy responsive species. The laser emission can be achieved for the second lasing energy responsive species and can be recorded and imaged. The two images can be superimposed on top of each other to achieve multiplexed detection.

Thus, such a method may further comprise first tuning the first reflection surface and the second reflection surface to have a first reflection band that permits laser emissions from the first lasing energy responsive species to transmit therethrough, so that after the directing of energy, the detecting is of one or more emissions generated by the first lasing energy responsive species. The method may further comprise tuning the first reflection surface and the second reflection surface to have a second reflection band that permits laser emissions from the second lasing energy responsive species to transmit therethrough, wherein the directing of energy is then conducted so that the detecting is of one or more emissions generated by the second lasing energy responsive species.

In one aspect, the one or more lasing energy responsive species comprises a first lasing energy responsive species having a first lasing threshold energy. The amount of energy (e.g., intensity level of energy) directed towards the stationary tissue sample may be increased over time, so that the detecting maps a concentration distribution of the first lasing energy responsive species in the stationary tissue sample. The lasing threshold of the lasing energy responsive species (e.g., fluorophore) depends on the local environment in which the lasing energy responsive species resides (for example, fluorophore concentration may vary based on the biomarker concentration). The lasing pump energy can be scanned from low to high, so the locations having the highest concentrations of lasing energy responsive species will lase first. With the increased pump energy, additional places having the second highest lasing energy responsive species concentration will lase and so on. Therefore, the lasing energy responsive species (and hence biomarker) concentration distribution can be mapped within the tissue sample.

In other aspects, the tissue sample may contain or be stained with at least two distinct lasing energy responsive species (e.g., at least two distinct fluorophores) and the detecting includes detecting at least two distinct stimulated laser emissions generated by the at least two distinct lasing energy responsive species to generate a multiplexed two-dimensional scan of the tissue sample.

In certain other aspects, the one or more lasing energy responsive species (e.g., one or more fluorophores) comprise a first lasing energy responsive species (e.g., a first fluorophore) and a distinct second lasing energy responsive species (e.g., a second fluorophore) and the energy directed towards the stationary tissue sample is less than a first lasing threshold energy of the first lasing energy responsive species, but greater than a second lasing threshold energy of the second lasing energy responsive species, so that the detecting of the one or more stimulated laser emissions detects only laser emissions from the second lasing energy responsive species in the tissue sample.

In further aspects, the one or more lasing energy responsive species comprise a first lasing energy responsive species (e.g., a first fluorophore) having a first lasing threshold energy and a distinct second lasing energy responsive species (e.g., a second fluorophore) having a distinct second lasing threshold energy. The directing of energy from the lasing pump source may comprise increasing the energy level to first excite the first lasing energy responsive species and then to excite the second lasing energy responsive species. In this manner, as the level of energy that is directed towards the tissue sample increases, the detecting of the one or more emissions detects emissions from the first lasing energy responsive species and then the second lasing energy responsive species can map a distribution (position/location) of the first lasing energy responsive species and the second energy responsive species within the stationary tissue sample.

In yet other aspects, the present disclosure further contemplates a method for quantifying one or more biomarkers in a histological tissue sample. The method may comprise directing energy from a lasing pump source towards a stationary histological tissue sample disposed within a scanning cavity. At least a portion of the scanning cavity defines a Fabry-Pérot resonator cavity having a quality factor (Q) of greater than or equal to about $1\times10^2$ formed between a first reflection surface and a second reflection surface. The histological tissue sample contains one or more lasing energy responsive species (e.g., one or more fluorophores) capable of associating with at least one biomarker. Further, at least one of the second reflection surface or a source of lasing energy source (e.g., source of coherent electromagnetic radiation) translates with respect to the stationary tissue sample disposed within the scanning cavity. One or more stimulated emissions (e.g., laser emissions) are generated by the one or more lasing energy responsive species in the histological tissue sample and thus detected so as to quantify the number of the at least one biomarker present in the histological tissue sample.

Thus, in various aspects, the present disclosure provides methods to enumerate and map cells with different biomarker levels in a tissue sample.

In yet other variations, the detecting of one or more emissions relates to a concentration distribution of the biomarker in distinct regions of the tissue sample. An excitation intensity of energy directed at the tissue sample is varied to measure the concentration of the biomarker in distinct regions of the tissue sample. The places (or sites) within the tissue that have higher concentrations of the biomarker (hence the higher concentrations of the lasing energy responsive species/fluorophore) will lase first and their locations or positions can be recorded. With the increased excitation intensity of energy, more sites start to produce lasing emissions, which can be recorded again. Using this method, the biomarker concentration distribution can be mapped across the tissue sample.

In certain aspects, the one or more lasing energy responsive species comprise a first lasing energy responsive species (e.g., a first fluorophore) and a distinct second lasing energy responsive species (e.g., a second fluorophore) and the energy directed towards the stationary tissue sample is less than a first lasing threshold energy of the first lasing energy responsive species and greater than a second lasing threshold energy of the second lasing energy responsive species, so that the detecting of the one or more emissions detects only laser emissions from the second lasing energy responsive species in the tissue sample.

In other aspects, when the biomarker associates with nuclei of cells within the stationary tissue sample, the detecting of one or more emissions generated by the one or more lasing energy responsive species (e.g., one or more fluorophores) corresponds to emissions generated by nuclei of the cells, so that the number of nuclei of cells in the tissue sample are enumerated and quantified. In yet other aspects, the detecting of one or more emissions relates to a concentration of the biomarker in distinct regions of the tissue sample. An excitation intensity of energy directed at the tissue sample is varied to measure the concentration of the biomarker in distinct regions of the tissue sample. One or more emissions generated by the one or more lasing energy responsive species (e.g., one or more fluorophores) have a spatial resolution better than about 700 nm (0.7 micrometers). In certain aspects, the laser emission device provides sub-cellular and/or sub-micron resolution, for example, a spatial resolution of less than or equal to about 700 nm. Advantages of this microscope using laser emission over the conventional one using fluorescence include high signal-to-background ratios and narrow emission band so that multiple fluorescent materials can be used on the same sample without cross-talk. Accordingly, the present technology provides high contrast, high resolution imaging techniques.

Based on the unique feature of laser emission, which has a threshold for lasing and the lasing mode has a certain spatial profile, different tissues/cells can be classified with different biomarker (e.g., nucleic acid) concentrations. For instance, the present disclosure contemplates methods of distinguishing cancer cells (e.g., cancerous tissues) from the normal cells (e.g., normal tissues) by the lasing threshold, as shown in FIGS. 18A-18C. FIGS. 18A-18D show comparative lasing thresholds for tumor tissue and normal tissue samples, where the two types of tissues can be readily distinguished from one another by use of a laser emission scanning technology provided by various aspects of the present disclosure. FIG. 18D shows that while fluorescence emission is detected in both a normal cell nucleus (300) and cancer cell nucleus (310), whereas laser emission is only detected only in a cancer cell nucleus 330, but not in a normal cell nucleus 320, when a pump energy density is set between Pc (cancer cell lasing threshold) and Pn (normal cell lasing threshold).

The present disclosure also provides the ability to distinguish different types of tissues from one another based on their lasing mode profiles. For example, FIGS. 7C, 8C, and 9C show different lasing mode profiles for muscle tissue versus adipose tissue, providing the ability to discern different tissue types with the use of devices prepared in accordance with various aspects of the present disclosure.

As further detail regarding various aspects of the present technology, various experiments are conducted and explored as follows. Distinct lasing emissions from muscle tissue stained with fluorescein isothiocyanate (FITC), adipose tissue stained with boron-dipyrromethene (BODIPY), and hybrid muscle/adipose tissue dual-stained with FITC and BODIPY are achieved with a lasing threshold on the order of 10 µJ/mm$^2$ using the same pumping wavelength. The lasing characteristics of the tissue laser for various tissue structures/geometries, tissue thicknesses, and staining dye concentrations are further systematically investigated. Finally, lasing from FITC conjugates (FITC-phalloidin) that target specifically F-actin in muscle tissues are also achieved.

Laser emission scanning microscope devices including a Fabry-Pérot resonator cavity having a quality factor (Q) in accordance with certain aspects of the present disclosure show improved detection over devices using conventional fluorescence. Despite the large fluorescence spectral overlap (about 100 nm) between the two fluorophores, FITC and BODIPY lasing bands from muscle and adipose tissues can be clearly distinguished by their well separated lasing bands and different lasing threshold, thus enabling highly multiplexed spectral detection. In addition, the lasing emission has two orders of magnitude improvement in SBR over fluorescence, significantly enhancing imaging contrast. The laser emission scanning microscope for scanning tissue can be readily and broadly applicable to nearly any types of tissues/diseases, and outperforms previous random tissue lasers and WGM lipid droplet lasers with low lasing threshold, high sample-to-sample and location-to-location repeatability, high SBR, high spatial resolution (as high as a few microns, limited by the intracavity laser beam size), multiplexed detection capability, and the capability to target specific biomarkers in a tissue. Such a laser emission scanning microscope can be used in a wide range of applications in medical diagnostics and screening of tissues, as well as identification and monitoring of biological transformations in tissue engineering.

In certain aspects, the present disclosure contemplates the concurrent acquisition of bright-field imaging and lasing emission images from cells within tissue samples. Bright field image can be obtained directly through the first reflection surface (or top mirror). Because the first reflection surface has a high reflectivity for a certain select band of wavelengths (for example, 510 nm-550 nm), this band of wavelengths will not appear or show up in the bright field. However, other bands of wavelengths (for example, less than about 510 nm or greater than about 550 nm) can still transmit through the first reflection surface top mirror and form bright field images. In this manner, the bright field images can also be collected concurrently with the lasing emission images and be overlaid with one another.

Further, fluorescence images of the tissue sample can be obtained by either removing the first reflection surface/top mirror or by slightly reducing the reflectivity of the first reflection surface. For example, the first reflection surface/mirror reflectivity can be reduced from 99.9% to 95%, so that about 5% of the fluorescence can transmit through the top mirror to form fluorescence images. Thus, in certain variations, the first reflection surface may have a reflectivity to the one or more laser emissions generated by the one or more lasing energy responsive species in the tissue sample of greater than or equal to about 80% to less than or equal to about 99.999% and in certain variations, optionally greater than or equal to about 95% to less than or equal to about 99.5%. The lasing emission microscopes of the present disclosure can be used to create composite images, where an overlay of lasing emission images with fluorescence images can be obtained.

In FIGS. 20A-20D, various images are shown that can be used to form a composite overlay image in accordance with certain aspects of the present disclosure. FIG. 20A is a fluorescence microscopic image, FIG. 20B is a bright field CCD image, and FIG. 20C is a lasing emission CCD image of identical tissue. Laser is only pumped within the dashed square region for FIGS. 20B-20C. The bottom-left squares in FIGS. 20A and 20C show the enlarged images of the dashed squares in respective images. For a detailed comparison, FIGS. 20D and 20E show an intensity profile along the lines in images in FIGS. 20A and 20C, respectively. FIGS. 20F and 20G provide another example to show lasing stars in tissue samples. FIG. 20F shows pure lasing emission imaging, while FIG. 20G shows simultaneous acquisition of lasing emission and bright field imaging. Note that the bright field images appear to be red due to the fact that the first reflection surface/mirror, which has high reflectivity centered around 530 nm, blocks the green color. Thus, an overlaid composite may be obtained with the laser emission microscopes of the present disclosure that include one or more of laser emission images, fluorescence images, and/or bright field images.

In FIG. 21, a scanning laser emission microscope device 350 has a lasing energy pump source 352 that directs energy/electromagnetic radiation towards a scanning cavity 354. The scanning cavity includes a first reflection surface 360 and a second reflection surface 362. A stationary tissue sample 364 is disposed between the first reflection surface 360 and the second reflection surface 362, similar to the various embodiments previously described above. In this design, the first reflection surface 360 has an alternative design in that it can be a removable component. The upper first reflection surface 360 may be removable. In certain variations, this upper first reflection surface 360 (e.g., mirror) can be reused numerous times. As noted above, fluorescence images can also be taken by removing the first reflection surface 360 and then taking an image of the tissue sample. In certain variations, a refractive index matching material 366, such as an oil or a gel, can be included around the tissue sample 364, including between the first reflection surface 360 and the tissue sample 362 or on the sides of the tissue sample 364.

Additionally, the first reflection surface 360 may further have one or more spacers 370 to optimize the scanning laser emission microscope device 350. The one or more spacers 370 may have a fixed, pre-designed height to ensure a length of the scanning cavity 354 (which is determined by a height of the spacer(s) 370) remain the same for each measurement taken. One example is a spacer 370 made of an SU-8 polymer by spin-coating and curing SU-8 on the first reflection surface 360 and using a photo-lithographic method to obtain the spacer(s) 370 of the desired geometry. In one variation, a spacer 370 has a height of about 12 μm, where the tissue thickness is either 5 μm or 10 μm. As noted above, the tissue sample 364 may have a thickness ranging from greater than or equal to about 1 μm to less than or equal to about 50 μm or optionally greater than or equal to about 1 microns (μm) to less than or equal to about 50 microns (μm), so the spacers 370 may have a height that is about 1 μm to about 10 μm greater than the tissue sample thickness, for example, about 1 μm to 5 μm greater than the tissue sample thickness. For example, the spacer(s) 370 may have a height of greater than or equal to about 2 μm to less than or equal to about 60 μm. It should be noted that the spacers may be attached to either the first reflection surface 360 or the second reflection surface 362.

In certain other aspects, the present disclosure contemplates use of various tissue samples, including those that have been frozen (for example, cryogenically preserved) or fixed with FFPE (formalin-fixed paraffin-embedded), by way of example. FIGS. 22A-22D shows that differences in lasing thresholds for cancer and normal cells can be used to determine activity of cancerous cells with lasing emission microscopes provided by the present teachings, even after being cryogenically treated and/or FFPE preserved. FIGS. 22A-22B show statistics of cancer/normal cell lasing thresholds in frozen tissues, while FIGS. 22C-22D show FFPE tissues. FIG. 22A shows statistics of normal cell lasing thresholds of normal lung tissues from six patients, labeled as N1-N6, which have been cryogenically frozen. FIG. 22B shows statistics of tumor cell lasing thresholds from six individual lung cancer patients labelled as T1-T6, which have been cryogenically frozen. FIG. 22C shows statistics of normal cell lasing thresholds of normal lung tissues from four patients, labeled as N1-N4, treated via FFPE. FIG. 22D shows statistics of tumor cell lasing thresholds from six individual lung cancer patients labelled as T1-T6, treated via FFPE. For each patient, at least 20 cells are randomly selected and measured. As can be seen, the laser emissions from cancer cells in FIGS. 22A and 22C show significant distinctions in lasing thresholds from the normal cells in FIGS. 22B and 22D, even after being cryogenically or FFPE preserved.

In certain other aspects, the present teachings provide methods to generate lasing emissions from multiple distinct targets within the tissue sample, for example, from a nucleus and an anti-body labeled with the gain media. In certain aspects, the method directs energy from a lasing pump source towards a stationary tissue sample disposed within a scanning cavity at least a portion of which defines a Fabry-Pérot resonator cavity having a quality factor (Q) of greater than or equal to about $1\times10^2$ formed between a first reflection surface and a second reflection surface. The tissue sample comprises one or more lasing energy responsive species including a first lasing energy responsive species and a distinct second lasing energy responsive species. The first energy responsive species may be in a nucleus of a cell and the second energy responsive species may be associated with an antibody that targets an antigen that is inside a cell, on a membrane of the cell, or in an extraceullular matrix of the tissue sample. Further, at least one of the second reflection surface or a lasing pump source translates with respect to the stationary tissue sample disposed within the scanning cavity. The method includes detecting one or more laser emissions generated by the one or more lasing energy responsive species in the tissue sample to generate a two-dimensional scan of the tissue sample.

For example, an exemplary method may generate lasing from a gain media (such as dyes) that target nucleic acids and from a gain media (such as dyes, quantum dots, etc.) that are labeled on the anti-body that target particular antigens inside the cell, on the membrane of the cell, or/and inside the extracellular matrix. In one non-limiting example, a selected tissue section is picked up and placed on the top of a poly-L-lysine coated dielectric mirror/reflection surface, which is first cleaned and rinsed with lysine for better tissue adhesion. The tissue is then rinsed with PBS and air dried before staining/labeling. Finally, the tissue is covered by the top dielectric mirror/reflection surface. For nucleic acid labeling, the prepared dye solution (YO-PRO-1) is then applied to the tissue sections for 10 minutes and rinsed with PBS solution three times before measurements. For antibody-fluorophore labeling of lung tissues, the tissue is incubated with 200 μl of diluted primary antibody overnight at 4° C. The primary antibody is prepared with 1:50 solution, with a final concentration at 0.01 mg/ml. After incubation with primary antibodies, the tissue is rinsed with PBS thoroughly, followed by FITC conjugated secondary antibody (2 hours at room temperature). The tissue is rinsed again with PBS before laser experiment. Finally, a refractive index matching gel is used to seal the tissue with the top mirror/reflection surface.

In yet other aspects, the present teachings provide methods of multiplexed detection. Due to the ultra-narrow linewidth of laser emission spectrum, the laser emission based microscopy according to certain aspects of the present disclosure is capable of accommodating additional fluorophores within a narrow band of wavelengths, although the fluorescence spectra from those fluorophores have strong spectral overlap and it is difficult to distinguish them from fluorescence spectra. For example, as seen in FIG. 23, at least four distinctive lasing emission wavelengths can be clearly distinguished within the range of 500 nm-550 nm, where four dyes all with a green color are used (SYTOX-Blue, EGFR-FITC, YOPRO, and BOBO-1). Thus, while fluorescence emissions overlap with one another and thus are not be capable of being distinguished, here the laser emissions from these same dyes are clear, so that distinct peaks can be readily distinguished from one another.

In further aspects, the present disclosure provides algorithms to differentiate normal tissue from cancer tissue. For example, the excitation intensity can be ramped up to build histogram of lasing stars from lasing emissions. To establish the sensitivity and specificity of the lasing emission microscopy (LEM) technique provided by certain aspects of the present disclosure, eight cancer patients are randomly selected and the LEM is performed on both of their normal and cancer tissues. By using the same experimental conditions and quantification methods, five tissue sections (frames) are scanned for each patient for both cancer tissue and normal tissue (a total of 80 frames). The histogram of the number of the lasing cells per frame for normal tissues and cancer tissues are plotted in FIGS. 24A-24D. Based on the number of lasing cells per frame in FIG. 24A (normal cells) or 24C (tumor cells), a Receiver Operation Characteristic (ROC) curve is generated in FIG. 24B, which has an area under the curve of 0.998. In certain aspects, an optimal threshold to identify a cancer tissue is "5 lasing cells per frame," which corresponds to a sensitivity of 97.5%. Practically, the threshold can be adjusted for higher sensitivity or higher specificity. Another way to characterize these cells is to ramp the excitation intensity to build histogram of lasing stars or cells. For instance, FIG. 24D shows a histogram of lasing cells in tissues under different excitation intensity. This histogram can be used to better understand and characterize the tissues.

in yet other aspects, the present teachings provide methods to sub-type cancer tissues. For example, the laser emission microscopy provided by certain aspects of the present disclosure can provide additional information to sub-type cancer tissues. For example, it is found that higher the differentiation of cancer tissues, the higher the lasing threshold will be. Due to different extent of nuclear activities, the laser emission microscopy can distinguish the differentiation stages or subtypes of cancer tissues.

In further aspects, the present teachings provide methods for early-cancer detection from tissue samples. Using the threshold established above, an important application of the laser emission microscopy provided by certain aspects of the present disclosure can include examining early stage cancer tissues. For example, early stage lung cancer tissues are regarded as the most critical yet challenging task in clinical histopathology. By early cancer, it is generally meant that the cancer is prior to Stage I cancer. In this example, three samples from three patients, who were diagnosed as early stage lung cancer (in-progress lung cancer) are analyzed. By using the LEM techniques, cancer cells can be unambiguously identified within the tissue with a high contrast. For each patient, 5 sections are scanned with the LEM under a fixed pump energy density of 30 µJ/mm², as shown in FIGS. 25A-25F. As can be seen, the LEM scans show early cancer detection with lasing stars appearing in each of the sectional images from the patient tissues.

In yet another aspect, tissue microarrays can also be analyzed using scanning laser emission microscope (LEM) device 400 according to various aspects of the present disclosure, as shown in FIG. 26. The LEM device 400 has a lasing energy pump source 410 that directs energy/electromagnetic radiation towards a scanning cavity 412. The scanning cavity 412 includes a first reflection surface 420 and a second reflection surface 422. The tissue sample is provided between the first reflection surface 420 and the second reflection surface 422 in the form of a tissue sample microarray 430 including a plurality of distinct thin tissue samples 432. A tissue sample microarray may contain many small representative tissue samples 432 from different origins (e.g., patients) with each sample having a size ranging from greater than or equal to about 0.6 mm to less than or equal to about 3 mm in diameter. The small tissue samples can be arranged in arbitrary array formats (e.g., 5 by 5, 6 by 8, etc.), resulting in a total area of the tissue microarray ranging from greater than or equal to about 5 mm by 5 mm to less than or equal to about 25 mm by 25 mm. A thin slice of the tissue sample microarray 430 may contain many small representative tissue samples 432 from different origins (e.g., patients) that can be mounted on a surface 434 of the second reflection surface 422 and subjected to laser emission imaging. The thickness of the slice may range from greater than or equal to about 1 µm to less than or equal to 50 µm. High throughput analysis of multiple samples 432 at the same time with identical conditions is thus contemplated.

In certain aspects, the scanning laser emission microscope device according to various aspects of the present teachings can create one or more laser emissions generated by the one or more lasing energy responsive species in the tissue sample to provide at least one of: identification of sub-type of cancer tissue, early detection of cancer, identification of a stage of cancer, or a histogram of laser emissions, by way of non-limiting example.

To further illustrate an operational concept of laser emission scanning microscopes, reference is made to the device in FIG. 4A.

EXAMPLE A

First a Fabry-Pérot (FP) resonator cavity is formed by two customized dielectric mirrors as shown in FIG. 5A and described above. The FP cavity is thus formed by two dielectric mirrors. Briefly, the top mirror (made by Qingdao NovelBeam Technology Co. Ltd, China) has a high reflectivity in the spectral range of 500-555 nm to provide optical feedback and high transmission around 465 nm for the pump light to pass through, whereas the bottom mirror (made by Evaporated Coating Inc., USA) has a slightly wider reflection band. Most of the top mirror is flat, thus forming a plano-plano (p-p) FP cavity with the flat bottom mirror. The top mirror also has an array of concave structures, made by the computer-controlled $CO_2$ laser ablation (before dielectric coating), thus forming a plano-concave (p-c) FP cavity that has better cavity stability and higher Q-factors. The Q-factor for the p-p and p-c FP cavity is on the order of $10^4$ and $10^5$, respectively, at a cavity length of 30 µm (in the absence of tissues). Details of the fabrication and characterization of the p-p and p-c FP cavities are described in Wang, W. et al. Optofluidic laser array based on stable high-Q Fabry-Pérot microcavities. *Lab Chip* 15, 3862-3869, (2015), the relevant portions of which are incorporated by reference herein.

FITC and BODIPY, the two commonly used dyes in tissue staining, are used here as an exemplary gain media. Their fluorescence emission spectra are given in FIG. 4B, showing strong spectral overlap over 100 nm. Further, three major types of tissues are selected as the model system, i.e., muscle tissue, adipose tissue, and hybrid tissue, as illustrated in FIGS. 4C-4E. FITC and BODIPY are used to stain muscle tissue (myocytes) and adipose tissue (brown adipocytes), respectively.

Tissue and Device Preparation

All the fresh pig tissues are obtained from the local slaughterhouse. The muscle and fat tissues are selected from pig ribs without any processing or fixing. Fresh tissues are frozen immediately and embedded into OCT (Optimal Cutting Temperature) compound to form an OCT tissue block under −20° C. Tissue sections are then sliced into thin sections (20 µm, 30 µm, and 40 µm in thickness) by using a cryostat (Leica 3000). Selected sections are picked up and placed on the top of a poly-L-lysine (Sigma-Aldrich #P8920) coated dielectric mirror, which are first cleaned and rinsed with Lysine for better tissue adhesion. Tissues are then rinsed with PBS and air dried before staining. After staining (discussed below) and appropriate rinsing again, the tissue is mounted with PBS (phosphate buffered solution, R&D Systems #841380, #896009) and covered by the top dielectric mirror. For confocal microscopy, the tissues are first deposited on the top of a glass slide (Thermo-Fisher #3021-002), followed by the same staining process, and then mounted with Fluoromount (Sigma-Aldrich #4680) and covered with a coverslip before scanning.

Staining and Materials

For muscle tissues, FITC powder (Sigma-Aldrich #F6377) is dissolved in de-ionized (DI) water at a concentration of 3.0 mM, and then diluted to lower concentrations. FITC solution is then applied to the muscle tissue for 10 minutes and rinsed with PBS solution 3 times before measurement. For adipose tissues, BODIPY (Life-Tech #D3922) is dissolved in pure ethanol at a concentration of 3.0 mM, and then diluted to lower concentrations with ethanol. BODIPY solution is then applied to the adipose tissue for 20 minutes and rinsed with PBS solution 3 times before measurements. For dual staining of the hybrid tissue, 2 mM FITC solution is applied to the tissue for 10 minutes and rinsed with PBS for 3 times and then 1.0 mM BODIPY solution for 20 minutes and rinsed with PBS solution 3 times. For specific staining using FITC-phalloidin (Thermo Fisher #F432), the bulk solution is diluted with methanol to form a 10 µM solution and applied to the muscle tissue sections for 20 minutes as suggested. Then the tissue is rinsed with PBS for 3 times before measurement.

Optical Imaging Techniques

The DIC and confocal fluorescence microscopic images are taken by using Nikon A1 Spectral Confocal Microscope with an excitation of 488 nm laser source. The bright field images of tissue lasing are captured by using a CCD (Thorlabs #DCU223C) integrated directly on top of the objective.

Experimental Setup

A typical confocal setup is used to excite the sample and collect emission light from the FP cavity (FIG. 4A). A pulsed OPO laser (pulse width: 5 ns, repetition rate: 20 Hz) with 465 nm is used as the excitation source to excite the stained tissues. The pump intensity is adjusted by a continuously variable neutral density filter, normally in the average of 1 $\mu J/mm^2$ ~200 $\mu J/mm^2$. The emission light is collected through the same lens and sent to a spectrometer (Horiba iHR550, spectral resolution ~0.2 nm) for analysis.

FIG. 4F shows the differential interference contrast (DIC) and confocal fluorescence microscopy images of a muscle tissue stained with FITC. Since FITC is a non-specific dye, physical absorption of dyes throughout the whole tissue takes place as the main staining mechanism. Nevertheless, it can still be clearly observed that the inner part of each myocyte is stained by more FITC due to its slight binding ability to primary amine groups of proteins. The DIC and confocal images of adipose tissue stained with BODIPY are given in FIG. 4G. Because BODIPY is a lipophilic stain, it labels all the lipid droplets randomly distributed throughout the whole brown adipocyte.

The feasibility and characteristics of the tissue laser under various muscle tissue thicknesses and FITC concentrations are further investigated as shown in FIGS. 7A-7F. All the muscle tissue sections are prepared so that muscle fibers (myofibrils) are in the longitudinal direction (i.e., the myofibrils are aligned perpendicularly to the mirror surface and in parallel to the laser emission). The lasing spectra of a 30 $\mu m$ thick muscle tissue stained with 2 mM FITC under various pump intensities are shown in FIG. 7A. Sharp and periodic lasing peaks start to emerge around 553 nm with an overall lasing band of only about 10 nm (545 nm-555 nm), much narrower than the corresponding fluorescence band (greater than 50 nm in FIG. 4B), which is typical for lasing emission. The spectral linewidth of each lasing peak is 0.2 nm, limited by the spectrometer resolution. Ultimately, the lasing emission band can be as narrow as the lasing spectral linewidth when the laser is under single-mode operation. It should be noted that, in comparison with the lasing wavelength of pure FITC in the absence of muscle tissue (centered around 525 nm), a 30 nm red-shift in the FITC stained tissue laser is observed, which is due to myoglobin in muscle tissue that has a lower extinction coefficient at 555 nm than 525 nm. The spectrally integrated laser emission versus pump energy density extracted from FIG. 7A is presented in FIG. 7B, from which the lasing threshold is derived to be approximately 9.2 $\mu J/mm^2$, similar to theoretical analysis and simulation. Distinct changes in emission below and above threshold can be better visualized by the CCD images in FIG. 7C. Below the lasing threshold (4.7 $\mu J/mm^2$), the emission is spatially featureless throughout the focal spot on the tissue. Above the lasing threshold (12 $\mu J/mm^2$), the laser output is generally described by Ince-Gaussian modes. Due to the quasi-circular symmetry of the myofibrils inside the cavity, the laser emission in FIG. 7C looks more like the Laguerre-Gaussian modes.

How tissue thickness and the concentration of staining FITC affects the lasing characteristics is further investigated, which is important for future practical use of tissue lasers in biology and biomedicine. FIG. 7D shows the lasing spectra by varying the muscle tissue thickness with the fixed concentration of FITC used to stain the tissue (2 mM). The respective FSR for the cavity length of 20 $\mu m$, 30 $\mu m$, and 40 $\mu m$ is 5.3 nm, 3.5 nm, and 2.7 nm, respectively, which give an average effective muscle tissue refractive index of 1.43, close to the reported value of 1.41. Although the number of the lasing modes increases with the increased tissue thickness due to the multimode nature of the FP cavity, the lasing band still remains around 10 nm. The slight increase in background around 560 nm (see FIG. 7A, 7D) is believed to be caused by the reduced reflectivity of the dielectric mirror of the FP cavity. FIG. 7E plots the lasing threshold of the tissue laser of various tissue thicknesses, showing the optimal muscle tissue thickness is around 30 $\mu m$.

Furthermore, in FIG. 7F, the dependence of the lasing threshold on the FITC concentration at the fixed tissue thickness (30 $\mu m$) is investigated. The lasing threshold decreased monotonically when the FITC concentration used to stain the tissue increased from 0.25 mM to 2 mM. The overall agreement between the experimental results with simulated data suggests that the concentration of FITC inside the muscle tissue follows the concentration of the FITC in solution outside the tissue at an approximately 1:1 ratio during staining. This appears to be reasonable, as FITC molecules simply migrate into and are subsequently trapped by the tissue matrix non-specifically during staining. However, when the FITC concentration exceeds 2 mM, the threshold begins to rise again, which is due probably to the self-quenching effect of the dye at high concentrations. In fact, the FP laser with pure FITC (in the absence of the muscle tissue) shows the similar threshold decrease when the FITC increases from 0.5 mM to 2 mM and the similar threshold increase when the FITC concentration increases from 2 mM to 3 mM.

To comprehensively understand how the tissue geometric structures affect the lasing properties and thresholds, the lasing from the muscle tissue with the myofibrils in the transverse and longitudinal direction is compared, which is shown in FIG. 8A. Arrows indicate the lasing emission direction. The FP cavity is not shown. The DIC and confocal fluorescence images of transverse myofibrils stained with FITC are given in FIG. 8B. The tissue sections (30 $\mu m$) are cut from the same piece of tissue as in FIGS. 7A-7F, but with different cutting directions and sandwiched in the same FP cavity. The lasing characteristics of transverse muscles exhibit a remarkable difference from those of longitudinal muscles. First, the spatial pattern of lasing emission (FIG. 8C) resembles linear Hermite-Gaussian modes due to the myofibril arrangement. Second, the lasing threshold for the transverse muscle is about 22 $\mu J/mm^2$ (FIGS. 8D-8E), approximately 2-3 times larger than for the longitudinal muscle, which results from the approximately 4 times higher scattering loss (34 $cm^{-1}$ vs. 9 $cm^{-1}$) along the lasing emission direction for the transverse myofibrils.

To further demonstrate the versatility of a laser emission scanning microscope device prepared in accordance with certain aspects of the present disclosure, in FIGS. 9A-9F, the lasing properties of brown adipose tissue stained with BODIPY are further investigated. The lasing spectra of a 30 $\mu m$ brown adipose tissue stained with 1 mM BODIPY under various pump energy densities is shown in FIG. 9A. Periodic lasing peaks start to emerge around 528 nm and the overall lasing band is approximately 15 nm (520 nm-535 nm), still much narrower than the corresponding fluorescence band. Due to the absence of myoglobin the lasing band of the adipose tissue is red-shifted only 10 nm with respect to that from pure BODIPY lasing, much smaller than the 30 nm red-shift observed for the muscle laser discussed previously. The spectrally integrated laser emission versus pump energy density presented in FIG. 9B shows the lasing threshold of approximately 20 µJ/mm². Prominent changes in output emission below and above threshold are obtained through the CCD images in FIG. 9C. Below the lasing threshold (15 µJ/mm²), the emissions are spatially featureless throughout the focal spot on the tissue. Above the lasing threshold (31 µJ/mm²), the spatial output exhibits more irregular patterns than that for the muscle tissues arranged longitudinally or transversely, because of various sizes of lipid droplets randomly distributed within the focal point of the pump light.

The effect of tissue thickness and BODIPY concentration on the lasing characteristics are also studied. FIG. 9D shows the lasing spectra of various tissue thicknesses with the fixed BODIPY concentration at 1 mM. The measured FSR for the cavity length of 20 µm, 30 µm, and 40 µm is 4.5 nm, 2.9 nm, and 2.2 nm, respectively, which result in an average effective tissue refractive index of 1.55, close to the reported value of 1.48. The lasing threshold for various tissue thicknesses is shown in FIG. 9E, showing the optimal tissue thickness of about 30 µm, similar to that for the muscle tissue. FIG. 9F shows the dependence of the lasing threshold on the BODIPY concentration at a fixed adipose tissue thickness. The lasing threshold decreased gradually between 0.5 mM to 2 mM. However, due to the self-quenching effect of BODIPY, the lasing threshold rises when the concentration exceeds 2 mM, which is also similar to what is observed for the muscle tissue with FITC.

After studying individual dyes with individual types of tissues, selective and multiplexed lasing is achieved from a hybrid tissue (FIG. 10A), which allows generation of lasing signals from myocytes and adipocytes on the same piece of tissue. The tissue is dual-stained, i.e., FITC is used to bind mostly proteins (myocytes) and BODIPY to lipids (adipocytes). DIC and confocal microscopic images are used to confirm the dual staining process in tissue (FIGS. 10B-10C). By tuning the pump light focal position, lasing emission by scanning along the tissue in one direction is achieved, as shown in the dotted lines in FIGS. 10B and 10C. 3 sites are chosen to represent two different tissues: site 1 (muscle tissue stained with 2 mM FITC), site 2 (adipose tissue stained with 1 mM BODIPY), and site 3 (muscle tissue stained with 2 mM FITC). FIG. 10D shows the conventional fluorescence spectra measured at site 1, 2, and 3 (in the absence of the FP cavity by removing the top mirror). Apparently, it would appear that the tissue type among these three sites could not be determined by their fluorescence, thanks to the huge spectral overlap between FITC and BODIPY. In contrast, by placing the same tissue in the Fabry-Pérot (FP) resonator cavity of a laser emission scanning microscope device (by putting the top mirror back), lasing signals (and hence the tissue type) of these three sites can be distinguished in FIGS. 10E and 10F. FIG. 10E shows the selective lasing emission from only one type of tissue (and dye). In this case, the pump energy density (20 µJ/mm²) is set between the threshold for FITC and BODIPY. Only lasing signals from FITC (site 1 and site 3) are generated. No laser signals could be detected from BODIPY (site 2). Because the mirror blocks a significant amount of fluorescence background and allows only the laser emission to pass, an extremely high contrast ratio (about $10^3$) between site 1 and 2 can be achieved. For comparison, the contrast of fluorescence between site 1 and site 2 s nearly unity (see FIG. 10D). FIG. 10F demonstrates the multiplexed lasing emission from multiple dyes. In this case, a higher pump energy density (60 µL/mm²) is used to obtain the lasing emission from both FITC and BODIPY. Despite strong spectral overlap in fluorescence, the lasing spectra from FITC and BODIPY are vastly different spectrally, thus allowing for clear differentiation between muscle and adipose tissues. The above two examples attest to the ability of the tissue laser prepared in accordance with certain aspects of the present disclosure to control and distinguish lasing signals in the presence of multiple dyes. Such ability arises from the sensitive dependence of the laser characteristics (such as lasing wavelength and threshold, as well as output intensity and polarization) on the emission/absorption properties of dyes and their biochemical and physical environment (such as tissue scattering/absorption and binding affinity of dyes to particular markers on tissue, etc.), which enables highly multiplexed analysis of tissues using various fluorophores. In addition to spectrally resolving two very similar dyes, the tissue laser provides another benefit, i.e., high SBR. The SBR in the tissue laser is 500, about 50-fold improvement over conventional fluorescence based detection. Note that because the random laser does not have a mirror, strong fluorescence or scattering background will still be detected without being blocked, thus significantly reducing the SBR.

In many applications, fluorophores are conjugated to biochemical molecules in order to specifically bind to the target in a tissue. To demonstrate that the tissue lasing technique can be applied to fluorophore-conjugates, in FIGS. 11A-11C, a FITC-phalloidin is used as a model system, which has high affinity for F-actin in muscle tissues. In this experiment, lasing could be achieved by using only 10 µM FITC-phalloidin to stain the muscle tissue. In comparison with non-specific binding of FITC (FIG. 4F), the specific binding of FITC-phalloidin to F-actin results in localized fluorescence near cell membranes under confocal microscopy (FIG. 11A) and made the FITC concentration in the muscle tissue much higher than the original staining FITC-phalloidin concentration (10 µM). Consequently, lasing from FITC could be achieved with a threshold of about 130 µJ/mm² (FIG. 11B), while no lasing is observed with non-specific FITC in muscle tissue even at 300 µJ/mm² under the same conditions and using the same staining FITC concentration (10 µM). Based on a simulation, the effective FITC-phalloidin concentration inside the tissue is estimated to be about 200 µM. In FIG. 11C, the spatial distribution of the laser profiles suggests that the lasing is a generalized higher order Ince-Gaussian mode.

In all the experiments discussed so far, the plano-plano (p-p) FP cavity is used for the laser emission scanning microscope device. In certain environments, the p-p cavity may be unstable and/or susceptible to Q-factor degradation even with slight misalignment, and can contribute to the variations in the lasing threshold for different tissue thicknesses in FIG. 7E. Such Q-factor degradation is less significant in the case of single-cell lasers due to the lensing effect of the cell. Unfortunately, this lensing effect may not exist for tissue lasers when cells are embedded in the extracellular matrix. However, plano-concave (p-c) FP cavities in a laser emission scanning microscope device are highly stable and the high Q-factor can be maintained even with misalignment during assembly of the FP tissue laser.

An array of micron-sized concave mirrors (3 mm apart between two adjacent concave mirrors) using $CO_2$ laser ablation on the same top mirror is formed and tested with the same FITC stained muscle tissue. The Q-factor of those p-c FP cavities exceeded $1\times10^5$. A lasing threshold of approximately 2 µJ/mm² is achieved, which is approximately 10 times lower than the corresponding p-p FP cavity in FIG.

7A-7F and about 100 times lower than the random tissue laser (90-380 µJ/mm$^2$). A high-Q scanning concave mirror can be created on the tip of an optical fiber to examine the entire tissue, which permits scanning of the entire tissue sample.

In this example, a highly versatile tissue laser emission scanning microscope incorporating a high-Q FP cavity is provided. Although only two dyes and two types of tissues are tested, the tissue laser platform can readily be translated to other fluorophores (such as quantum dots and fluorescent proteins) and other types of tissues. Such a laser emission tissue microscope offers narrow spectral bandwidth, strong emission intensity, and large background rejection, which, coupled with the positive feedback provided by the laser cavity, can significantly improve the sensitivity, specificity, multiplexibility, and imaging contrast in tissue characterization. Besides emission intensity, the laser output from tissues include a number of unconventional parameters that can be monitored and serve as the sensing signal, such as lasing threshold, lasing efficiency, and lasing mode spatial distribution. Collectively, the multi-parameter analysis enables a better understanding of intratissue/intertissue biological activities and structures.

As discussed above, a laser emission scanning microscope device may include a second reflection surface in the forms of a scanning concave mirror, which can be fabricated on an optical fiber facet, permitting scanning over an entire tissue sample. Further, an imaging spectrometer can be used with the laser emission scanning microscope device for advanced tissue mapping with higher spectral resolution and spatial information. Fluorophores conjugated with antibodies can be used to target multiple biomarkers in tissues. In this manner, the laser emission scanning microscope device provides a novel spectroscopic tool for a plethora of applications ranging from medical diagnostics and preclinical drug testing to monitoring and identification of biological transformations in tissue engineering.

EXAMPLE B

The laser emission scanning microscope devices prepared in accordance with certain aspects of the present disclosure can be used to detect cancer or other disorders, abnormalities, or diseases. Detection of nuclear biomarkers is important for cancer diagnostics and prognostics. Conventional methods rely on colorimetric immunohistochemical assays and fluorescence-based spectroscopy, but are far from satisfactory due to strong light absorption, broad emission band, and low contrast against the background.

In this example, the first wavelength-multiplexed immuno-laser is described, which utilizes lasing emission as the sensing signal, to analyze nuclear biomarkers with high intensity, high contrast, and high spectral and spatial resolution. Both lung and colon cancer tissues are investigated, in which the tissues labeled with site specific dyes and antibody-conjugated dyes that bind nucleic acids and nuclear biomarkers (EGFR, p53, and Bcl-2) are sandwiched in a Fabry-Pérot microcavity. Significantly, subcellular lasing from cancer cell nuclei is observed with a threshold of tens of µJ/mm$^2$, a sub-micron resolution (<700 nm), and a lasing band of only a few nm. Dual lasing emission is also achieved to signify the co-localization of nucleic acid and nuclear biomarkers. The immuno tissue laser provides a new analytical tool complementary to conventional methods for improved cancer tissue characterization and better understanding of fundamental cell biology.

As background, cancer is one of the leading causes of death worldwide, resulting in more than 8 million deaths annually. For cancer diagnosis, clinical evaluation of microscopic histopathology slides by pathologists is widely used, which defines cancer types and grades. Meanwhile, for cancer prognosis and guided therapy, precise detection of cancer mutation and determination of relevant prognostic protein biomarkers have recently been found to play a significant role in personalized cancer management. Among the cancer related proteomics, the presence of specific proteins, such as epidermal growth factor receptor (EGFR), cellular tumor antigen p53, cell regulator protein Bcl-2, and cell division cycle protein CDK-1, in cell nuclei, is of particular prognostic significance. For example, nuclear expression of EGFR (n-EGFR) is found to be the most common, yet novel prognostic biomarker that is highly correlated with patients' survival rate in several types of cancers, such as lung cancer, triple-negative breast cancer, colorectal cancer, ameloblastoma, and ovarian cancer. Besides n-EGFR, clinical studies have also revealed that nuclear Bcl-2 (n-Bcl-2) is significantly associated with gastric and colorectal cancers, whereas mutant nuclear p53 (n-p53) is a significant prognostic biomarker for survival in early breast cancer with visceral metastasis. Identification of those nuclear biomarkers can not only help scientists better understand the signaling pathway in cancers, but more importantly, provide critical information related to disease prognosis, malignant transformation, relapse timeframe, and therapy.

However, detection of nuclear expression of those biomarkers has been a daunting task, since many biomarkers are also expressed on cell membranes and in cytoplasm. Whereas H&E (Hematoxylin & Eosin) staining is used to provide morphological assessment of cancer tissues, immunohistochemistry (IHC) is widely used to analyze specific antigens, especially diagnostic, prognostic, and predictive biomarkers. IHC relies on colorimetric detection to identify the location of a given biomarker within a tissue. While simple, IHC performs poorly in distinguishing biomarkers in nuclei from their surrounding background due to the non-linear optical effect and low dynamic range. Consequently, the cells having overexpressed nuclear biomarkers may be misdiagnosed. This problem exacerbates when multiple targets in a nucleus are to be analyzed.

Compared to colorimetric detection, immunofluorescence (IF) is a technology that uses different fluorescent labels to tag different biomarkers, thus resulting in improved contrast and multiplexing capability over IHC. However, despite elevated biomarker concentrations in the nuclei for the cancers at an advanced stage, the fluorescence signals from the nuclear biomarkers are often times embedded in a large patch of background fluorescence from cell membranes and cytoplasm that may also have the expression of the same biomarkers. In addition, IF suffers significantly from the broad emission spectra of fluorophores, which poses yet another hurdle to distinguish the biomarkers from nearby features with similar emission wavelengths. As a result, it becomes challenging to accurately identify the nuclei having biomarker expression and precisely pinpoint the exact biomarker locations inside the nuclei, which may cause significant distortion in and subsequent misinterpretation of the cancer tissue characterization.

In this example, a laser emission scanning microscope device is provided that provides a wavelength-multiplexed immuno-laser platform with a subcellular and sub-micron resolution to analyze nuclear biomarkers within human cancerous tissues. FIG. 1A illustrates a laser emission scanning microscope device according to certain aspects of the present disclosure that can serve as an "immuno tissue laser," in which a cancerous tissue labeled with site specific fluorophores (e.g., nucleic acid stains) and/or antibody-conjugated fluorophores is sandwiched inside a Fabry-Pérot (FP) microcavity formed by two highly reflective surfaces (e.g., mirrors). The fluorophores serve as the laser gain medium, which are designed to respond to intracellular binding and intratissue activities, thus generating the sensing signal in the form of laser emission. As illustrated in FIG. 1B, while fluorescence (top illustration) from a nucleus usually provides "spatially-blurred" signal, which covers a large area with a low spatial resolution and a low contrast between the places with high and low biomarker expressions, laser emission (bottom illustration) offers distinct advantages due to its high intensity/sensitivity, high fluorescence background suppression, and high spectral/spatial resolution, thus enabling multiplexed detection of nuclear biomarkers at the subcellular level.

To demonstrate broad applicability of the laser emission scanning microscope device used as an immuno tissue laser, both lung and colon cancer tissues are chosen as model systems. EGFR, p53, and Bcl-2 are chosen as exemplary nuclear biomarkers. Nucleic acid dye, YO-PRO-1 Iodide (YOPRO), and antibodies (e.g., anti-EGFR) conjugated with fluorescein isothiocyanate (FITC) are used to identify the locations of nuclei and the corresponding biomarkers within the nuclei, respectively. Subcellular lasing is achieved from YOPRO and FITC with a lasing threshold on the order of tens of $\mu J/mm^2$. Despite the large fluorescence spectral overlap between YOPRO and FITC (>100 nm), their lasing emission can be well separated spectrally due to their narrow emission bands (a few nm), thus enabling multiplexed detection and co-localization of nuclei and nuclear biomarkers. In addition, due to significant suppression of the fluorescence background, the places with high biomarker expression and high concentration of nucleic acids can be clearly identified by laser emissions with a sub-micron resolution (<700 nm). Use of an immuno-laser emission scanning microscope device described here provides a novel tool complementary to IHC and IF to improve cancer diagnostics, prognostics, and therapies, as well as the basic understanding of medical/cell biology.

Tissue and Device Preparation

All the human tissue sections (cancerous and normal) are prepared under the same conditions with a thickness of 15 μm. All the human lung and colon tissues are purchased from OriGene Technologies in the form of OCT (Optimal Cutting Temperature) frozen tissue blocks. Those tissues are verified by pathologists with full pathological verification data, clinical annotation (including patient age, gender, and minimum stage grouping), abstracted pathology reports and digital H&E images. For the tissues used in FIGS. 5A-5H, both tissues are examined by pathologists and verified with lung adenocarcinoma: Type #1 tissue (OriGene No. CB537726) and Type #2 tissue (OriGene No. CB543346).

Upon receipt, all tissue blocks are sliced into 15 μm thick sections by using a cryostat (Leica 3050S) The selected tissue section is picked up and placed on the top of a poly-L-lysine (Sigma-Aldrich #P8920) coated dielectric mirror, which is first cleaned and rinsed with lysine for better tissue adhesion. The tissue is then rinsed with PBS (phosphate buffered solution, ThermoFisher #10010023) and air dried before staining/labeling (see staining/labeling details in the next section). Finally, the tissue is covered by the top dielectric mirror. For confocal IF microscopy, the tissue is first deposited on the top of a superfrost glass slide (ThermoFisher #3021-002), followed by the same staining process, and then mounted with Fluoromount (Sigma-Aldrich #4680) and covered with a coverslip before scanning.

Staining and Labeling

All the human tissue sections are stained with either YOPRO to target nucleic acids inside cells or FITC conjugated antibodies that bind specifically to EGFR, p53, or Bcl-2, which can be expressed on the cell membranes, cytoplasmic organelles (endoplasmic reticulum, Golgi, and endosome), and nuclei.

For IHC staining, the tissue is fixed on a superfrost glass slide (ThermoScientific #15-188-48) by immersing in pre-cooled acetone (−20° C.) for 3 minutes and dried off at room temperature. The slide is then rinsed with PBS twice. Next, the tissue is first blocked with BSA buffer for 10 minutes to prevent non-specific binding and rinsed with PBS thoroughly. Then the tissue is incubated with 200 μl of diluted primary antibody (anti-human-EGFR antibody (abcam #52894) overnight at 4° C. The primary antibody is prepared with 1:50 solution, with a final concentration of 0.005 mg/ml. After incubation of primary antibodies, the tissue is rinsed with PBS, followed by 30 minutes of staining with HRP conjugated anti-Rb IgG secondary antibody (abcam #6721) at room temperature with a dilution of 1:200 (the final concentration=0.01 mg/ml). Then DAB substrate solution (abcam #64238) is applied to the tissue for 5 minutes to reveal the color of the antibody staining. After rinsing 5 times, the tissue slide is dehydrated through pure alcohol, then mounted with mounting medium (abcam #ab64230), and finally covered with a coverslip. The same procedure is applied to both lung and colon tissues. For colon tissues, two additional primary antibodies, anti-p53 (abcam #32049) and anti-Bcl-2 (abcam #182858), are used.

For nucleic acid staining, YOPRO solution (Thermofisher #Y3603) is dissolved in PBS at a concentration of 0.5 mM, and then diluted to lower concentrations with PBS. The prepared YOPRO solution is then applied to the tissue sections for 20 minutes and rinsed with PBS solution twice before measurements. The above process is the same for both IF and tissue laser measurements.

For antibody-fluorophore labeling of lung tissues, the glass slide is first rinsed with PBS twice and blocked with BSA buffer for 10 minutes to prevent non-specific binding, then rinsed again with PBS. Next, the tissue is incubated with 200 μl of diluted primary antibody (anti-human-EGFR antibody (abcam #52894)) overnight at 4° C. The primary antibody is prepared with 1:50 solution, with a final concentration at 0.01 mg/ml. After incubation with primary antibodies, the tissue is rinsed with PBS thoroughly, followed by FITC conjugated anti-Rb IgG secondary antibody (stained for 2 hours at room temperature). The secondary antibody (ThermoFisher #65-6111) is prepared with 1:10 dilution to reach the final concentration of 0.2 mg/ml. Finally, the tissue is rinsed again with PBS before laser experiment. The same procedure is applied to colon tissues, in which the primary antibodies, (anti-EGFR antibody (abcam #52894), anti-p53 antibody (abcam #32049) and anti-Bcl-2 antibody (abcam#182858), are used, followed by FITC conjugated anti-Rb IgG secondary antibody (stained for 2 hours at room temperature). The above process is the same for both IF and tissue laser measurements.

For dual staining of anti-EGFR-FITC and YOPRO, anti-EGFR-FITC is first applied (the same procedure as described for primary and secondary antibody labeling) to the lung tissue sections, then 0.5 mM YOPRO solution is applied for 20 minutes to the same tissue and rinsed with PBS solution twice before measurement.

Optical Imaging Techniques

The brightfield IHC images are taken with a Nikon-E800 Widefield Microscope. The confocal fluorescence microscopic images are taken by using Nikon A1 Spectral Confocal Microscope with an excitation of 488 nm laser source. The brightfield images of the laser emissions ("lasing stars") in tissues are captured by using a CCD (Thorlabs #DCU223C) integrated directly on top of the objective in the experimental setup.

Fabry-Pérot (FP) Cavities

The FP cavity is formed by using two customized dielectric mirrors. The top mirror (made by Qingdao NovelBeam Technology Co. Ltd, China) has a high reflectivity in the spectral range of 500 nm-555 nm to provide optical feedback and high transmission around 465 nm for the pump light to pass through, whereas the bottom mirror (made by Evaporated Coating Inc., USA) has a slightly wider reflection band. The Q-factor for the FP cavity is on the order of $1\times10^4$, at a cavity length of 15 µm (in the absence of tissues). Details of the fabrication and characterization of the FP cavities are the same as described above in Example A.

Experimental Setup

A typical confocal setup is used to excite the sample and collect emission light from the FP cavity as shown in FIG. 17. A pulsed OPO laser (pulse width: 5 ns, repetition rate: 20 Hz) at 465 nm is used to excite the stained tissues. The focused laser beam diameter is 25 µm after passing through an attenuation well and beam splitter. The pump energy density is adjusted by a continuously variable neutral density filter, normally in the range of 1 µJ/mm²-200 µJ/mm². The emission light is collected through the same lens and sent to a spectrometer (Horiba iHR550, spectral resolution about 0.2 nm) for analysis.

The lung tissues stained with YOPRO alone are first investigated. FIGS. 12A-12B show the lasing spectra of cancerous and normal lung tissues under various pump energy densities when 0.5 mM YOPRO solution is used to stain the tissues. A sharp lasing peak emerges around 547 nm. As a control experiment (not shown), no lasing is observed with pure YOPRO solution (without any tissue) at 0.5 mM, which is expected, as YOPRO has virtually no emission in the absence of nucleic acids. The spectrally integrated laser emission versus pump energy density extracted from FIGS. 12A and 12B are both presented in FIG. 12C, from which the lasing threshold of cancerous and normal tissue are derived to be 21 µJ/mm² and 32 µJ/mm², respectively. Furthermore, in FIG. 12D, the dependence of the lasing threshold on the concentration of the YOPRO solution used to stain the tissues at a fixed resonator length (15 µm) is investigated for both cancerous and normal tissues. When the YOPRO solution concentration decreases from 0.5 mM to 0.05 mM, the effective YOPRO concentration within a nucleus is expected to decrease accordingly, which leads to a drastic increase in the lasing threshold, especially for the YOPRO concentration below 0.25 mM. For all YOPRO concentrations, it is discovered that the lasing thresholds for cancer tissues are consistently lower than those of normal tissues, which may be attributed to the higher amount of nuclear chromatin (and hence higher YOPRO concentrations) inside cancer cells (due to higher DNA replication activities). Another possible explanation is that the nucleic acid stain (YOPRO) tends to bind more easily with DNA in a loose nuclear chromatin of cancer cells than in a highly compact nuclear chromatin of normal cells.

In addition, in FIGS. 12A-12B, the tissue lasers remain single mode operation even at a pump energy density significantly higher than the respective lasing threshold. The full-width-at-half-maximum (FWHM) of the lasing emission is only 0.16 nm, limited by the spectrometer resolution. Such a single-mode lasing emission band is approximately 400× narrower than that for the corresponding fluorescence, thus enabling highly wavelength-multiplexed detection. Although at an extremely high pump energy density (5× threshold), the YOPRO-stained tissue laser can support multi-mode lasing operation, the overall lasing band is less than 10 nm, attesting to the intrinsic narrow gain profile for YOPRO, despite a greater than 60 nm fluorescence band.

FIG. 12E shows the confocal fluorescence microscopy image of a nucleus in a cancer cell from the lung cancer tissue. Due to the low contrast of the fluorescence emission within the nucleus, the exact locations having high nucleic acid concentrations are not able to be extracted. However, as visualized by the CCD images in FIGS. 12F and 12G, tiny, sharp laser emissions that have distinct and strong output against the surrounding background can be observed only from the specific sites with the highest abundance of nucleic acids (and hence YOPRO concentration). With the increased pump energy density, more sites having slightly lower abundance of nucleic acids start to lase. Note that there may be fluorescence background emitted from the places that have relatively low concentrations of nucleic acids and therefore are unable to generate laser emission. However, the fluorescence is completely blocked by the top mirror that has greater than or equal to about 99% reflectivity, whereas the actual laser emission can still transmit through the top mirror with almost 100% efficiency. Consequently, those tiny lasing spots, emerging like bright stars in the dark sky (lasing stars) have an extremely high contrast against the surrounding fluorescence background. Similarly, in FIGS. 12H-12J, a series of parallel experiments are carried out using a normal lung tissue and observed the same phenomena as in FIGS. 12F-12G, except that the lasing stars start to emerge at a higher pump energy density and at a given pump energy density, fewer lasing stars are observed, both of which reflect the lower abundance of nucleic acids in a normal tissue, as discussed previously in FIG. 12D.

To further characterize the "lasing stars," FIG. 13A plots the point spread function (PSF) of a single lasing star from the lung cancer tissue captured on the CCD. The FWHM of the PSF is measured to be approximately 678 nm, indicating a sub-diffraction (NA=0.42) and sub-micron optical resolution. FIG. 13B illustrates that two adjacent lasing stars separated by only 1.3 µm can be well resolved. Lasing stars have a high spatial resolution, while "fluorescent clouds" have only a low spatial resolution. The insets of FIGS. 13C-13E illustrate that the subcellular lasing stars emerge progressively from a single to multiple lasing stars within the same pumping beam spot when the pump energy density increases gradually. The spectral analysis in FIGS. 13C-13E suggests that those lasing stars are independent of each other. Each of them is in single lasing mode operation, but may have slightly different lasing wavelength due possibly to different local environments (such as nucleus thickness, refractive index, and gain distribution, etc.).

The results in FIG. 13A-13E provide a novel method to quantify (or semi-quantify) the analyte concentration in tissues (or cells) with a sub-micron spatial resolution by ramping the pump energy density. As exemplified in FIGS. 13C-13E, at a relatively low pump energy density, only those sites having the highest analyte concentration lase. With the increased pump energy density, lasing from more sites can be observed. The image for each the pump energy density can be recorded so that the distribution of analyte relative concentration can be mapped and the histogram of the sites having different levels of analyte concentrations can be built, thus enabling more detailed and more quantitative characterization of tissues and cells.

Moving a step forward, in FIGS. 14A-14E, the lasing emission using EGFR antibody conjugated with FITC (anti-EGFR-FITC) to target n-EGFR expressed in the same lung cancer tissue used in FIGS. 12A-12D is studied. Similar to the YOPRO case in FIG. 12A, FIG. 14A shows single-mode lasing emission with an FWHM of about 0.16 nm when the pump energy density is slightly above the threshold. Although with the increased pump energy density the second mode emerges, the lasing band is only about 8 nm (531 nm-539 nm), much narrower than the corresponding fluorescence band (above 60 nm). The spectrally integrated laser emission versus pump energy density extracted from FIG. 12A is presented in FIG. 14B, showing a lasing threshold of approximately 67 µJ/mm$^2$. While it is known that the FITC concentration correlates with EGFR expression, it is difficult for conventional IF microscopy (shown in FIG. 14C) to pinpoint the exact locations within the nucleus that have high EGFR concentrations. Similar to the YOPRO lasing case studied previously, with the laser emission, significant improvement is achieved in the imaging contrast and the capability to locate the spots of high EGFR concentrations with a sub-micron resolution, as shown in FIGS. 14D-14E.

While in FIGS. 14A-14E, subcellular lasers are achieved from n-EGFR within a lung cancer tissue, laser signals could potentially be generated from EGFR in other locations of the cell (such as cell membrane and cytoplasm). To properly identify n-EGFR, which is of high clinical significance, EGFR and nucleus are ideally co-localized, which involves wavelength-multiplexed detection. To demonstrate the multiplexing capability of the laser emission in accordance with the present disclosure, two types of lung cancer tissues are prepared, adenocarcinoma without n-EGFR (Tissue type #1: FIGS. 5a-5d) and adenocarcinoma with n-EGFR (Tissue type #2: FIGS. 5e-5h). Both tissues are well characterized and verified by pathologists. The corresponding IHC image of both types of tissues in FIGS. 15A and 15E confirm that Type #1 tissue does not have any EGFR expression within the cell nuclei (but does have EGFR expressed on the cell membrane), whereas Type #2 tissue has a significant amount of EGFR within most cell nuclei.

To further characterize those tissues, FIG. 15B shows the lasing spectra of Type #1 tissues when stained separately with YOPRO (red curve) and anti-EGFR-FITC (blue curve). While the lasing from YOPRO can be observed when the tissue is pumped at the nuclei, no lasing from the tissue labeled with anti-EGFR-FITC can be observed, showing that cells that have EGFR expression only on the membranes or other cytoplasmic organelles are not capable of providing sufficient gain to lase due to relatively low abundance of EGFR (and hence FITC). The same characterization procedure is also applied to the Type #2 tissues. In this case, as shown in FIG. 15F, when the tissues are pumped at the nuclei, the laser emission at 547 nm for the tissue stained with YOPRO and at 537 nm for the tissue stained with anti-EGFR-FITC are obtained, respectively.

While the comparison between FIGS. 15B and 15F has already suggested that the FITC lasing is from the expression of EGFR in the nucleus, co-localization of EGFR and nucleus lasing signal provides important verification of the presence of n-EGFR. To achieve co-localization, both Type #1 and Type #2 tissues are dual-stained with YOPRO and anti-EGFR-FITC. The confocal fluorescence microscopic images (by removing the top mirror in the FP cavity) of the dual-stained tissues are presented in FIGS. 15C and 15G. Strong YOPRO fluorescence from nuclei and FITC fluorescence from the EGFR on cell membranes and cytoplasm can be observed for both tissues. In particular, the nuclei in FIG. 15G visually presents a higher intensity of fluorescence than that of FIG. 15C, which indicates that high abundance of n-EGFR may exist within the nuclei in Type #2 tissue. However, it is apparent that the subcellular locations cannot be clearly determined by their fluorescence, nor used to distinguish the EGFR expressions in nucleus and cytoplasm, as a result of the huge spectral overlap between YOPRO and FITC. In contrast, by placing the same tissue in the FP cavity (by putting the top mirror back), lasing signals of the two dyes can be observed and distinguished spectrally. FIGS. 15D and 15H present the lasing spectra of a dual-stained Type #1 and Type 190 2 tissues, respectively. For Type 190 1 tissue (FIG. 15D), only lasing spectrum from YOPRO is obtained when the tissue is pumped at the nucleus, no lasing signal from EGFR is observed, indicating that no EGFR or low EGFR exists in the nucleus. However, for Type #2 tissue (FIG. 15H), two sharp lasing peaks appear at 537 nm and 547 nm when the tissue is pumped at the nucleus, which is the evidence of dual lasing from both EGFR and nucleic acids. The inset of FIG. 15H shows a CCD image, which confirms the presence of EGFR in the nucleus. Note that since the lasing threshold of FITC is much higher than that of for YOPRO, the lasing intensity from FITC is lower than that from YOPRO under the same pump energy density. Also note that even at higher pump energy densities at which higher order modes may emerge, the lasing spectra of YOPRO and FITC can still be distinguished due to their very narrow emission bands.

Finally, the laser emission scanning microscope device used as an immuno tissue laser is applied to other types of tissues and nuclear biomarkers to validate its broad utility. In FIGS. 16A-16F, three different nuclear biomarkers (EGFR, p53, and Bcl-2) are examined in colon cancer tissues. For the purpose of tissue characterization, FIGS. 16A-16C present the IHC and confocal IF images of a colorectal cancer tissues labeled with the corresponding antibodies (i.e., anti-EGFR, anti-p53, and anti-Bcl-2), showing a high amount of EGFR, p53, and Bcl-2 in the nuclei of the respective tissues. Similar to the procedures used previously, the lasing emissions from those colon tissues labeled with anti-EGFR-FITC, anti-p53-FITC, and anti-Bcl-2-FITC are achieved in FIGS. 16D-16F, when the nuclei are pumped. Despite the existence of multiple lasing peaks at the high pump energy density, the laser emission band is still approximately only 5 nm, showing the potential capability of multiplexed detection. The lasing threshold is on the order of 200 µJ/mm$^2$.

Thus, a novel wavelength-multiplexed laser emission scanning microscope device used as an immuno tissue laser with a sub-micron resolution is provided and successfully applied it in detection and identification of various nuclear biomarkers (EGFR, p53, and Bcl-2) in human lung and colon cancer tissues. This method implements laser emission (rather than fluorescence) in biomedical applications by taking advantage of the high intensity, high background suppression, and high spectral/spatial resolution of the laser emission. The laser emission scanning microscope device may be for immuno-laser imaging technology to map cancerous tissues (and other diseased tissues). This essentially is laser emission based microscopy, in which images can be constructed by scanning the pump beam across the whole tissue. Additionally, integration with an imaging spectrometer for hyperspectral imaging of a tissue is also contemplated.

Further, the conventional diagnostic IHC and IF methods, which are known to be subjective and cause significant variations in tissue evaluation from one pathologist to another. The methods of the present disclosure provide a way to quantify the number of sites within a cell that have different levels of biomarker expression and the number of cells that express high nuclear biomarkers by mapping the tissue while ramping the pump energy density. As a result, a histogram of cancer cells can be built. Such a method of quantification, together with the conventional IHC and IF, will provide better assessment of the cancer tissue for cancer diagnosis, prognosis, and personalized therapies.

Besides cancer cells, the same immuno-laser technology can be extended to stroma cells (cancer-associated fibroblasts) that have overexpressed biomarkers. For example, a colon tissue expressed with Bcl-2 can be detected. Recent reports have revealed that the interaction between stromal cells and tumor cells plays a major role in cancer growth and progression. Moreover, stromal gene expression has also been demonstrated to define poor-prognosis subtypes in several cancers. Therefore the capability to observe tumor stroma lasing can assist in predicting clinical outcomes and strengthening clinical prognostic factors.

While dual detection (2-plexed detection) has been shown in this example, the laser emission scanning microscope device is capable of accommodating additional energy responsive species (e.g., additional fluorophores). For example, lasing in three dye systems has been achieved, with the FITC, YOPRO, and a high-affinity nucleic acid dye—SYTOX Blue, which is centered around 500 nm with a band width less than 5 nm. Consequently, at least three lasing emission wavelengths can be clearly distinguished within the range of 500 nm-550 nm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A scanning microscope device comprising:
a first reflection surface that is planar;
a second reflection surface;
a scanning cavity sized to hold a stationary tissue sample having at least one added lasing energy responsive species serving as a gain medium inside the stationary tissue sample, wherein at least a portion of the scanning cavity corresponds to a Fabry-Pérot resonator cavity defined between the first reflection surface and the second reflection surface having a quality factor (Q) of greater than or equal to about $1\times10^2$;
a lasing pump source configured to direct energy at the scanning cavity and the stationary tissue sample having the at least one added lasing energy responsive species; and
a detector configured to receive and detect one or more emissions generated by at least one added lasing energy responsive species serving as the gain medium in the tissue sample from the scanning cavity, wherein at least one of the second reflection surface or the lasing pump source is translatable with respect to the stationary tissue sample in the scanning cavity to generate a two-dimensional scan of the tissue sample.

2. The scanning microscope device of claim 1, wherein a first surface of the stationary tissue sample is disposed on the first reflection surface and a second surface of the stationary tissue sample opposite to the first surface has a gap of less than or equal to about 20 micrometers from the second reflection surface.

3. The scanning microscope device of claim 1, wherein a distance between the first reflection surface and the second reflection surface is less than or equal to about 60 micrometers.

4. The scanning microscope device of claim 1, wherein the second reflection surface is a scanning mirror formed on a terminal end of a fiber that translates with respect to the stationary tissue sample.

5. The scanning microscope device of claim 4, wherein the second reflection surface defines a concave structure and a radius of curvature of the concave structure is greater than or equal to about 5 micrometers to less than or equal to about 500 micrometers.

6. The scanning microscope device of claim 1, wherein the second reflection surface defines a planar structure and the lasing pump source is translatable with respect to the tissue sample in the scanning cavity.

7. The scanning microscope device of claim 1, wherein the quality factor (Q) is greater than or equal to about $1\times10^5$.

8. The scanning microscope device of claim 1, wherein the stationary tissue sample comprises at least two distinct lasing energy responsive species and the detector is capable of receiving and detecting multiplexed emissions from each distinct lasing energy responsive species.

9. The scanning microscope device of claim 1, wherein the second reflection surface is removable.

10. The scanning microscope device of claim 1, wherein the stationary tissue sample has a thickness of greater than or equal to about 1 µm to less than or equal to about 50 µm.

11. The scanning microscope device of claim 1, wherein at least one of the first reflection surface or the second reflection surface comprises one or more spacers.

12. The scanning microscope device of claim 11, wherein the one or more spacers have a height of greater than or equal to about greater than or equal to about 2 micrometers to less than or equal to about 60 micrometers.

13. The scanning microscope device of claim 11, wherein the scanning cavity further comprises at least one refractive index matching material disposed around the tissue sample.

14. The scanning microscope device of claim 1, wherein the stationary tissue sample is in a form of a microarray of tissue samples.

15. The scanning microscope device of claim 1, wherein the stationary tissue sample has been cryogenically preserved or formalin-fixed paraffin-embedded.

16. The scanning microscope device of claim 1, wherein the second reflection surface has a reflectivity to the one or more laser emissions generated by the at least one added lasing energy responsive species in the tissue sample of greater than or equal to about 80% to less than or equal to about 99.999%.

17. A method of detecting emissions from one or more lasing energy responsive species in a tissue sample, wherein the method comprises:
directing energy from a lasing pump source towards a stationary tissue sample disposed within a scanning cavity at least a portion of which defines a Fabry-Pérot resonator cavity having a quality factor (Q) of greater than or equal to about $1\times10^2$ formed between a first reflection surface and a second reflection surface, wherein the tissue sample contains one or more added lasing energy responsive species serving as a gain medium inside the stationary tissue sample, and at least one of the second reflection surface or a lasing pump source translates with respect to the stationary tissue sample disposed within the scanning cavity; and
detecting one or more laser emissions generated by the added one or more lasing energy responsive species serving as a gain medium inside the stationary tissue sample to generate a two-dimensional scan of the tissue sample.

18. The method of claim 17, wherein the directing energy from the lasing pump source includes translating a source of lasing energy over the tissue sample disposed within the scanning cavity to generate the two-dimensional scan.

19. The method of claim 17, wherein the second reflection surface defines a concave structure that is a scanning mirror formed on a terminal end of a fiber that translates with respect to the tissue sample disposed within the scanning cavity to generate the two-dimensional scan.

20. The method of claim 17, wherein the tissue sample contains at least two distinct fluorophores or lasing energy responsive species and the detecting includes detecting at least two distinct emissions generated by the at least two distinct fluorophores or lasing energy responsive species to generate a multiplexed two-dimensional scan of the tissue sample.

21. The method of claim 17, wherein the one or more added lasing energy responsive species comprise a first lasing energy responsive species and a distinct second lasing energy responsive species and the energy directed towards the stationary tissue sample is less than a first lasing threshold energy of the first lasing energy responsive species and greater than a second lasing threshold energy of the second lasing energy responsive species, so that the detecting of the one or more emissions detects only laser emissions from the second lasing energy responsive species in the tissue sample.

22. The method of claim 17, wherein the one or more added lasing energy responsive species comprise a first lasing energy responsive species having a first lasing threshold energy and a distinct second lasing energy responsive species having a distinct second lasing threshold energy, so that the directing energy from the lasing pump source comprises increasing an energy level to first excite the first lasing energy responsive species and then to excite the second lasing energy responsive species, so that the detecting of the one or more emissions detects emissions from the first lasing energy responsive species and the second lasing energy responsive species maps a distribution of the first lasing energy responsive species and the second energy responsive species within the stationary tissue sample.

23. The method of claim 17, wherein the one or more added lasing energy responsive species comprise a first lasing energy responsive species having a first lasing threshold energy, wherein an amount of energy directed towards the stationary tissue sample is increased, so that the detecting maps a concentration distribution of the first lasing energy responsive species in the stationary tissue sample.

24. The method of claim 17, wherein the one or more added lasing energy responsive species comprise a first lasing energy responsive species and a distinct second lasing energy responsive species, wherein the first energy responsive species is in a nucleus of a cell and the second energy responsive species is associated with an antibody that targets an antigen that is inside the cell, on a membrane of the cell, or in an extracellular matrix of the tissue sample.

25. The method of claim 17, wherein the first reflection surface and the second reflection surface have a broad reflection band.

26. The method of claim 17, wherein the second reflection surface has a reflectivity to the one or more laser emissions generated by the one or more added lasing energy responsive species in the tissue sample of greater than or equal to about 80% to less than or equal to about 99.999%.

27. The method of claim 17 further comprising detecting one or more of bright field emissions or fluorescent emissions generated in the tissue sample, wherein the two-dimensional scan is a composite overlay of the laser emissions with the bright field emissions, fluorescent emissions, or both the bright field emissions and the fluorescent emissions.

28. The method of claim 27 wherein the detecting comprises detecting fluorescent emissions and the method further comprises first removing the second reflection surface.

29. The method of claim 17, wherein the one or more laser emissions generated by the one or more added lasing energy responsive species in the tissue sample provides at least one of: identification of sub-type of cancer tissue, early detection of cancer, identification of a stage of cancer, or a histogram of laser emissions.

30. A method for quantifying one or more biomarkers in a histological tissue sample, the method comprising:
directing energy from a lasing pump source towards a stationary histological tissue sample disposed within a scanning cavity, at least a portion of which defines a Fabry-Pérot resonator cavity having a quality factor (Q) of greater than or equal to about $1\times10^2$ formed between a first reflection surface and a second reflection surface, wherein the histological tissue sample contains one or more added lasing energy responsive species serving as a gain medium inside the stationary histological tissue sample capable of associating with at least one biomarker and at least one of the second reflection surface or a source of lasing energy source of coherent electromagnetic radiation translates with respect to the stationary tissue sample disposed within the scanning cavity; and
detecting one or more laser emissions generated by the one or more added lasing energy responsive species in the histological tissue sample so as to quantify a number of the at least one biomarker present in the histological tissue sample.

31. The method of claim 30, wherein the one or more added lasing energy responsive species comprise a first lasing energy responsive species and a distinct second lasing energy responsive species and the energy directed towards the stationary tissue sample is less than a first lasing threshold energy of the first lasing energy responsive species and greater than a second lasing threshold energy of the second lasing energy responsive species, so that the detecting of the one or more emissions detects only laser emissions from the second lasing energy responsive species in the tissue sample.

32. The method of claim 30, wherein the at least one biomarker associates with nuclei of cells within the stationary tissue sample, so that the detecting of one or more emissions generated by the one or more added lasing energy responsive species corresponds to emissions generated by nuclei of the cells, so that the quantifying enumerates a number of nuclei of cells in the tissue sample.

33. The method of claim 30, wherein the detecting of one or more emissions relates to a concentration distribution of the at least one biomarker in distinct regions of the tissue sample, wherein an excitation intensity of energy directed at the tissue sample is varied to measure the concentration of the biomarker in distinct regions of the tissue sample.

34. The method of claim 30, wherein the one or more added lasing energy responsive species comprise a first lasing energy responsive species having a first lasing threshold energy and a distinct second lasing energy responsive species having a distinct second lasing threshold energy, so that the directing energy from the lasing pump source comprises increasing an energy level to first excite the first lasing energy responsive species and then to excite the second lasing energy responsive species, so that the detecting of the one or more emissions detects emissions from the first lasing energy responsive species and the second lasing energy responsive species maps a distribution of the first lasing energy responsive species and the second energy responsive species within the histological tissue sample.

35. The method of claim 30, wherein the one or more added lasing energy responsive species comprise a first lasing energy responsive species having a first lasing threshold energy, wherein an amount of energy directed towards the histological tissue sample is increased, so that the detecting maps a concentration distribution of the first lasing energy responsive species in the histological tissue sample.

36. The method of claim 30, wherein the one or more emissions generated by the one or more added lasing energy responsive species having a spatial resolution of less than or equal to 0.7 micrometers.

37. The method of claim 30, wherein the first reflection surface and the second reflection surface have a broad reflection band.

38. A method of detecting emissions from two or more lasing energy responsive species in a tissue sample, wherein the method comprises:
tuning a first reflection surface and a second reflection surface in a scanning cavity at least a portion of which defines a Fabry-Pérot resonator cavity having a quality factor (Q) of greater than or equal to about $1 \times 10^2$ to permit laser emissions from a first lasing energy responsive species in a stationary tissue sample that contains two or more lasing energy responsive species including the first lasing energy responsive species having a first lasing threshold energy and a distinct second lasing energy responsive species having a distinct second lasing threshold energy, wherein the first reflection surface and the second reflection surface have a tunable reflection band;
directing energy from a lasing pump source towards the stationary tissue sample disposed within the scanning cavity, wherein at least one of the second reflection surface or a lasing pump source translates with respect to the stationary tissue sample disposed within the scanning cavity;
detecting one or more laser emissions generated by the first lasing energy responsive species in the tissue sample;
tuning the first reflection surface and the second reflection surface to have a distinct second reflection band that permits laser emissions from the second lasing energy responsive species to transmit therethrough; and
detecting one or more laser emissions generated by the second lasing energy responsive species in the tissue sample to generate a two-dimensional scan of the tissue sample.

39. A method for quantifying two or more biomarkers in a histological tissue sample, the method comprising:
tuning a first reflection surface and a second reflection surface in a scanning cavity at least a portion of which defines a Fabry-Pérot resonator cavity having a quality factor (Q) of greater than or equal to about $1 \times 10^2$ to permit laser emissions from a first lasing energy responsive species in a stationary histological tissue sample that contains two or more lasing energy responsive species capable of associating with at least one biomarker and including the first lasing energy responsive species having a first lasing threshold energy and a distinct second lasing energy responsive species having a distinct second lasing threshold energy, wherein the first reflection surface and the second reflection surface have a tunable reflection band;
directing energy from a lasing pump source towards the stationary histological tissue sample disposed within the scanning cavity, wherein at least one of the second reflection surface or a lasing pump source translates with respect to the stationary histological tissue sample disposed within the scanning cavity;
detecting one or more laser emissions generated by the first lasing energy responsive species in the histological tissue sample;
tuning the first reflection surface and the second reflection surface to have a distinct second reflection band that permits laser emissions from the second lasing energy responsive species to transmit therethrough; and
detecting one or more laser emissions generated by the second lasing energy responsive species in the tissue sample so as to quantify a number of the at least one biomarker in the stationary histological tissue sample.

* * * * *